United States Patent [19]

Miura

[11] Patent Number: 4,707,715
[45] Date of Patent: Nov. 17, 1987

[54] PRINTING APPARATUS

[75] Inventor: Kunihiko Miura, Hiratsuka, Japan

[73] Assignee: Kabushiki Kaisha Toshiba, Kawasaki, Japan

[21] Appl. No.: 731,380

[22] Filed: May 7, 1985

[30] Foreign Application Priority Data

May 9, 1984 [JP] Japan .................................. 59-94792

[51] Int. Cl.[4] ...................... G01D 15/14; G03G 15/00; H04N 1/21
[52] U.S. Cl. .................................. 346/160; 358/296; 355/3 R; 355/14 R
[58] Field of Search .................... 355/14 SH, 14 R, 8, 355/14 C; 358/293, 257, 296, 280; 346/160

[56] References Cited

U.S. PATENT DOCUMENTS 3,960,446  6/1976  Ogawa et al. .............. 355/14 SH X
4,125,829  11/1978  Kayashima .......................... 340/324
4,302,098  11/1981  Kan et al. .......................... 355/8 X
4,439,790  3/1984  Yoshida ........................ 358/293 X
4,473,314  9/1984  Imaizumi ........................ 400/279 X

FOREIGN PATENT DOCUMENTS 2855253  7/1980  Fed. Rep. of Germany .
56-5669  2/1981  Japan .
643490  6/1984  Switzerland .

Primary Examiner—E. A. Goldberg
Assistant Examiner—Linda M. Peco
Attorney, Agent, or Firm—Schwartz, Jeffery, Schwaab, Mack, Blumenthal & Evans

[57]    ABSTRACT

A printing apparatus which prints the dot-matrix characters or dot-matrix graphic patterns on a paper sheet one page at a time by scanning a photosensitive drum with a modulated laser beam in accordance with the recording data externally supplied and by transferring an image on the drum onto the paper sheet. This printing apparatus comprises page memory for storing the dot-matrix image according to the recording data, margin table for storing the margin data of the respective sizes of the paper sheets and a controller for incorporating the margin data into the dot-matrix image read from the page memory and for supplying the incorporated image to the laser scanning unit for modulating the laser beam.

13 Claims, 82 Drawing Figures

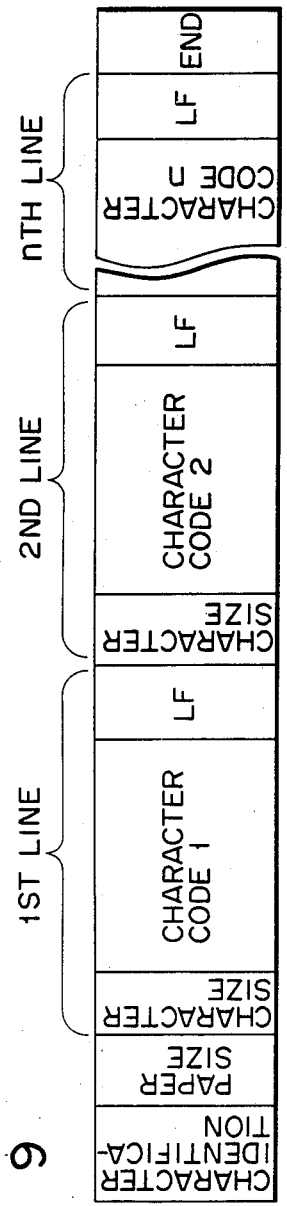
F I G. 9
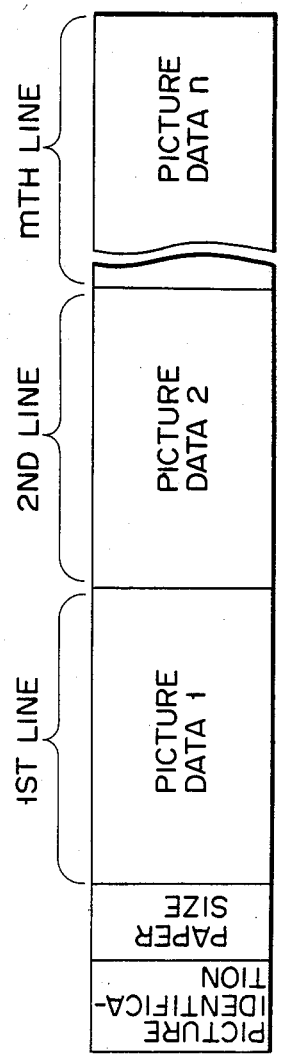
F I G. 10
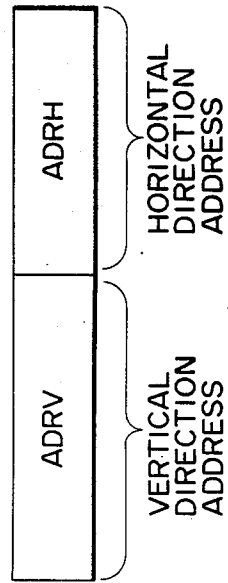
F I G. 12

F I G. 25A
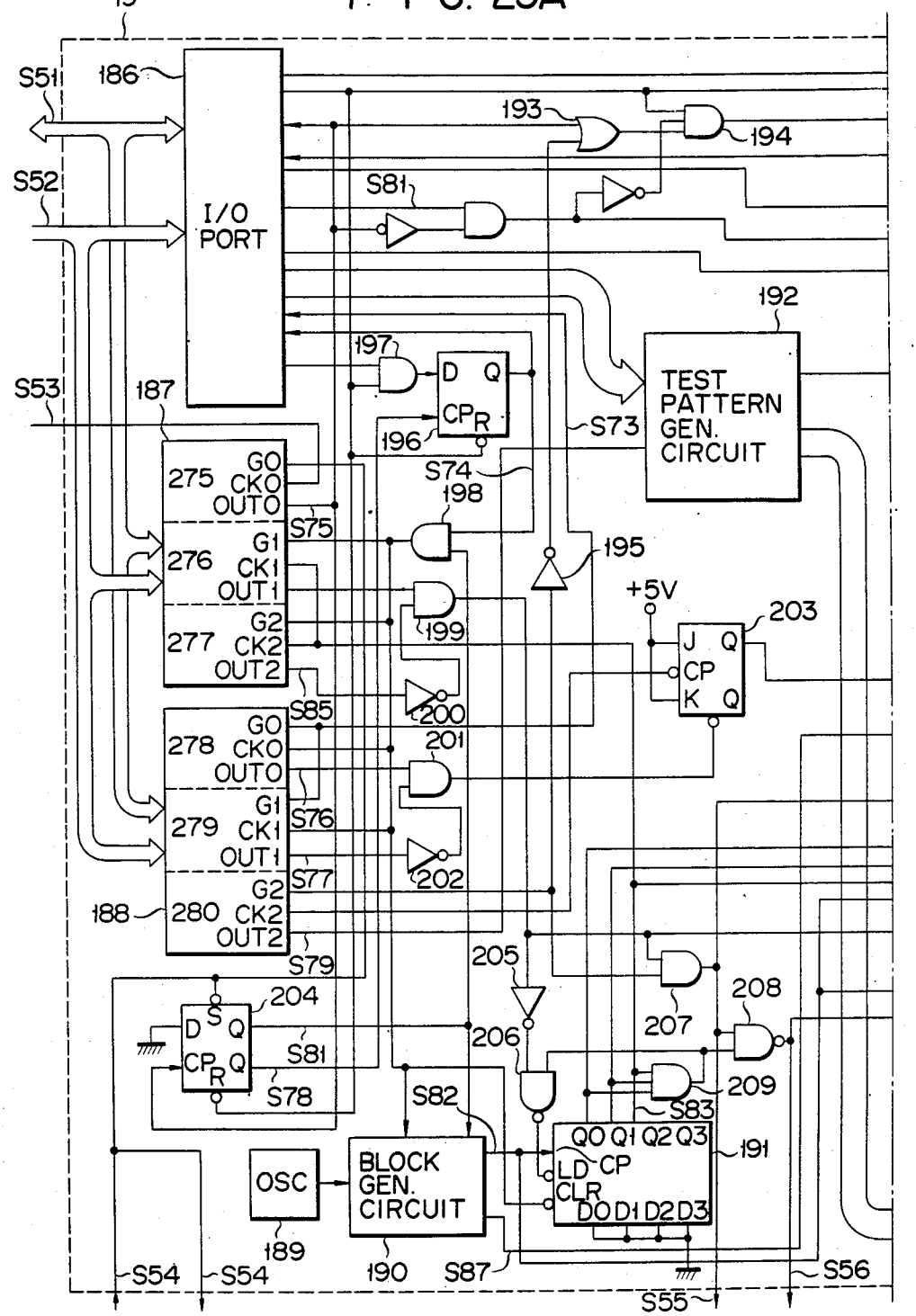

FIG. 27

| COMMAND | FUNCTION |
|---|---|
| SR 1 | STATUS 1 REQUEST |
| SR 2 | STATUS 2 REQUEST |
| SR 3 | STATUS 3 REQUEST |
| SR 4 | STATUS 4 REQUEST |
| SR 5 | STATUS 5 REQUEST |
| SR 6 | STATUS 6 REQUEST |
| PSON | POWER SAVING |
| PSOF | POWER SAVING OFF |
| CSTU | DESIGNATE UPPER CASSETTE |
| CSTL | DESIGNATE LOWER CASSETTE |
| SELON | SELECTION LAMP ON |
| SELOF | SELECTION LAMP OFF |
| VSYNC | START IMAGE DATA TRANSFER |
| MF 1 | DESIGNATE MANUAL FEEDING (A3 LENGTH) |
| MF 2 | DESIGNATE MANUAL FEEDING (A4 LENGTH) |
| MF 3 | DESIGNATE MANUAL FEEDING (A4 WIDTH) |
| MF 4 | DESIGNATE MANUAL FEEDING (A5 LENGTH) |
| MF 5 | DESIGNATE MANUAL FEEDING (A6 LENGTH) |
| MF 6 | DESIGNATE MANUAL FEEDING (B4 LENGTH) |
| MF 7 | DESIGNATE MANUAL FEEDING (B5 LENGTH) |
| MF 8 | DESIGNATE MANUAL FEEDING (B5 WIDTH) |
| MF 9 | DESIGNATE MANUAL FEEDING (B6 LENGTH) |
| TBM1 | TOP/BOTTOM MARGIN (5mm) |
| TBM2 | TOP/BOTTOM MARGIN (10mm) |
| TBM3 | TOP/BOTTOM MARGIN (15mm) |
| TBM4 | TOP/BOTTOM MARGIN (20mm) |
| SONF | SHADOW ON/OFF |

FIG. 28

| | DATA 71 | DATA 61 | DATA 51 | DATA 41 | DATA 31 | DATA 21 | DATA 11 |
|---|---|---|---|---|---|---|---|
| STATUS 1 | PAPER BEING TRANS- PORTED | SELECT SWITCH ON | VSYNC BEING REQUESTED | PAPER BEING FED BY HAND | CASSETTE UPPER/ LOWER | MARGIN TOP/BOTTOM | |
| STATUS 2 | SHADOW ON | CASSETTE SIZE (UPPER) | | | CASSETTE SIZE (LOWER) | | |
| STATUS 3 | — | BEING TESTED/ REPAIRED | DATA RE- TRANSMIS- SION BEING REQUESTED | WAITING | POWER BEING SAVED | OPERATOR BEING CALLED | SERVICE- MAN BEING CALLED |
| STATUS 4 | TRAY FULL | CHANGE TONER BAG | PAPER ABSENT | JAMMING | TONER BAG EMPTY | OPEN COVER | — |
| STATUS 5 | TIMING ERROR | TROUBLE IN FIXING UNIT | TROUBLE IN LASER | TROUBLE IN SCAN MOTOR | CHANGE HEAT ROLLER | CHANGE DRUM | CHANGE DEVELOPER |
| STATUS 6 | — | — | — | — | RETRANSMITTED NUMBER OF PAPER SHEETS | | |

| DATA 81 | UNAUTHORIZED COMMAND ERROR |
|---|---|

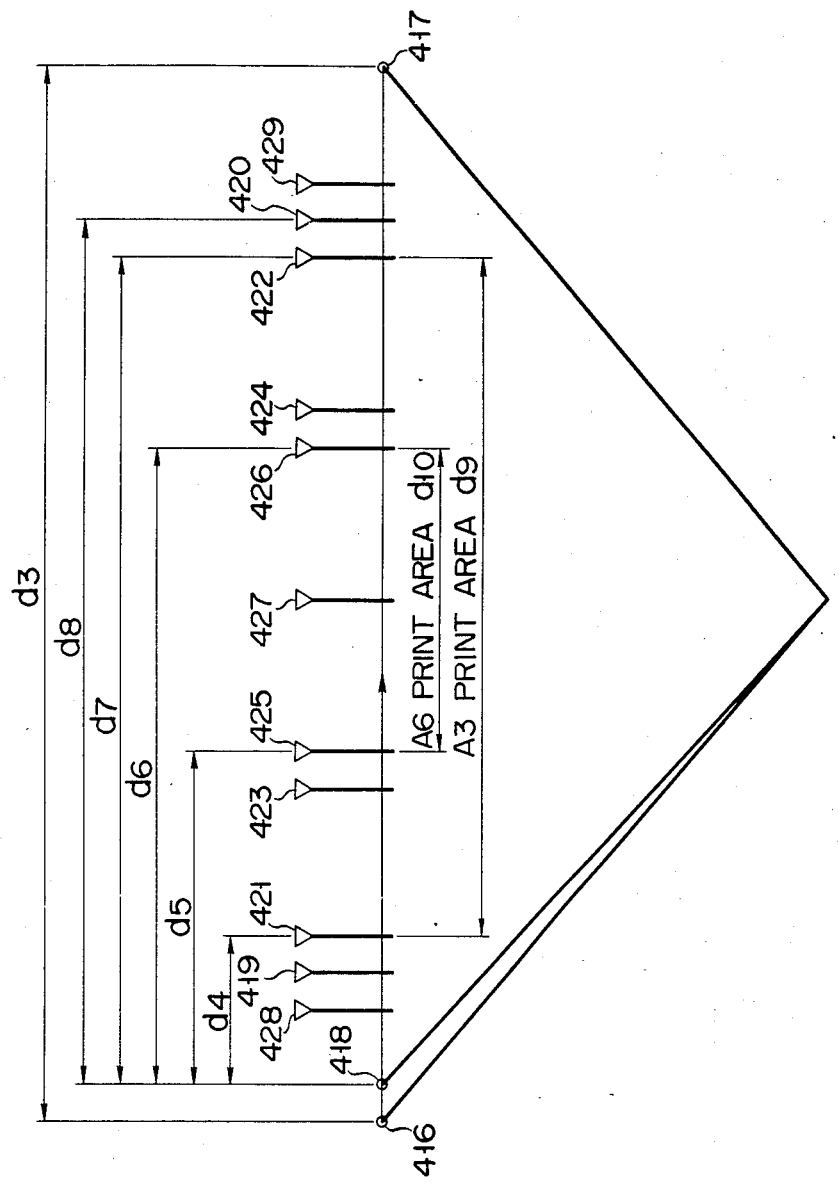

FIG. 45A

| ADDRESS | CONTENTS | | |
|---|---|---|---|
| 4000<br>4001 | A3 | TOP MARGIN TABLE (5mm) | |
| 4002<br>4003 | | BOTTOM MARGIN TABLE (5mm) | |
| 4004<br>4005 | | LEFT MARGIN TABLE | |
| 4006<br>4007 | | RIGHT MARGIN TABLE | |
| 4008<br>4009 | B4 | TOP MARGIN TABLE (5mm) | |
| 400A<br>400B | | BOTTOM MARGIN TABLE (5mm) | |
| 400C<br>400D | | LEFT MARGIN TABLE | |
| 400E<br>400F | | RIGHT MARGIN TABLE | |
| 4010<br>⌇ | | ⌇ | |
| 4080<br>4081 | A6 | TOP MARGIN TABLE (5mm) | |
| 4082<br>4083 | | BOTTOM MARGIN TABLE (5mm) | |
| 4084<br>4085 | | LEFT MARGIN TABLE | |
| 4086<br>4087 | | RIGHT MARGIN TABLE | |
| 4100<br>⌇ | | TOP/BOTTOM MARGIN CHANGE TABLE | 10mm<br>15mm<br>20mm |
| | | TOP MARGIN ADJUST TABLE | SWITCH 1<br>⌇<br>SWITCH n |
| | | UP/DOWN CASSETTE ADJUST TABLE | SWITCH 1<br>⌇<br>SWITCH n |
| | | CASSETTE FEED/MANUAL FEED ADJUST TABLE | SWITCH 1<br>⌇<br>SWITCH n |
| 4200<br>⌇<br>42FF | | DRUM CHARACTERISTIC TABLE A<br>DRUM CHARACTERISTIC TABLE B<br>DRUM CHARACTERISTIC TABLE C<br>DRUM CHARACTERISTIC TABLE D<br>DRUM CHARACTERISTIC TABLE E | |
| 4300<br>⌇<br>43FF | | EXCHANGE TABLE (DRUM)<br>EXCHANGE TABLE (DEVELOPER)<br>EXCHANGE TABLE (FIXING ROLLER) | |
| 4400<br>⌇<br>47FF | | CONTROLLING TIMER TABLE | |

FIG. 45B

| ADDRESS | CONTENTS |
|---|---|
| 6000 | DRUM CHARACTERISTIC NUMBER |
| 6100 | JAMMING GENERATION |
| 6200 | PAPER EXHAUST TRAY COUNTER |
| 6300 | DRUM EXCHANGE COUNTER |
| 6400 | DEVELOPING AGENT EXCHANGE COUNTER |
| 6500 | FIXING ROLLER EXCHANGE COUNTER |

FIG. 46

| TIM A |
|---|
| TIM B |
| ⁄ |
| TIM E |
| PAPER SIZE REGISTER |
| STATUS 1 |
| STATUS 2 |
| ⁄ |
| STATUS 6 |
| OTHERS |

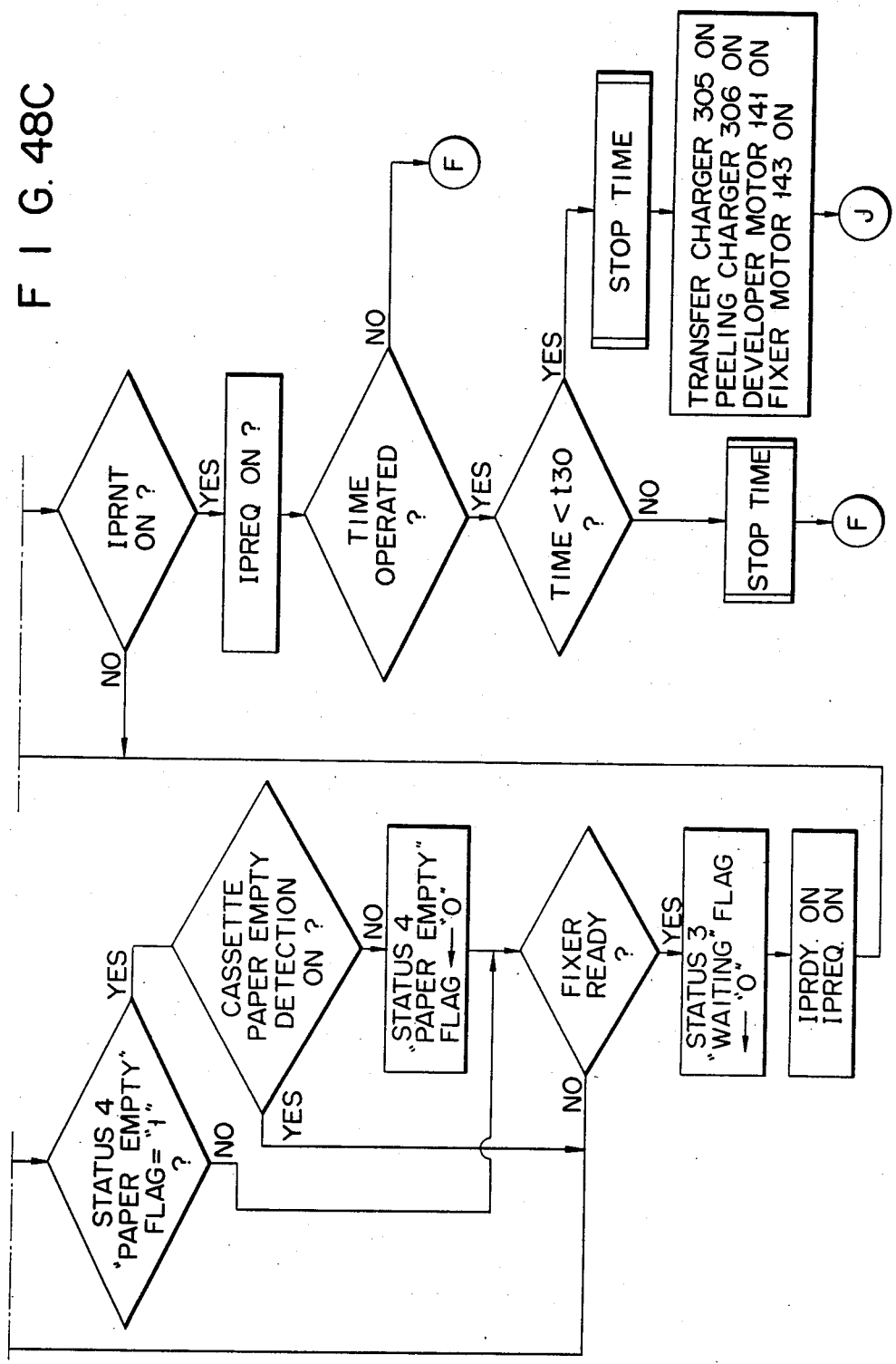

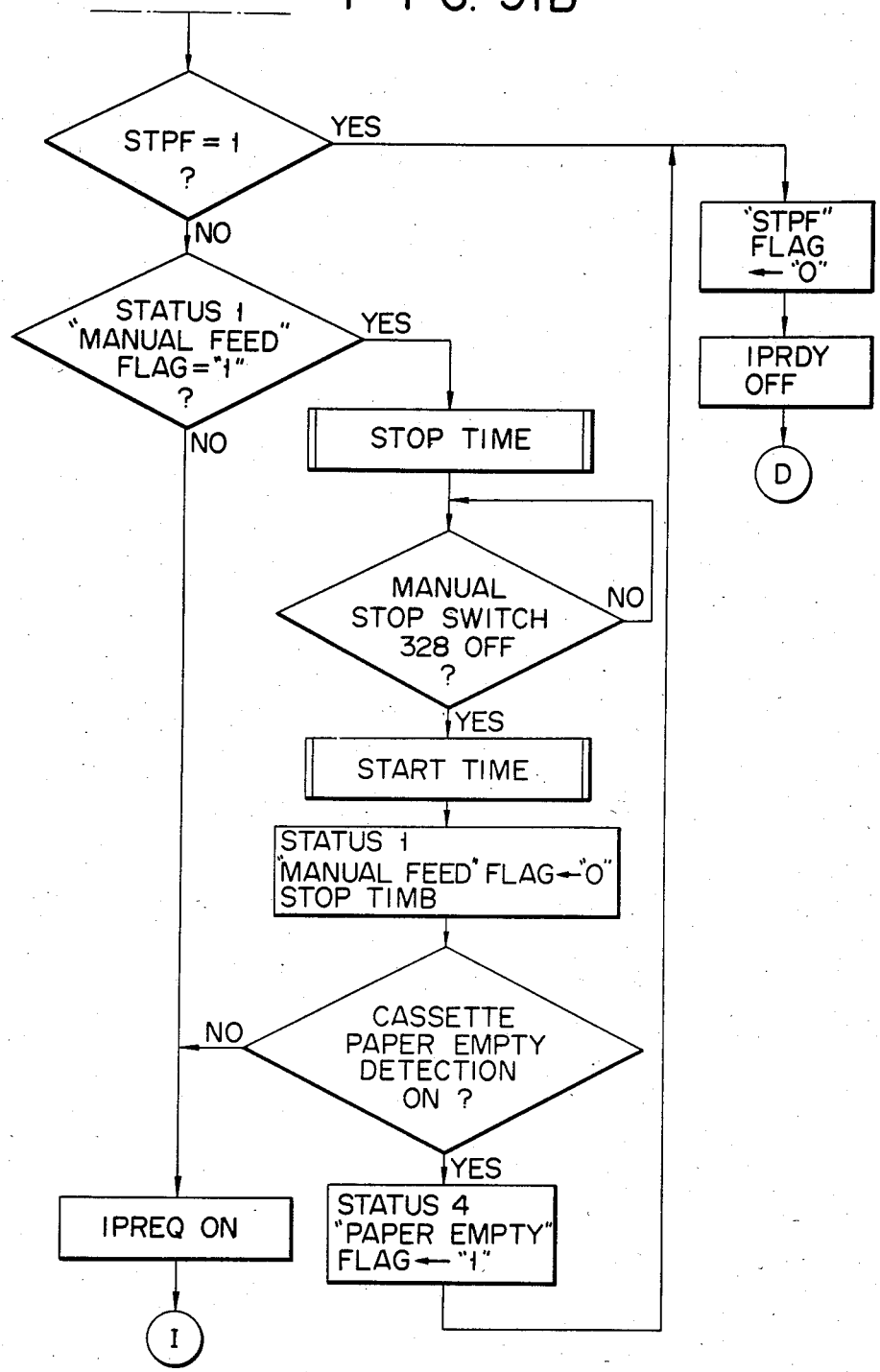

F I G. 53
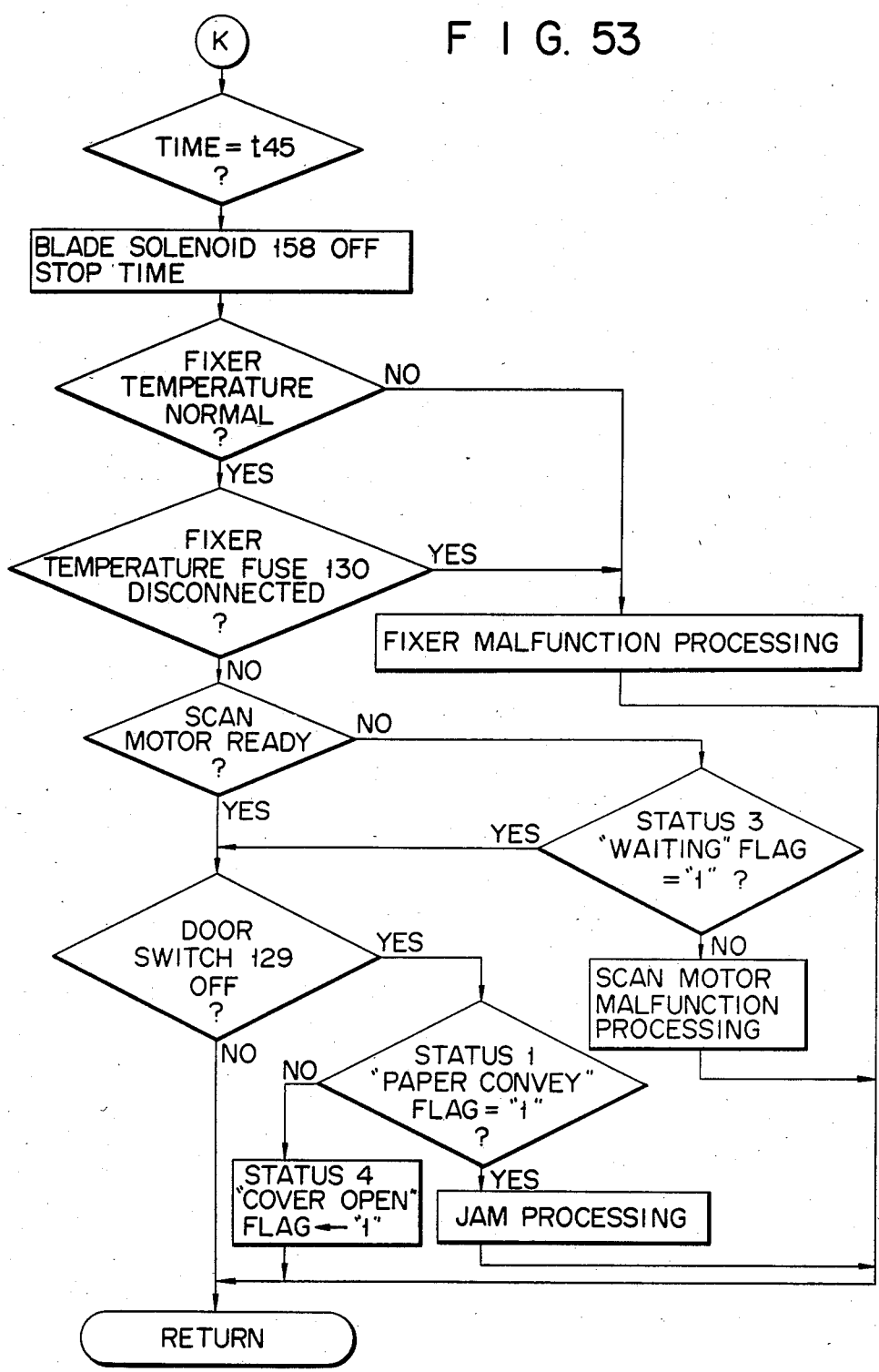

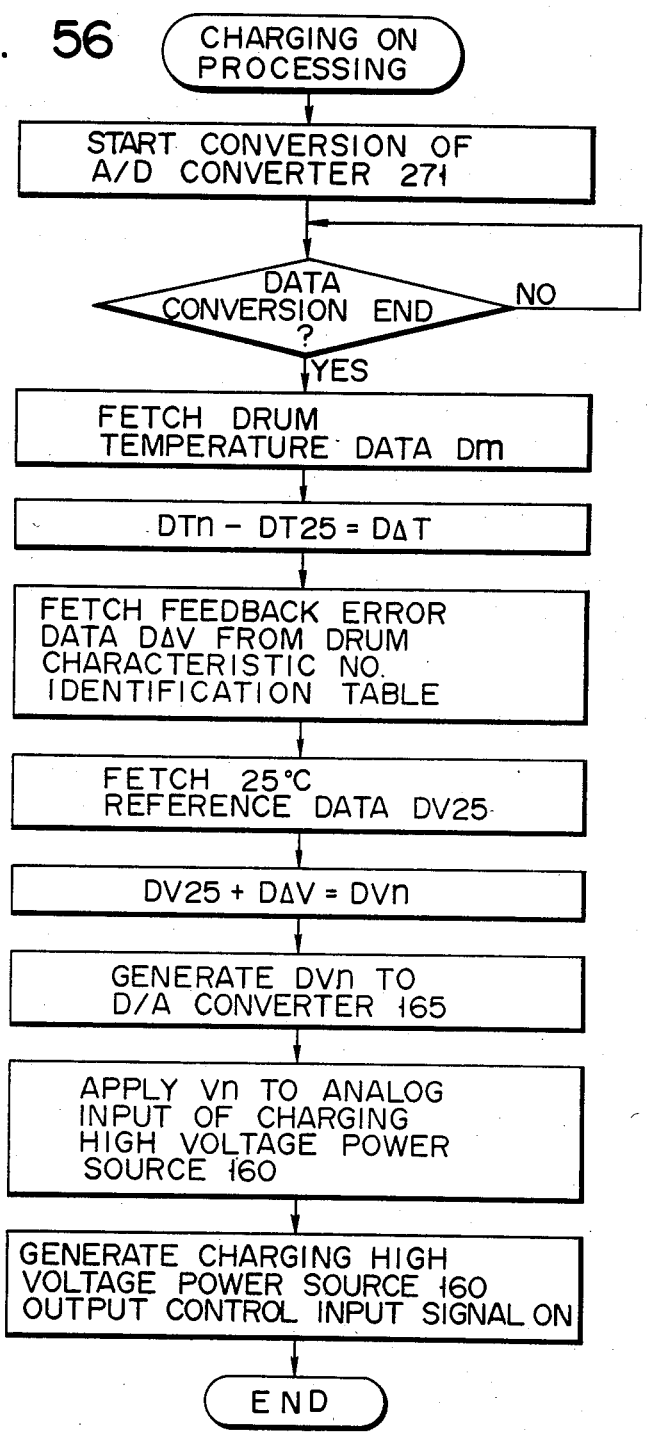

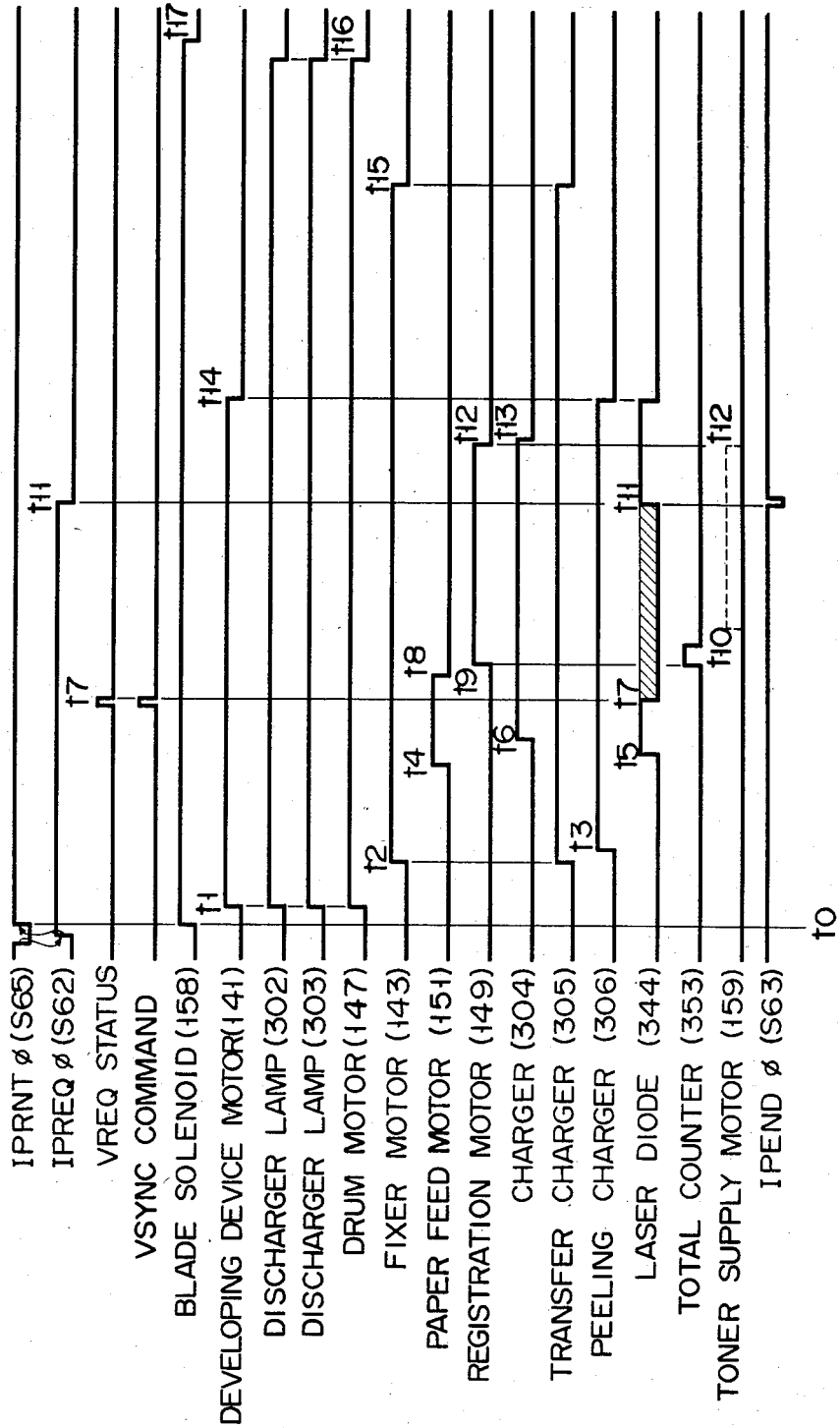

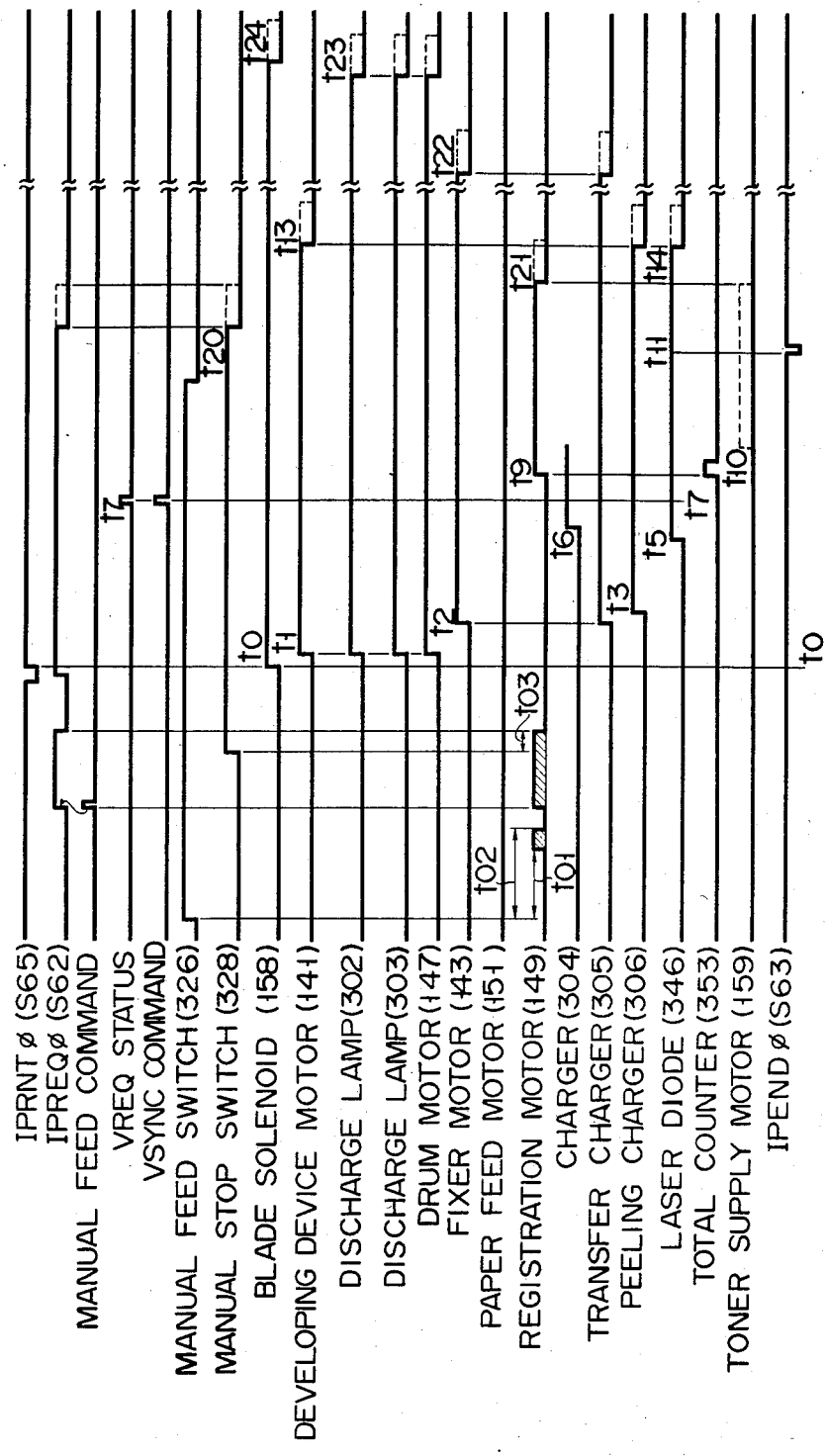
F I G. 58

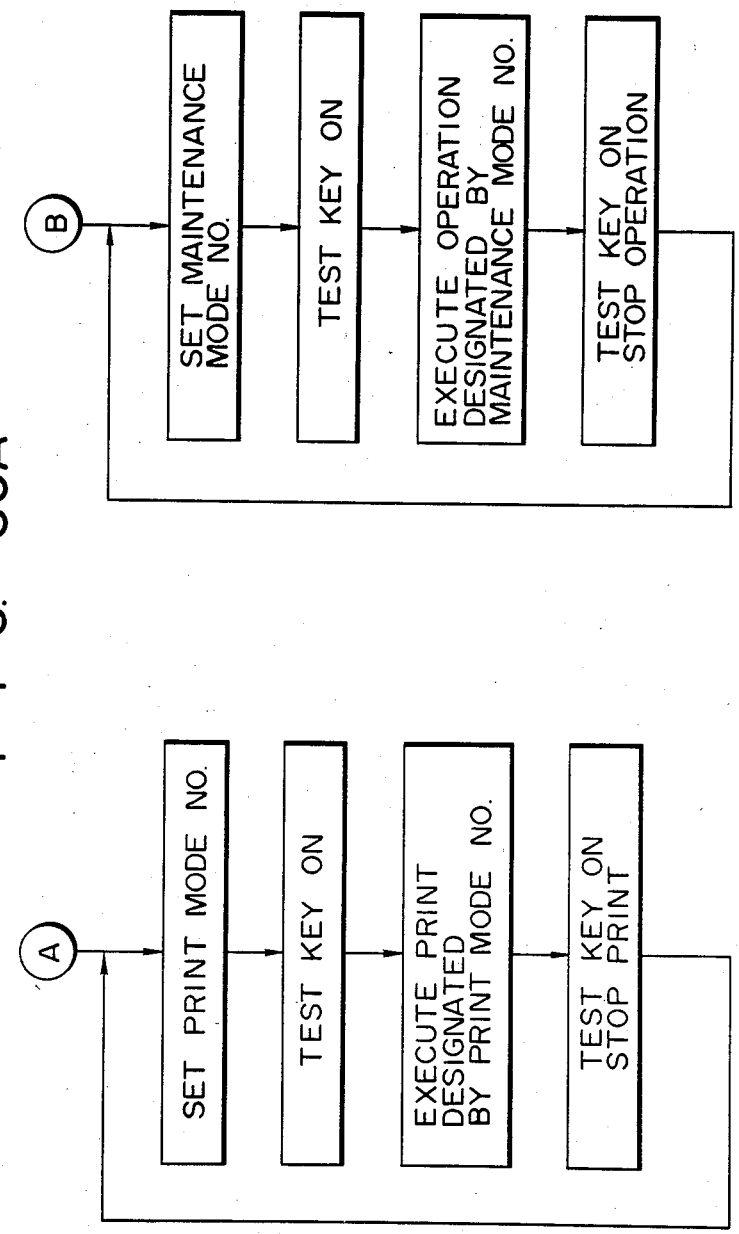

FIG. 61

| DISPLAY | ERROR CONTENTS |
|---|---|
| BLANK | SERVICEMAN NOT CALLED |
| 1 | TROUBLE IN LASER |
| 2 | TROUBLE IN HSYNC DETECTION |
| 3 | TROUBLE IN SCANNING MOTOR |
| 4 | TROUBLE IN FIXER |
| 5 | TROUBLE IN DATA-TRANSFER |
| 6 | CHANGE DRUM |
| 7 | CHANGE HEAT ROLLER |
| 8 | CHANGE DEVELOPING AGENT |

FIG. 62

| DISPLAY | MAINTENANCE CONTENTS |
|---|---|
| 0 | ALL DISPLAY ELEMENTS TURN ON |
| 1 | AUTO-ADJUST TONER |
| 2 | SUPPLY TONER |
| 3 | SCANNING MOTOR, LASER DRUM, MOTOR |
| 4 | DISCHARGER LAMPS |
| 5 | REGISTRATION MOTOR |
| 6 | PAPER FEED MOTOR |
| 7 | CHARGER |
| 8 | TRANSFER CHARGER, DEVELOPER BIAS |
| 9 | PEELING CHARGER |
| A | PAPER ABSENT PRINTING |

F I G. 63

| DISPLAY | CHANGE MODE NO. CONTENTS |
|---|---|
| 0 | BLANK |
| 1 | DRUM CHARACTERISTIC (A) |
| 2 | DRUM CHARACTERISTIC (B) |
| 3 | DRUM CHARACTERISTIC (C) |
| 4 | DRUM CHARACTERISTIC (D) |
| 5 | DRUM CHARACTERISTIC (E) |
| 6 | CHANGE HEAT ROLLER |
| 7 | CHANGE DEVELOPING AGENT |

PRINTING APPARATUS

BACKGROUND OF THE INVENTION

This invention relates to a beam scanning type recording apparatus which records dot-matrix characters or dot-matrix graphic patterns on a page of a recording medium at a time in accordance with the externally supplied recording data.

Recently, a laser printer has been developed as one of the examples of the above mentioned printers. It may be used in various fields. For example, it may be connected to a word processor for printing characters or graphic patterns according to the printing data supplied from the word processor. The laser printer has a photosensitive drum, a scanning unit for scanning the photosensitive drum with a laser beam to form a dot-matrix image on the photosensitive drum, and a transferer for transferring the drum image onto a page of the paper sheet. The laser beam, which is scanned over the photosensitive drum, is modulated in accordance with the printing data. In order to print the dot-matrix image on the drum, it is necessary to develop the supplied printing data in the page memory in the form of the dot-matrix image. This dot-matrix data is used for modulating the laser beam.

Usually, the characters are printed on the paper sheet with the upper, lower, right and left margins. In the prior art, these margins are incorporated into the recording data, i.e., the margins are also stored in the page memory as blank dots or off dots. It is not desirable to store the margins in the page memory in consideration of the operating speed of the printer and the efficiency of the memory.

SUMMARY OF THE INVENTION

It is accordingly the object of this invention to provide an improved beam scanning type recording apparatus with a simple structure and fast recording speed.

The above object is realized by a beam scanning type apparatus comprising image forming means for forming an image on a photosensitive member by scanning a given recording area of the photosensitive member with a light beam in accordance with externally supplied recording data, the recording area being determined by a recording area data; transfer means for transferring the image formed on the photosensitive member onto a recording medium; feeding means for feeding a recording medium of a given size to said transfer means, the size of the recording medium being determined by externally supplied size data; storing means for storing recording area data of respective sizes of the recording mediums; and controller means for reading out and supplying the recording area data to said image forming means in accordance with the size data.

BRIEF DESCRIPTION OF THE DRAWINGS

FIGS. 9 and 10 and 12 show data formats used in the data controller;

FIGS. 25A and 25B are, in combination, a detailed circuit diagram of a printing data write controller in FIG. 13;

FIG. 27 is a table showing the relationship between commands used in the apparatus of the present invention;

FIG. 28 is an illustrated view for explaining the contents of statuses used in the apparatus of the present invention;

FIG. 29 is a view showing the relationship between a beam scanning position and a data write position;

FIGS. 45A and 45B and 46 are detailed diagrams of data recorded in the recording apparatus shown in FIG. 13;

FIGS. 47A to 55, 56 and 60A and 60B are flow charts for explaining an operation of the overall apparatus of the present invention;

FIGS. 57 to 59 are timing charts for explaining an operation of the overall apparatus according to the present invention; and FIGS. 61 to 63 are to views showing the relationship between display numbers and their contents in the apparatus of the present invention.

DETAILED DESCRIPTION OF THE PREFERRED EMBODIMENTS

An embodiment of the present invention will be described with reference to the accompanying drawings.

Figure 1:
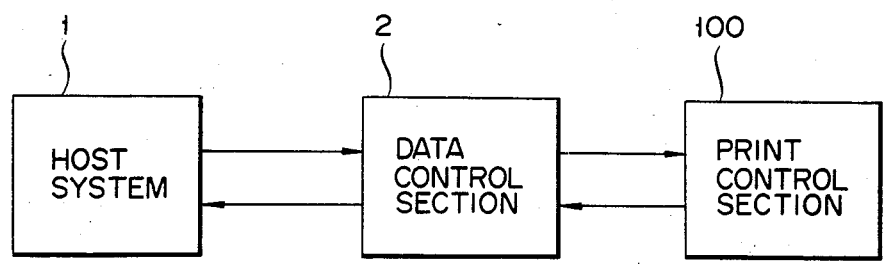
FIG. 1 is a system block diagram showing the relationship between an apparatus according to the present invention and an external device.

FIG. 1 is a block diagram of a system for recording data on a recording medium using a laser beam. Data from a host system 1 (e.g., a host computer, a word-processor, or the like) is supplied to a data controller 2. The controller 2 converts the data from the host system 1 into dot image data and stores it in a page memory.

The stored dot image data is supplied to a printing controller 100.

The input dot image data is recorded on the recording medium by modulating a laser beam, and the recorded image is developed, transferred and fixed so as to print a dot image on recording paper.

Figure 2:
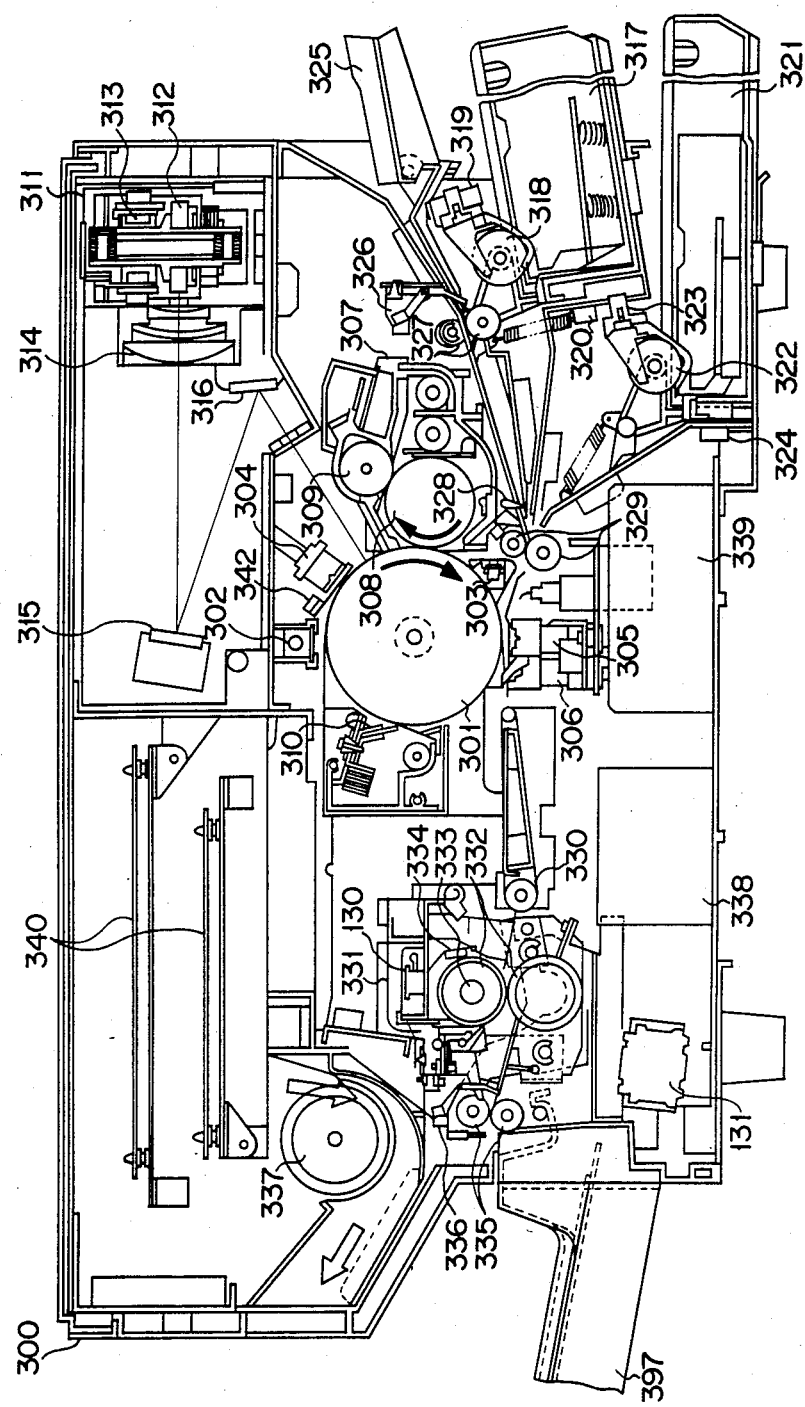
FIG. 2 is a sectional view schematically showing a printing controller (printer) in FIG. 1.

FIG. 2 shows in detail a structure of a printer 300 having a video interface. The printer 300 includes the controller 100 shown in FIG. 1.

Referring to FIG. 2, reference numeral 300 denotes a printer main body; 301, a photosensitive drum for recording data upon irradiation with a laser beam; and 302, a discharging lamp, consisting of a plurality of red LEDs, for discharing a charge on the drum 301 to an initial state. Reference numeral 303 denotes a discharging lamp for increasing transfer efficiency, which consists of a plurality of red LEDs in the same manner as in the lamp 302. Reference numeral 304 denotes a charger for evenly charging the drum 301 at a given potential; 305, a transfer charger for transferring a toner image developed on the drum 301 onto paper; and 306, a peeling charger for peeling the paper sheet on which an image is transferred from the drum 301.

Reference numeral 307 denotes a developer for developing an electrostatic latent image formed on the drum 301 by the laser beam; and 308, a magnet roller, as one component of the developer 307, for attaching the toner to the latent image formed on the drum 301. The roller 308 is rotated in the direction indicated by the arrow in FIG. 2.

Reference numeral 309 denotes an auto toner probe which contacts a developing agent of the magnet roller so as to measure a toner concentration with respect to the developing agent; and 310, a cleaning blade for removing toner left on the drum 301 after an image transfer.

Reference numeral 311 denotes a laser scanner unit, as a data recording means, for scanning and modulating the laser beams so as to record video data supplied from the controller 2 on the drum 301; 312, an octahedral polygonal mirror for guiding the laser beam emitted from a laser diode onto the drum 301; 313, a scan motor for rotating the polygonal mirror 312 at high speed; and 314, an f·θ lens for adjusting a scanning speed of the laser beam on the drum 301 to be constant. Reference numerals 315 and 316 denote reflection mirrors for guiding the laser beam from the scanner unit 311 onto the drum 301.

Reference numeral 317 denotes an upper cassette which can store up to 500 paper sheets; 318, an upper paper feed roller for picking up paper sheets from the cassette 317 one by one; 319, an upper cassette paper empty switch for detecting that the cassette 317 is empty; and 320, an upper cassette size detection switch (detecting means), having a 4-bit configuration, for detecting a size indentification mark provided on the cassette 317. Reference numeral 321 denotes a lower cassette which can store up to 250 paper sheets; 322, a lower paper feed roller; 323, a lower paper cassette empty switch; and 324, a lower cassette size detection switch. It should be noted that the lower cassette which can store up to 250 paper sheets can be loaded at the upper side. Here, the paper sheet may be called as a recording medium, since the image is recorded thereon.

Reference numeral 326 denotes a manual feed switch for detecting a paper sheet inserted through a manual guide 325 as a manual feeding means; 327, a manual paper feed roller for conveying the paper sheet after the switch 326 detects the paper sheet is manually inserted; and 328, a manual stop switch for detecting the paper sheet conveyed by the roller 327. Above rollers form a paper conveying means.

Reference numeral 329 denotes aligning rollers for synchronizing the image developed on the rotating drum 301 with the paper sheet supplied; 330, a conveyor belt for conveying the paper sheet peeled from the drum 301 by the charger 306 to a fixer; 331, a fixer for fixing the toner on the paper sheet after image transferring; 332, fixing rollers; 333, a heater lamp for heating the roller 332; 334, a thermistor for detecting a surface temperature of the roller 332; 335, paper discharge rollers; and 336, a discharge switch for detecting the paper sheet discharged from the fixer 331.

Reference numeral 337 denotes a cooling fan for cooling the interior of the printer 300; 338, a high voltage transformer for generating a high voltage applied to the chargers 304, 305 and 306, the developer 307 and the magnet roller 308; 339, a power source unit for generating a DC voltage used for controlling the respective components; and 340, a PC board unit for controlling the printer 300.

Reference numeral 342 denotes a drum temperature sensor for detecting the temperature of the photosensitive drum 301, in which a thermistor having a very low heat resistance is used.

Figure 3:
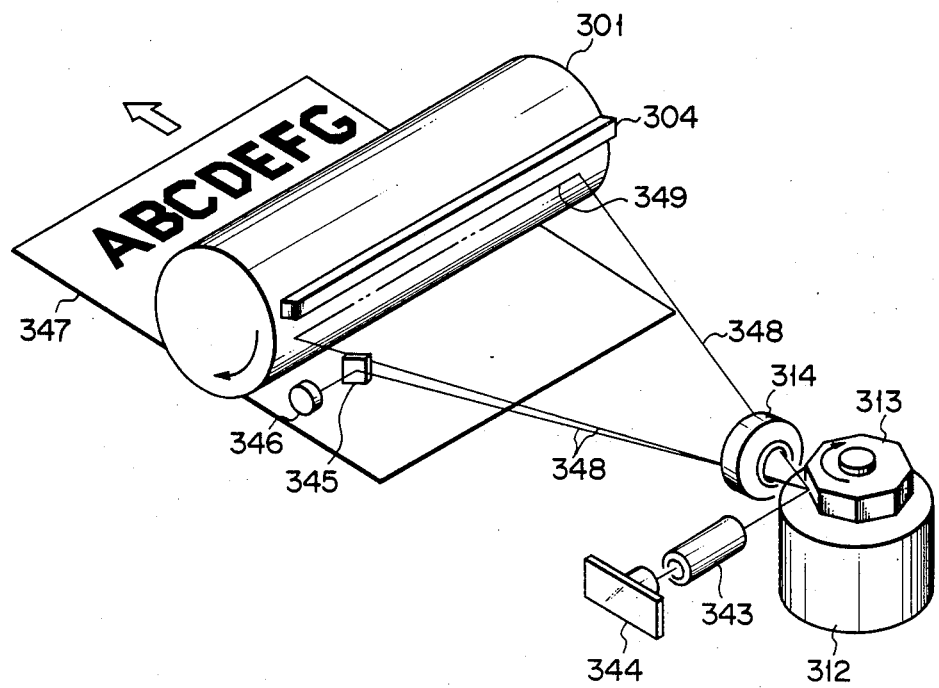
FIG. 3 is a perspective view showing the relationship between a laser scanner unit in FIG. 2 and a recording photosensitive member.

FIG. 3 is a perspective view schematically showing a main part of the device for recording data on the photosensitive drum 301. Referring to FIG. 3, a laser beam emitted from a semiconductor laser 344 is collimated into a parallel beam by a collimator lens 343, and the parallel beam is incident upon one of eight faces of the polygonal mirror 313. Since the polygonal mirror 313 is rotated at high speed in the direction indicated by the arrow, the laser beam incident thereon through the f·θ lens 314 has a beam scanning range 348 from the left to the right. Part of the laser beam within the range 348 is guided to a beam detector 346 by a reflection mirror 345. Therefore, the detector 346 detects the scanning laser beam every time horizontal scanning is performed by means of one face of the polygonal mirror 313. The laser beam in the range 348 which is not incident on the reflection mirror 345 is radiated on the drum 301. In FIG. 3, reference numeral 349 denotes a portion of the drum 301 on which the laser beam is radiated; 304, the charger; and 347, a paper sheet. As shown in FIG. 2, in the actual printer, the laser beam which passes through the f-θ lens 314 is not radiated on the drum 301, but is guided to the drum 301 by the reflection mirrors 315 and 316. However, for the sake of simplicity, neither of the mirrors 315 and 316 are shown in FIG. 3, and FIG. 3 is illustrated as if the laser beam passing through the f-θ lens 314 is directly incident upon the drum 301.

Figure 42:
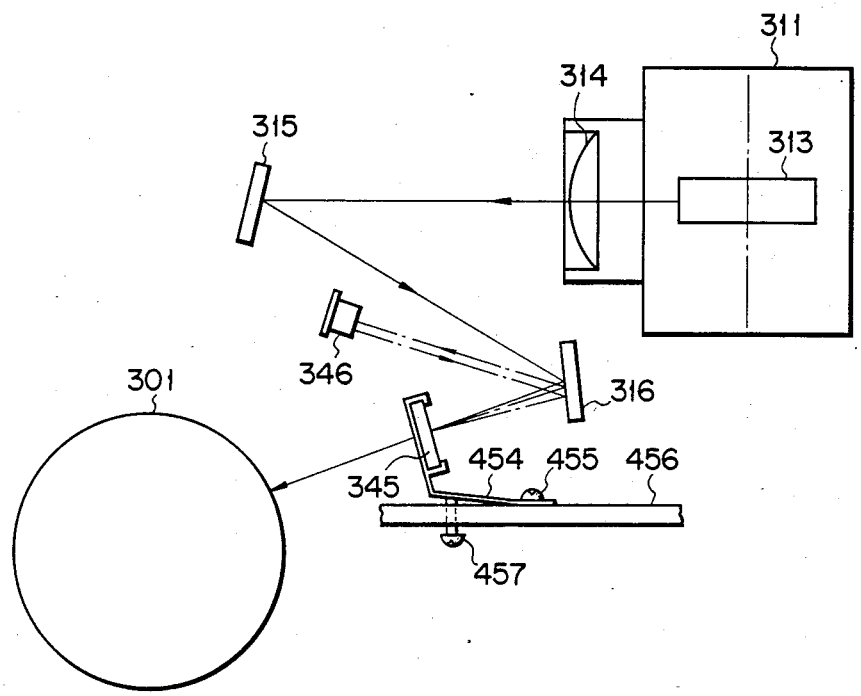
FIG. 42 is a schematic view showing the laser scanner unit and the photosensitive member in FIG. 2.

An arrangement of the reflection mirror 345 will be described with reference to FIG. 42. As shown in FIG. 42, the mirror 345 is fixed to a supporting member 456 positioned outside a beam irradiation region through a leaf spring 454 by a screw 455. A fine adjusting screw 457 is provided at a lower portion of the spring 454, thereby changing an angle of the mirror 345.

As can be seen from FIG. 2, the laser scanner unit shown in FIGS. 3 and 42 is shielded from an external portion so as not to leak a scanning beam. A beam detection result from the detector 346 is displayed at a proper position of a scanning panel shown in FIG. 6.

Figure 4:
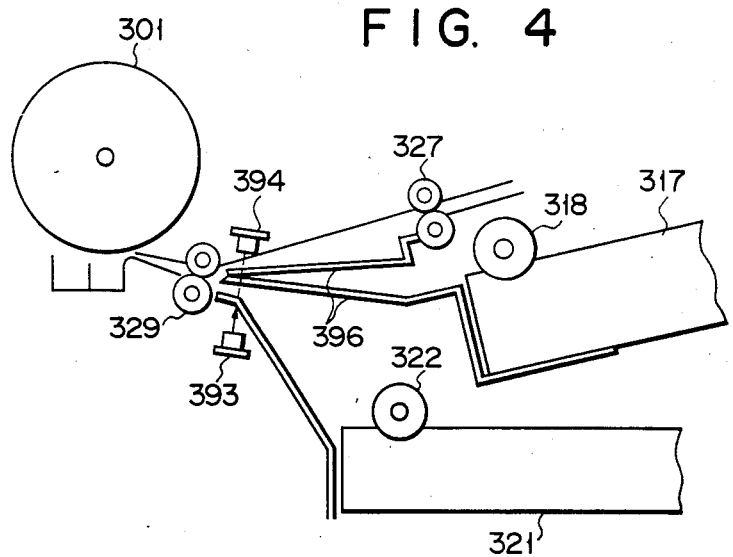
FIG. 4 is a schematic view showing a paper feed portion in FIG. 2.

FIG. 4 is a view for explaining an aligning roller front pass sensor 394. The manual stop switch 328 shown in FIG. 2 only detects manual feed, but the sensor 394 detects paper sheets fed from the cassettes. Referring to FIG. 4, a paper sheet fed from either the upper or lower cassettes 317 and 321 through either the upper or lower paper feed rollers 318 and 322 is fed to the aligning roller 329 along a paper guide plate. In this case, when paper feeding is normally performed, light emitted from a light-emitting diode 393 is shielded by the paper sheet and is not incident on the sensor 394, thus indicating that the paper sheet has been fed. When the paper feeding is abnormally performed, since the paper sheet cannot reach a position of the sensor 394, the light emitted from the light-emitting diode 393 is kept incident upon the sensor 394, thus indicating that no paper has been fed.

Figure 5:
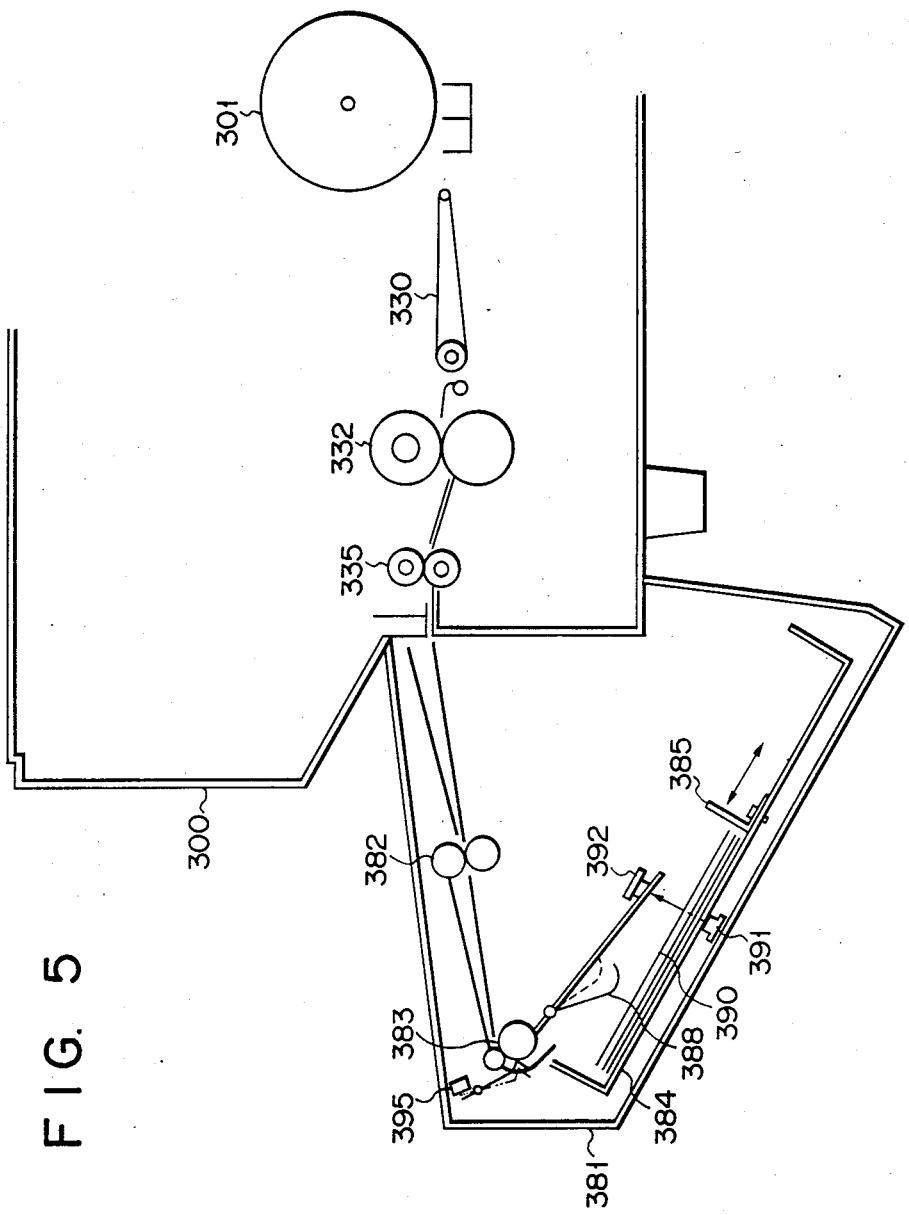
FIG. 5 is a schematic view showing an example of a paper exhaust portion in FIG. 2.

FIG. 5 schematically shows an optional reverse tray 381. Normally, a non-reverse type tray 397 is loaded, into the printer 300. When the non-reverse type tray is used, the paper sheet printed first is stacked at the lowermost position. For this reason, since data must be supplied from its last page from a data supplying apparatus (the host system 1), a data filing process of the host system 1 is complex. Therefore, in order to overcome this drawback, the reverse tray 381 is needed.

Referring to FIG. 5, the paper sheet passing through the discharge rollers 335 of the printer 300 is conveyed onto a tray 384 by conveyor rollers 382 and 383 in a state reversed to that when it passed through the discharge rollers 335. Therefore, although the first page is positioned lowermost, since the printed surface faces downward, when the printed surfaces of the paper sheets are turned over, pages of the printed paper sheets can be stacked in the order printed, thus eliminating the drawback of the non-reverse type tray 397. Note that in FIG. 5, reference numeral 385 denotes a paper stopper which can be slid in accordance with a length of the paper sheet along a paper conveying direction. Reference numeral 388 denotes an actuator for pressing the paper sheets stored on the tray 384 so as to keep them flat thereon; 395, a discharge switch for detecting that the paper sheets are normally stored on the tray 384; 391, a light-emitting diode (LED) for detecting a presence/absence of the paper sheets in the tray 384; and 392, a tray sensor at a light-reception side. When paper sheets 390 are present in the tray 384, light is not radiated on the sensor 392, but when the paper sheets 390 are absent, light is radiated on the sensor 392, thereby detecting the presence/absence of the paper sheets 390.

Figure 44:
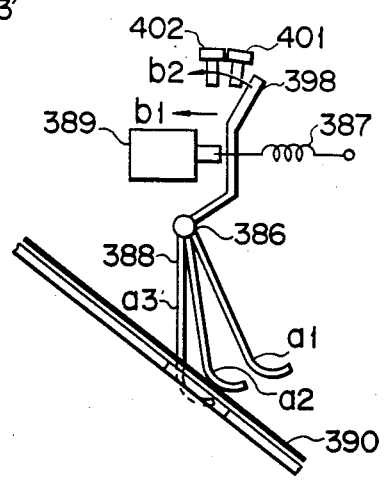
FIG. 44 is a view showing a modification of an exhaust tray shown in FIG. 5.

FIG. 44 shows an example of another arrangement of a detector for detecting a presence/absence of the paper sheets and for detecting that a tray is full. The actuator 388 is provided to be pivotal about a fulcrum 386 and a lever 398 is provided thereabove to be interlocked with the actuator 388. The distal end of the lever 398 is biased in one direction by a solenoid 389 as a separating means and a coil 387 as a releasing means. The lever 398 is moved in accordance with a storing state of the paper sheet in a paper storage unit 390, and the storing state is detected by a detecting means, e.g., a plurality of (two, in this case) sensors 401 and 402. A position all of the actuator 388 corresponds to a "paper full" state; a2, a "paper present" state; and a3, "paper empty" state. The separating means 389 separates the actuator 388 at least when the paper sheet 390 is being discharged into the tray 384. When the presence/absence of the paper sheets is detected, for example, during the printing operation or the standby state, the solenoid 389 is turned off in synchronism with a current state signal, thereby releasing the actuator 388 to detect the paper sheets. For this reason, a discharge operation can be satisfactorily performed without abutting the distal end of the paper sheet 390 against the actuator 388 when discharged.

The paper sheets fed into the discharge tray are detected by the discharge switch 395 one by one, and are counted by a paper discharge memory counter (to be described later; RAM 107 in FIG. 13), thus detecting the number thereof. In the "paper full" state, a tray full lamp 358 shown in FIG. 6 is illuminated, and the above-mentioned memory counter is cleared.

Figure 6:
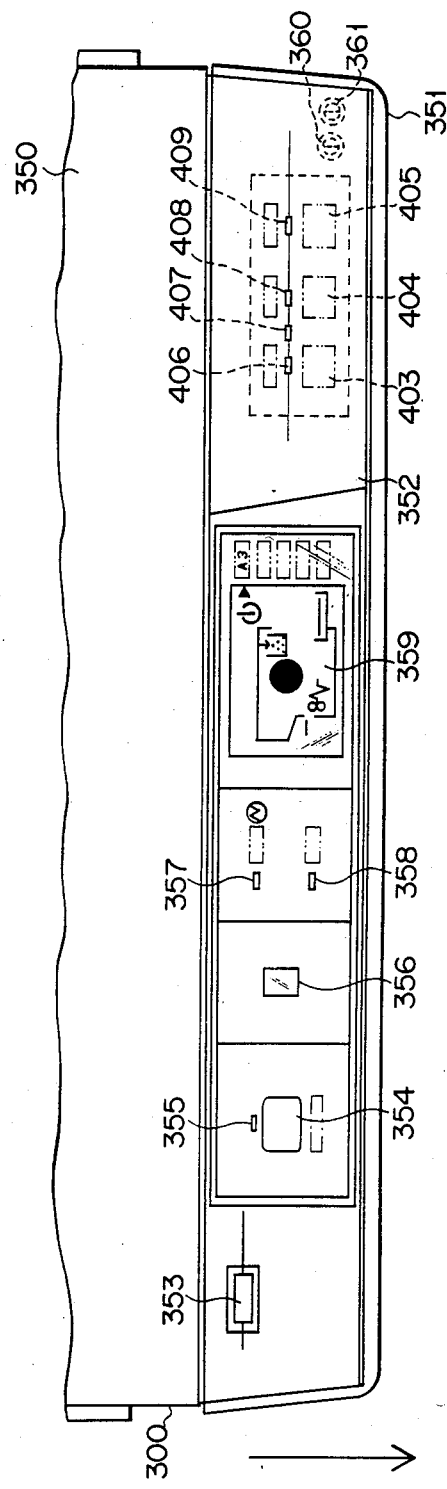
FIG. 6 is a plan view showing an operation panel portion of the apparatus according to the present invention.

FIG. 6 shows an operation panel of the printer 300 in detail.

Referring to FIG. 6, reference numeral 350 denotes a top cover of the printer 300; 351, a front cover; and 352, a maintenance cover. The front over 351 is opened in a direction indicated by the arrow when a paper jam occurs or when toner replenishment is needed. The maintenance cover 352 can be opened upward only when the front cover 351 is opened in the direction indicated by the arrow, thus preventing an erroneous operation by an operator.

Reference numeral 353 denotes a 6-digit mechanical counter which is incremented every time a printing operation for one paper is completed. Reference numeral 354 denotes a selection switch for selecting an on-line or off-line mode; 355, a selection lamp illuminated in the on-line mode; 356, a numeric display, comprising a one-digit seven-segment LED, for displaying an error content in a service man call mode and a mode number in a maintenance mode; 357, a power source lamp for indicating that the printer 300 is powered; 358, a tray full lamp signaling that the tray 384 has been filled to capacity; and 359, a color LCD display for displaying the detailed operating state of the printer. The above-mentioned components from the counter 353 to the display 359 are always operated or displayed. A portion which cannot be operated unless the maintenance cover 352 is opened will be described below. The following portion is operated only by a service man.

Reference numeral 403 donottes a maintenance switch for selecting maintenance and replace modes; 406, an indicator lamp for indicating that the maintenance mode is selected; 407, an indicator lamp for indicating the replace mode has been selected; 404, a selection lamp for selecting operating modes in the respective modes; 408, a selection lamp indicating that selection by the switch 404 can be performed; 405, a test switch for selecting the test print mode and for executing operations in the maintenance, replace and test print modes; 360, a main exposure adjusting volume control (to be described later); and 361, a shadow exposure adjusting volume control. The controls 360 and 361 can be rotated only by using an adjusting driver when the maintenance cover is open, and cannot be manually rotated.

Figure 7:
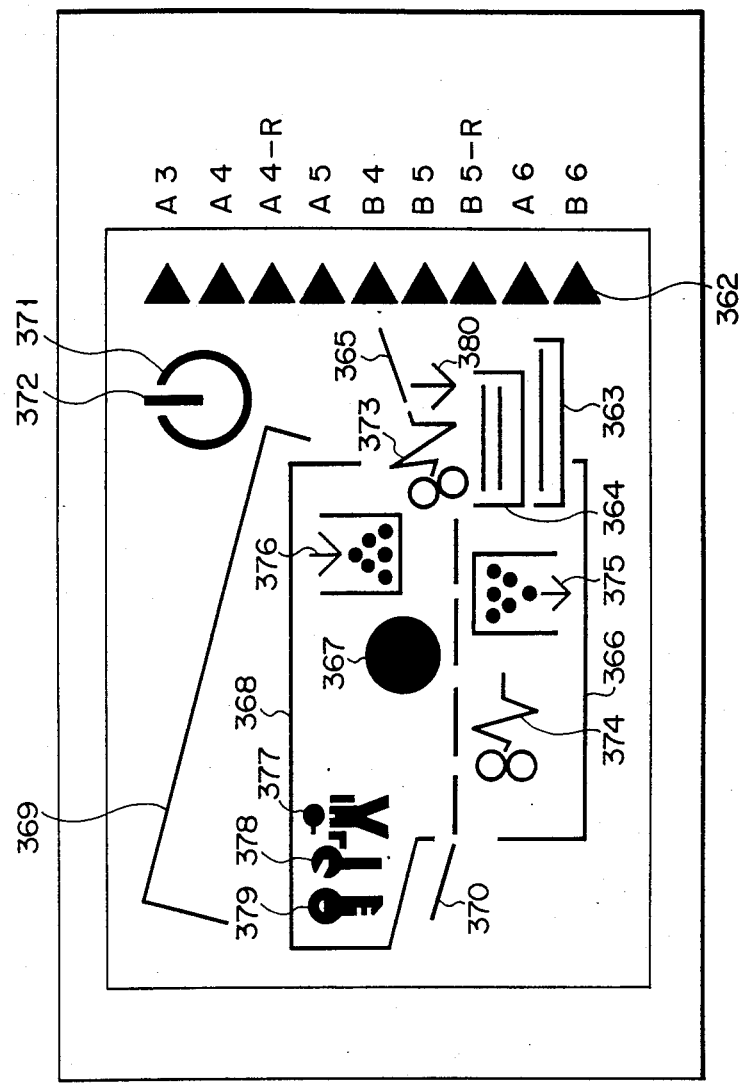
FIG. 7 is an enlarged plan view of a display portion in FIG. 6.

FIG. 7 shows the LCD display 359 in detail. Functions of respective display segments will be described hereinafter.

Reference numerals 371 and 372 denote segments representing standby and ready modes of the printer 300. In the standby mode, until the fixer is switched to the ready mode, both the segments 371 and 372 are turned on; in the ready mode, only the segment 371 is turned on, and in the printing mode, both the segments 371 and 372 are turned off.

A segment 373 is turned on and off when a paper jam occurs in a paper feeding unit. In this state, a segment representing a paper feeding state is also turned on and off. That is, in the manual feed mode, a manual feed segment 365 is turned on and off, in the upper cassette mode, an upper cassette segment 364 is turned on and off, and in the lower cassette mode, a lower cassette segment 363 is turned on and off. A segment 374 is turned on and off when the paper jam occurs in a conveying system (the aligning rollers 329 and thereafter). In this case, the above paper feed segment is similarly turned on and off. A segment 375 is turned on and off when a toner bag (not shown) which stores toner recovered by the cleaning blade 310 shown in FIG. 2 is full. A segment 376 is turned on and off when there is no toner in a toner hopper (not shown) of the developer 307. Segments 377 and 378 are turned on and off when a service man error (to be described later) occurs. A segment 379 is turned on and off when an operator call (to be described later) occurs. A segment 380 is turned on and off when the selected cassette has no paper. A segment 362 indicates the size of the selected paper. For example, when the upper cassette side has been selected and the cassette loaded at the upper side is for A4 length paper, "A4-R" is illuminated, or when A6-size paper is selected in the manual feed mode, "A6" is illuminated. The segment 363 is illuminated when the lower side cassette is selected, the segment 364 is illuminated when the upper side cassette is selected, and the segment 365 is illuminated when the manual feed mode is selected. A segment 366 illustrates an outer shape of the printer 300 and is always illuminated. A segment 367 illustrates the photosensitive drum 301 which is always illuminated. A segment 368 illustrates an upper portion of the printer 300 which is always illuminated except when a paper jam occurs. Segments 369 and 368 are alternately illuminated when a paper jam occurs in the conveying system (when the segment 374 is turned on and off). Reference numeral 370 denotes five segments for representing the conveying state of the paper, which are illuminated from the right to the left in accordance with the movement of the paper.

Figure 8:
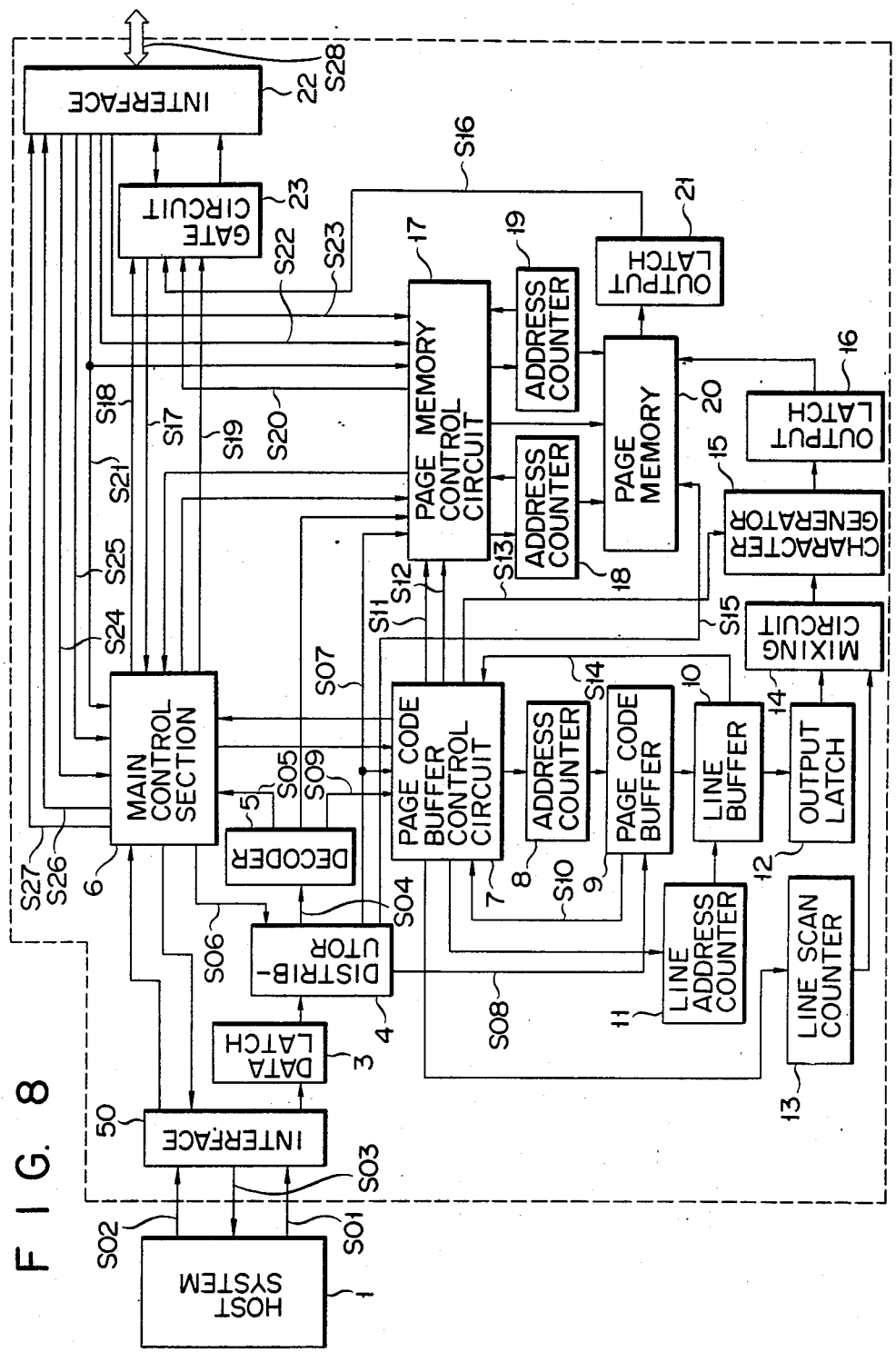
FIG. 8 is a block diagram showing an example of a data controller of FIG. 1.

FIG. 8 is a schematic block diagram of the data controller 2 shown in FIG. 1. In the controller 2, character code data and image data supplied from the host system 1 are subjected to data conversion, and thereafter are stored in a page memory 20 in the form of dots which correspond to a printing area of the paper sheet. The data stored in the page memory 20 is supplied to the printer 300, thus initiating the printing operation.

The controller 2 can receive two types of data. One type is character code data (JIS 8-bit code or the like), and in this case, a character pattern corresponding to the character code is generated by a character generator 15 and dot data corresponding thereto is stored in the memory 20. The other type is image data, and in this case, since it is input as dot data, it is directly stored in the memory 20. A schematic configuration of the controller 2 will be described with reference to FIG. 8.

The data from the host system 1 is supplied to an interface 50 through a signal line S01 and is stored in a data latch 3.

A signal line S02 connecting the interface 50 and the host system 1 serves as a signal line for a strobe signal and the other control signals. A signal line S03 supplies a busy and status signals form the data controller 2 to the host system 1.

FIGS. 9 and 10 show formats of data supplied from the host system 1. FIG. 9 shows an example of a format of the character code data which has a character identification code for indicating the character code data and a paper size code representing a paper size of paper to be printed at the beginning of the data for one page. Then, the character code data are stored in the order of a 1st line, 2nd line, . . . , nth line and an END code representing a data end of the page is stored last. The character code data for one line consists of a code representing a character size, a character code, and an LF code representing a division of one line data.

FIG. 10 shows a format of the image data which has an image identification code representing image data and a paper size identification code representing a paper size to be printed at the beginning of the data for one page. Then, the image data are subsequentlly stored in the order of a 1st line, 2nd line, . . . , mth line. Since the data for one line is designated by paper size identification data, when the designated data is counted by the controller 2, it can be automatically discriminated.

Input data through a distributor 4 is processed as follows. The data received by the distributor 4 is always supplied to a decoder 5 through an output line S04. The procedure in the case of character data will be described first. When the character identification code is supplied to the decoder 5, an output from the decoder 5 is supplied to a main controller 6 through a signal line S05. When the controller 6 discriminates that the input data is character code data, it instructs the distributor 4 through a signal line S06 to input the next paper size data in a page code buffer controller 7. Therefore, the paper size code is input to the page code buffer controller 7 through a signal line S07 by the distributor 4. The following data for 1st, 2nd, . . . , and nth lines are supplied to a page code buffer 9 by the distributor 4 through a signal line S08. At this time, the character code data is stored in a memory area of the buffer 9 designated by an address counter 8. When the character code data for one page has been stored in the buffer 9 and the decoder 5 detects the END code shown in FIG. 9, the decoder 5 generates an END code code buffer controller 7 through signal lines S05 and S09, respectively. When the controller 7 detects through the signal line S09 that the input operation of the character code data for one page in the buffer 9 is completed, the data are stored in the memory 20 in units of dots.

Figure 11:
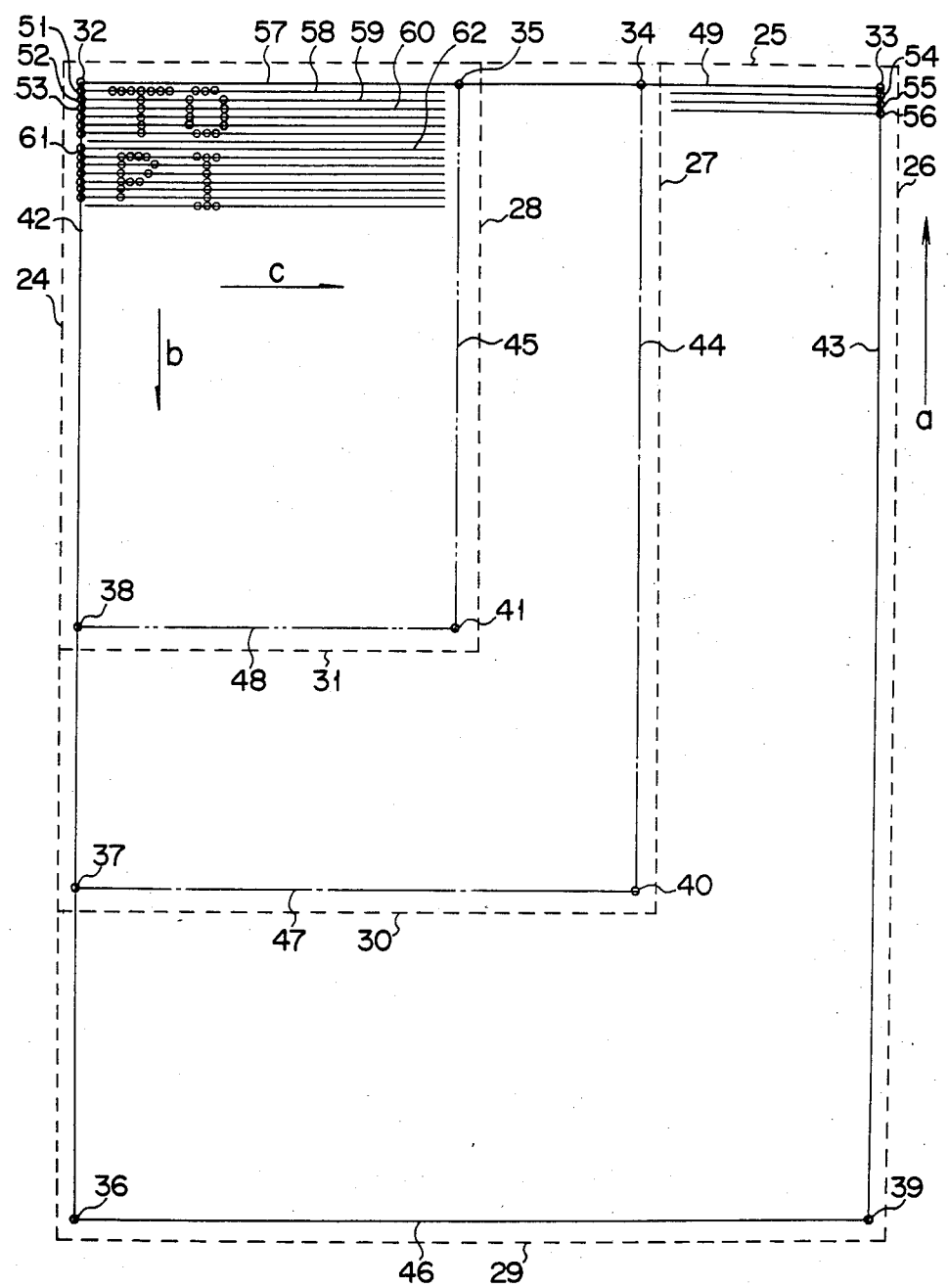
FIG. 11 is a view showing the correspondence between a recording portion in the data controller and paper sheets.

FIG. 11 shows the correspondence between a memory area and the paper sheet. In FIG. 11, broken lines represent outer shapes of paper sheets of respective sizes. Reference numeral 25 denotes a leading end of right end of A5-size paper; 27, a right end of A4-size paper; 26, a right end of A3-size paper; 31, a rear end of the A5-size paper; 30, a rear end of the A4-size paper; and 29, a rear end of A3-size paper. Reference numeral 32 donodtes a point of a common address ADR (0, 0) of a reading address counter 19 and a writing address counter 18. It should be noted that the address ADR (0, 0) represents a vertical address (ADRV) "0" and a horizontal address (ADRH) "0". The address counters 18 and 19 have vertical addresses (ADRV) and horizontal addresses (ADRH). Reference symbols ADRV denotes the vertical addresses (indicated by an arrow b in FIG. 11); and ADRH, the horizontal addresses (indicated by an arrow c in FIG. 11).

Reference numeral 43 denotes a last horizontal address (A3HE) of the A3-size paper; 44, a horizontal address (A4HE) of the A4-size paper; and 45, a horizontal address (A5HE) of the A5-size paper. Similarly, reference numeral 46 denotes a last vertical address (A3VE) of the A3-size paper; 47, a vertical address (A4VE) of the A4-size paper; and 48, a vertical address (A5VE) of the A5-size paper. Reference numeral 33 denotes a point ADR (0, A3HE) where the vertical address ADRV of the A3-size paper is 0 and the horizontal address ADRH is A3HE. Similarly, reference numeral 34 denotes a point ADR (0, A4HE); and 35, a point ADR (0, A5HE). Reference numeral 36 denotes a point ADR (A3VE, 0) where the vertical address ADRV of the A3-size paper is A3VE and the horizontal address ADRH is 0. Similarly, reference numeral 37 denotes a point ADR (A4VE, 0); and 38, a point ADR (A5VE, 0). Reference numeral 39 denotes a point ADR (A3VE, A3HE) where the vertical address ADRV of the A3-size paper is A3VE and the horizontal address ADRH thereof is A3HE. Reference numeral 40 denotes a point ADR (A4VE, A4HE); and 41, a point ADR (A5VE-, A5HE). The dot image data of the character pattern is stored in the page memory 20 with the above memory area in the following manner. The character size data for the 1st line is fetched from the buffer 9 by the controller 7 through a signal line S10. A basic font of this embodiment consists of 40×40 dots or 32×32 dots. The page code buffer controller 7 discriminates the character size in accordance with the fetched character size code, and a discrimination signal is supplied to a memory controller 17 and the character generator 15 through signal lines S11 and S13, respectively. In response to the discrimination signal, the page memory controller 17 controls a line feed pitch and a character pitch, and the character generator 15 switches a character size area.

The character code following the character size data is transmitted in an area, designated by a line address counter 11, of a line buffer 10 having a memory capacity of one line. When the data transmission of the character code data for one line to the line buffer 10 is completed, the line address counter 11 is reset at an initial address (0). First, the data for a first line perpendicular to the vertical direction of a character font (i.e., a line 57 in FIG. 11) is written in the page memory 20. Note that a line/scan counter 13 is set at an initial value (0, 0), and the writing address counter 18 is set at ADR (0, 0). The character code data in the line buffer 10 are read from the first digit thereof at a predetermined cycle, and are sequentially latched in an output latch 12 so as to be synchronized with the line counter 13. When the first character code (in this embodiment, a letter "T") is latched in the output latch 12, the character code and the output from the line/scan counter 13 are synthesized by a synthesizing circuit 14 and the synthesized data is supplied to the character generator 15 as a character pattern selection code thereof. An arrangement of the line/scan counter 13 will be described below. The upper 6 bits of the consisting 40×40 dots, the counter 13 counts 0 to 39 and the line feed control pitch lines, and then returns to "0" the number of. On the other hand, the lower 3 bits of the counter 13 are used as a counter for the horizontal direction of the character pattern. In the case of the character consisting of 40×40 dots, the counter 13 counts 0 to 4 and the character pitch control digits (because the output of the generator 15 consists of 8 parallel bits), and then returns to "0" the number of.

Printing operation for the characters, each consisting of 40×40 dots which are spaced each other by 8 bits along both the vertical and horizontal directions will bedescribed hereinafter. As has been described above, when the first character code ("T") is latched in the output latch 12, the character code and the output from the line/scan counter 13 are synthesized by the synthesizing circuit 14 and the synthesized data is supplied to character the generator 15 as the character pattern selection code thereof. At this time, since the count of the line/scan counter 13 is (0, 0), data (8 bits) of the "0"th line along the vertical direction and "0"th digit along the horizontal direction is generated from the character generator 15. The output data from the character generator 15 is temporarily latched in an output latch 16 so as to synchronously control the data writing into the memory 20, and is written by the page memory controller 17 at an address in the memory 20 designated by the writing address counter 18. In this case, since a count of the counter 18 is ADR (0, 0), the data is written at the vertical address "0" and the horizontal address "0". When the writing of the character pattern for 1 byte is completed, the count of the line/scan counter 13 is changed to (0, 1), and that of the counter 18 is also changed to ADR (0, 1). Therefore, data of the "0"th line along the vertical direction and the 1st digit along the horizontal direction is generated from the character generator 15 and is latched in the output latch 16 in the same manner as described above. Thereafter, the data is written in the address ADR (0, 1) in the memory 20. In this manner, when the last data of the "0"th line along the vertical direction for one character (4th data) has been written, the count of the line/scan counter 13 is changed to (0, 5) and that of writing address counter 18 is also changed to ADR (0, 5). Since the characters are spaced each other by 8 dots (1 byte) in the horizontal direction, all the output from the character generator 15 is forcibly turned into "0" by an instruction from the page code buffer controller 7, and "0" is written in the address ADR (0, 5) in the page memory 20. After completing the writing, the line address counter 11 is incremented by "1", and the next character code from the line buffer 10 is set in the latch 12. In this case, the count of the line/scan counter 13 is (0, 0), and that of the counter 18 is ADR (0, 6). Therefore, the writing of the "0"th character pattern of the "0"th line along the vertical direction of the character "0" is performed next. At this time, counts of the writing address counter 18 are sequentially counted up, i.e., ADR (0, 6), (0, 7), (0, 8), (0, 9), (0, A), and the character pattern data of "0" are respectively written in the designated addresses. When the count of the writing address counter 18 reaches (0, B) and that of the line/scan counter 13 reaches (0, 5), "0" is written in the memory 20 in the same manner described above. After completing the writing, the line address counter 11 is incremented by "1", and the next character code is set in the latch 2 from the buffer 10.

The count of the line/scan counter 13 becomes (0, 0) and that of the writing address counter 18 becomes ADR (0, C). In this manner, the character pattern data of the "0"th line along the vertical direction is written in the memory 20. When the "LF" code appears as the output of the buffer 10, an "LF" code detection signal is supplied to the page code buffer controller 7 through an output line S14, thus disabling the writing of the character patterns from the character generator 15. The count of the writing address counter 18 is sequentially incremented by "1" and "0s" are forcibly written in the page memory 20. Now assuming that the A3-size paper is designated, when the count of the counter 18 reaches the address ADR (0, A3HE), i.e., the point 33 in FIG. 11, after the above forcible "0s" writing operation, the count of the counter 18 is set at ADR (1, 0), that of the line address counter 11 is set at 18(0), and that of the line/scan counter 13 is set at (1, 0). In addition, "T" as the first character code from the line buffer 10 is set in the output latch 12. Thus, the character pattern data of the first line along the vertical direction is written in the page memory 20. In this manner, when the writing of the character pattern data of second, third, ... 39th lines is completed, the counts of the counters 18, 11 and 13 are set at ADR (28, 0), (0) and (28, 0), respectively. As described above, the writing of the character pattern data for one line is completed. Since the line feed pitch is every 48 lines, "0s" are forcibly written in the memory 20 for the remaining 8 lines. When the writing of "0s" for 8 lines is completed, the count of the writing address counter 18 is set at the point 61 in FIG. 11, i.e., ADR (30, 0), and that of the line address counter 11 is set at (0), and that of the line/scan counter 13 is set at the initial value (0, 0). Thus, the write operation including the line feed pitch for one line is completed. The second line character code data is then transmitted from the page code buffer 9 to the line buffer 10. When transmission of the character code data is completed, the count of the line address counter 11 returns to the initial address (0). Thereafter, the writing operation of the character pattern data for the second line is performed in the same manner as that for the first line. Therefore, when the writing operation of the character pattern data of the second line is completed, the count of the writing address counter 18 is set at ADR (60, 0), that of the line address counter 11 is set at (0), and that of the line/scan counter 13 is set at (0, 0). In this manner, the character codes for each line are sequentially converted into the pattern data and are written in the page memory 20. When the line buffer 10 detects the "END" code indicating the last line, the data writing operation of the character patterns is stopped. The output of the character generator 15 is forcibly turned into "0" by the page code buffer controller 7 through the signal line S13, and a write end signal indicating the completion of the character pattern data write operation is supplied to the page memory controller 17. In response to the write end signal, the controller 17 writes "0s" in the remaining memory area designated in the page memory 20 up to the last memory address (e.g., in the case of the A3-size paper, the point 39 in FIG. 11, i.e., ADR (A3VE, A3HE)). The page memory controller 17 writes "0" at the point 39 in FIG. 11 and completes all the writing operation of the character pattern data for one page of the designated paper size. The counters 18, 11 and 13 are initialized, i.e., set at ADR (0, 0), (0), and (0, 0), respectively.

Next, a printing operation will be described wherein the data supplied from the host system 1 is image data. When the image identification code shown in FIG. 10 is supplied to the decoder 5, the output from the decoder 5 is supplied to the main controller 6 through a signal line S05. The main controller 6 discriminates that the supplied data is the image data, and instructs the distributor 4 through the signal line S06 to supply the next paper size data to the page memory controller 17. Therefore, the paper size data is supplied to the controller 17 from the distributor 4 through a data line S07. The following image data 1, 2, ..., m are supplied to the page memory 20 from the distributor 4 through a data line S15. The image data is supplied to the memory 20 in the following manner. When the page memory controller 17 receives the paper size discrimination code, it sets the count of the writing address counter 18 at ADR (0, 0) so as to write the following data from the point 32 (address ADR (0, 0)) in FIG. 11. A data length corresponding to the length of the horizontal line is determined with reference to a table in the page memory controller 17. Therefore, assuming that the paper size of the image data to be supplied to the page memory 20 is "A4", the data length corresponding to one line is determined to be the count up to the point 44 (A4HE), i.e., "A4HE". Needless to say, since the data length corresponding to the image data for one line is "A4HE", the data length of the image data 1, 2, ..., m is also "A4VE", and the number m of the image data is "A4VE", i.e., the point 47 (A4VE) of FIG. 10. Therefore, the image data 1 shown in FIG. 10 corresponds to the data between the point 32 ADR (0, 0) and the point 34 ADR (0, A4HE) in FIG. 11, the image data 2 corresponds to the line starting from the point 51, the image data 3 corresponds to the line starting from the point 52, ..., and the image data m corresponds to the line starting from the point 37. Therefore, the end address is the point 40 ADR (A4VE, A4HE). In this manner, the image data is written into the page memory 20 upon controlling the writing address counter 18.

The character pattern data 13 (image data) written in the page memory 20 designated by the read address counter 19 are sequentially transmitted to the printing controller 100 through an output latch 21, a gate circuit 23, and an interface 22 via an interface bus S17 so as to be printed. Referring to FIG. 8, reference symbol S17 denotes a status data line from the printing controller 100; S18, a command data line for designating an operation mode to the controller 100; S19 and S20, strobe signal lines for transmitting command data and printing data; S21, a busy signal line from the controller 100; S22, a horizontal synchronizing signal line from the controller 100; S23, a page end signal line for indicating an end of the printing data; S24, a ready signal line of the controller 100; S25, a print request signal line for indicating a print enable state; S26, select signal lines (two lines) for designating a data content of the data line in the interface bus S17; and S27, a print start signal line for initiating the printing operation with respect to the controller 100.

A data transmission mode to the printing controller 100 will be described hereinafter in more detail. In response to the print start signal S27 from the data controller 2, the printing controller 100 supplies the horizontal synchronizing signal S22. In response to the signal S22, the data of the line starting from the point 32 in FIG. 11 is transmitted first, and in response to the next horizontal synchronizing signal S22, the data corresponding to the line starting from the point 51 is transmitted. Therefore, the reading address counter 19 is incremented by one line in accordance with the horizontal synchronizing signals S22. This operation is repeated until the page end signal S23 is received from the printing controller 100, and the data in the designated area in the page memory 20 is transmitted to the controller 100. In response to the page end signal S23, the data transmission is stopped. The printing controller 100 generates the page end signal S23 at the same timing as that of the horizontal synchronizing signal S22. In view of the correspondence with the memory areas shown in FIG. 11, the controller 100 generates the page end signal S23 in synchronism with or before the timing at which the data at the point 46 is read out in the case of the last line of the A3-size paper, or at which the data at the point 47 is read out in the case of the last line of the A4-size paper.

When the printing data is transmitted from the page memory 20, the page memory controller 17 compares the counts in the counters 19 and 18. If the count of the reading address counter 19 is larger than that of the writing address counter 18, the controller 17 is controlled so as to enable the writing operation with respect to the memory area from which all the data has been transmitted. Therefore, the time required for writing data in the memory 20 can be reduced.

Figure 13:
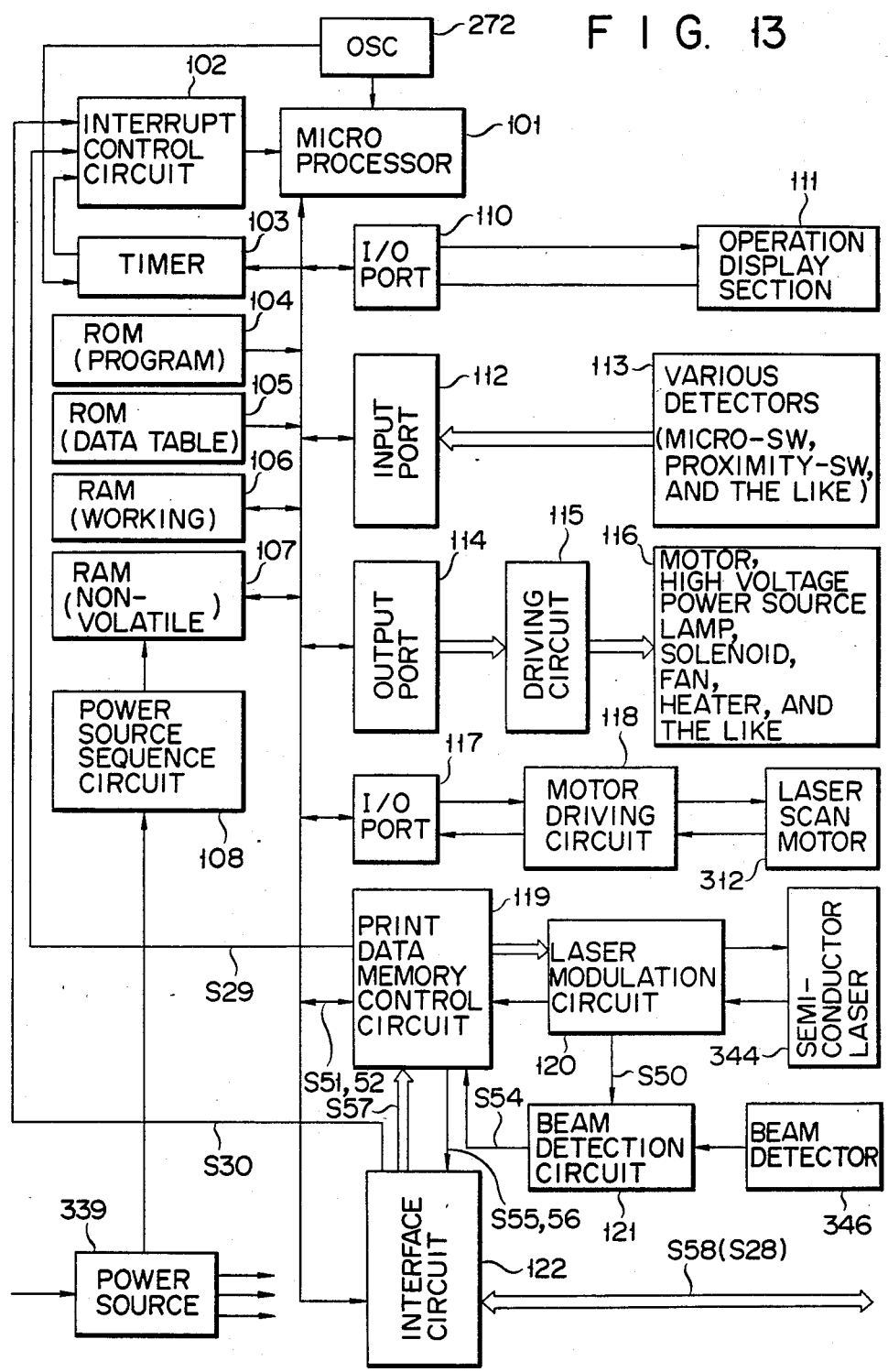
FIG. 13 is a block diagram of the printing controller in FIG. 1.

FIG. 13 shows a block diagram of the printing controller 100 shown in FIG. 1. Referring to FIG. 13, reference numeral 101 denotes a microprocessor for controlling respective units in the controller 100; and 102, an interrupt controller for controlling interruption with respect to the microprocessor 101. The controller 102 supplies to the microprocessor 101 interrupt request signals respectively supplied through a command signal line S30 from an interface circuit 122, a page end signal line S29 from a printing data writing controller 119, and through a time out signal line S28 from a timer 103. Reference numeral 103 denotes the timer for generating a reference timing signal for controlling a paper conveying operation, rotation of the drum and the like. The timer 103 is set at 5 msec in this embodiment. Reference numeral 104 denotes a ROM (read-only memory) storing all the control programs for operating the printing controller 100. Reference numeral 105 denotes a ROM having a data table different from that of the ROM 104. FIG. 45(A) shows a content of the data table in the ROM 105. Referring to FIG. 45(A), top margin control data for the A3-size paper is stored at addresses (4000, 4001), bottom margin control data therefor is stored at addresses (4002, 4003), left margin control data therefor is stored at addresses (4004, 4005), and right margin control data therefor is stored at addresses (4006, 4007). Similarly, at addresses (4008 to 400F), top, bottom, left, and right margin control data for B4-size paper are stored. The margin control data corresponding to the respective paper size are stored up to an address 4087. These margin control data are used as set data of a margin control counter provided in the printing data writing controller 119 (to be described later). The top margin is defined by a distance between the top edge of the paper and the printing start position along the paper conveying direction. The bottom margin is defined by a distance between the printing end position and the bottom edge of the paper. The left and right margins are also defined by distances between the left edge of the paper and the printing start position along the beam scanning direction and between the printing end position along the beam scanning direction and the right edge of the paper.

A table for command codes for designating operations from the data controller 2 is stored at addresses (4100 to 41FF) and is used for checking the command codes from the controller 2. The command codes consist of a top/bottom margin change table, a top margin adjust table, a cassette upper/lower adjust table, and a cassette/manual feed adjust table. At the addresses (4200 to 42FF), five data A to E of charging characteristics of the photosensitive drum 301 are stored. These data are used for temperature compensation operation of the charger 304 (to be described later). The addresses (4300 to 43FF) correspond to a change data table which stores change cycle data for the drum 301, a developing agent in the developer 307 and the fixing rollers 332.

The addresses (4400 to 47FF) correspond to a control timer table which stores various count values for performing the printing operation such as respective process timings, paper feed timing and the like.

Reference numeral 106 denotes a RAM (random-access memory) as a working memory which stores contents such as timers (TIM) A, B, . . . , E, a paper size register (storing cassette size data in accordance with signals from cassette size detection switches 320 and 324 to be described later), statuses 1 to 6 and the like. The microprocessor 101 compares the cassette size data in the paper size register and a size of recording data (e.g., image data) of an external circuit supplied from the controller 2. If the cassette size data is larger, the microprocessor 101 generates a printing operation command to the printing controller 100 of the latter stage. Therefore, even when the paper size is larger than the size of the data externally supplied, the printing operation can be performed, thus improving utility. Reference numeral 107 denotes a non-volatile RAM which can hold data stored therein when power is cut off. FIG. 45(B) shows data contents of the RAM 107. Referring to FIG. 45(B), in the RAM 107, a drum characteristic No supplied from an operation unit in the change mode is stored at an address (6000), and jam data is stored at an address (6100). In the case of a paper jam, the jam data is used to indicate to an operator that the jammed paper still has to be removed from the interior of the printer when the power is temporarily turned off. An address (6200) corresponds to discharge tray counter for counting paper sheets in the reverse tray 381, which is incremented every time one paper sheet is supplied to the tray 381. When the count of this counter reaches a preset value, the tray 381 is full to capacity with the paper sheets, and the tray full state is displayed on the operation unit so as to signal that the operator needs to remove the paper sheets therefrom. The paper discharge tray counter is automatically cleared when the paper sheets are manually removed from the tray 381 by the operator. Therefore, when power is turned off, the number of paper sheets remaining on the tray is held in this counter.

An address (6300) corresponds to a drum change counter which is incremented by one for each printing operation. When a count of the drum change counter reaches that of the change table (drum) shown in FIG. 45(A), a display for signaling the operator to change the drum is displayed on the operation unit.

An address (6400) corresponds to a developing agent change counter which is incremented by one for each printing operation in the same manner as in the drum change counter. When a count of this counter reaches that of the change table (developing agent) shown in FIG. 45(A), a display is illuminated on the operation unit.

An address (6500) corresponds to a fixing roller change counter which is incremented by one for each printing operation in the same manner as in the drum change counter. When a count of this counter reaches that of the change table (fixing roller) shown in FIG. 45(A), a display is illuminated on the operation unit.

Reference numeral 108 denotes a power source sequence circuit serving to prevent the RAM 107 from being erroneously operated when power is turned on or off. Reference numeral 399 denotes a power source for supplying power to controllers. Reference numeral 110 denotes an input/output (I/O) port for generating display data to an operation display unit and for fetching various operation switching data. Reference numeral 112 denotes an input port for fetching input data from various detectors 113. Reference numeral 116 denotes driven elements such as the motor, the high voltage power source lamp, the solenoid, the fan, the heater and the like. Reference numeral 115 denotes a driving circuit for driving the driven elements 116. Reference numeral 114 denotes an output port for supplying an output signal to the driving circuit 115. Reference numeral 312 denotes a laser scan motor for operating a laser beam; 118, a driving circuit thereof; and 117, an I/O port for supplying a drive signal to the driving circuit 118.

Reference numeral 344 denotes a semiconductor laser; 120, a laser modulation circuit for optically modulating a laser beam from the semiconductor laser 344; and 346, a beam detector for detecting the laser beam scanned by the laser scan motor 312, in which a PIN diode having a short response time is used. Reference numeral 121 denotes a high speed comparator (or beam detection circuit) for converting an analog signal from the beam detector 346 into a digital signal so as to produce a horizontal synchronizing pulse signal; and 119, a printing data writing controller for controlling the writing operation of the printing data of the video image supplied from the data controller 2 at a predetermined position of the photosensitive drum 301 and for generating test pattern printing data. Reference numeral 122 denotes an interface for controlling the generation of status data to the data controller 2 and the reception of command and printing data therefrom.

Figure 14:
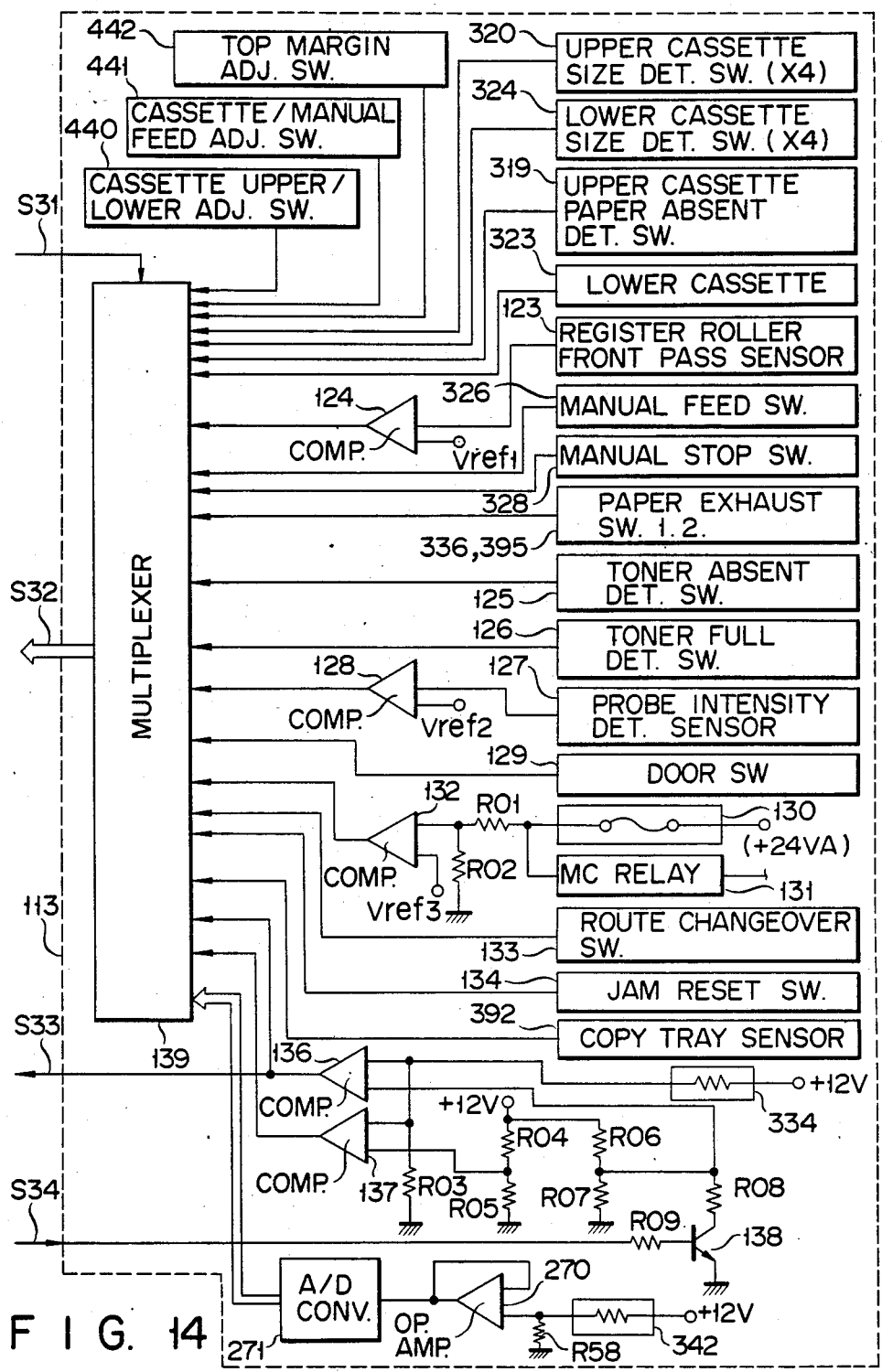
FIG. 14 is a detailed circuit diagram of respective detectors in FIG. 13.

Main parts of the circuit shown in FIG. 13 will be described in more detail. FIG. 14 is a detailed circuit diagram of various detectors 113 in FIG. 13. Referring to FIG. 14, signals from the various detectors 113 are supplied to a multiplexer 139. 8-bit output S32 from the multiplexer 139 is selectively supplied to the input port 112 shown in FIG. 12 in accordance with a selection signal S31.

Reference numeral 320 denotes an upper cassette size detection switch consisting of four switches which are combined so as to detect various paper sizes. Reference numeral 324 denotes a lower cassette detection switch having the same arrangement as that of the switch 320. Reference numeral 319 denotes an upper cassette paper empty switch which is turned on when no paper is left therein. Reference numeral 323 denotes a lower cassette paper empty switch. Reference numeral 123 denotes an aligning roller front pass sensor comprising a CdS light-receiving element. A bias voltage is continuously applied to the sensor 123 through a resistor (not shown) and an output voltage of the sensor 123 varies in accordance with presence/absence of the paper sheets. Therefore, when the output voltage of the sensor 123 is supplied to a comparator 124 to which a reference voltage Vref1 is applied, a signal for discriminating presence/absence of the paper sheets can be obtained.

Reference numeral 326 is a manual feed switch for detecting paper fed from the manual feed guide 325; 336, a discharge switch provided at the fixing roller portion; and 395, a discharge switch provided at the discharge tray portion. Reference numeral 125 denotes a toner empty detection switch for detecting a toner empty state in the toner box; and 126, a toner full detection switch which is operated when the toner bag is full.

Reference numeral 127 denotes a detection sensor comprising a photodiode for detecting a toner concentration with respect to the developing agent (probe concentration detection sensor). A bias voltage is continuously applied to the sensor 127 through a resistor and an output voltage of the sensor 127 is changed in accordance with the toner concentration. Therefore, when the output from the sensor 127 is supplied to one input terminal of a comparator 128, since a reference voltage Vref2 is applied to the other input terminal thereof, a "1" or "0" signal can be obtained when the toner concentration is more or less than a predetermined value.

Reference numeral 129 denotes a door switch which is turned on/off by opening/closing the front cover; 130, a temperature fuse provided for the fixer; and 131, an MC relay for turning on/off a driving power source (+24 VB). Since one end of the fuse 130 is connected to a power source (+24 VA), when the fuse 130 is disconnected due to an abnormality of the fixer, the MC relay is turned off and the driving power source is also turned off. The other end of the fuse 130 is connected to one end of a resistor RO1, and the other end of the resistor RO1 is connected to one end of a resistor RO2 and one input terminal of a comparator 132. A reference voltage Vref3 is supplied to the other input terminal of the comparator 132. Therefore, when the fuse 130 is disconnected, an input voltage of the comparator is 0 V. Thus, a disconnection detection signal of the fuse 130 is generated from the output terminal of the comparator 132. Reference numeral 133 denotes a destination switch. More specifically, the switch 133 is turned on for Japan use (A and B sizes), and it is turned off for U.S. use (legal and letter sizes). Therefore, even when the same paper size code represented by the same combination of the four upper or lower cassette size switches is used, the paper size is further selected for Japan or U.S. use in accordance with a state of the switch 133.

Reference numeral 134 denotes a jam reset switch provided in the front cover. When an operator call such as a paper jam or toner full state occurs, the switch 134 is manually turned on by the operator after removing the jammed paper or replacing the toner bag. Therefore, unless the switch 134 is turned on, the paper jam or toner full state displayed on the operation unit cannot be cleared. Reference numeral 392 denotes a discharge tray sensor for detecting the paper sheets in the tray. Reference numeral 334 denotes a therminstor for detecting the temperature of the fixer. The temperature detected by the thermistor 334 is controlled to be constant. An output of the thermistor 334 is connected to a resistor RO3 and one input terminal of each of comparators 136 and 137. Therefore, an input voltage of each comparator varies in accordance with a change in a resistance of the thermistor 334 due to a change in temperature. When the temperature is high, the input voltage of each comparator is high. The other input terminal of the comparator 136 receives a reference voltage divided by resistors RO6 and RO7, and the output thereof varies in accordance with whether the divided voltage is higher or lower than the voltage applied to one input terminal. A node between the resistors RO6 and RO7 is connected to a resistor RO8 having one end connected to the collector of a transistor 138. Therefore, when the transistor 138 is turned on by an input signal (power save signal) S3, the reference voltage of the comparator 136 is lowered by the resistor RO8, and the temperature control level of the fixer is lower than that when the transistor 138 is turned off. Thus, power consumption of the fixer is lower in the power save mode. A reference voltage divided by resistors RO4 and RO5 is supplied to the comparator 137. Since the reference voltage of the comparator 137 is set to be considerably lower than that of the comparator 136, a decrease in the fixer temperature due to the disconnection of the heater or a malfunction of the driving circuit thereof can be detected when the printer is in operation. An output S33 of the comparator 136 is supplied to the multiplexer 139 and the microprocessor 101. Note that the signal from the comparator 136 received by the mutiplexer 139 is used for detecting the ready state of the fixer. In addition, the signal received by the microprocessor 101 is used as a drive signal of a fixer heater lamp 333 in FIG. 15.

Reference numeral 342 denotes a drum temperature sensor (or thermistor) for detecting the temperature near the drum 301. The output terminal of the thermistor 342 is connected to a resistor R58 and one input of an operational amplifier (op amp) 270. Therefore, when the temperature near the drum 301 is changed, the resistance of the thermistor 342 is also changed. Also, the input voltage of an op amp 270 is changed. The op amp 270 generates a low output voltage when the temperature of the drum 301 is low, and generates a high output voltage when it is high. The op amp 270 is of a voltage follower type, and an output therefrom is connected to the input terminal of an A/D converter 271. The output voltage of the op amp 270 is converted into a digital value by the A/D converter 271 and is supplied to the microprocessor 101 through the multiplexer 139. The A/D converted temperature data of the drum 301 is used for compensating charging thereof. Reference numeral 440 denotes a cassette upper/lower adjusting switch; 441, a cassette/manual feed adjusting switch; and 442, a top margin adjusting switch. These adjusting switches are provided in the interior of the printer and are adapted to be operated by the operator when the front cover is opened. These switches have a plurality of operating members. That is, the cassette upper/lower adjusting switch 440 have operating members corresponding to the position deviations of the lower cassette with respect to the upper cassette. The cassette/manual feed adjusting switch 441 have operating members corresponding to the position deviations of the manual feeding guide with respect to the upper cassette. The top margin adjusting switch 442 have operating members for adjusting the position deviations of the printing start position. The signals from these operating members select the data in the ROM. The minimum change (i.e., one bit) in the level of the output signal from the top margin adjusting switch 442 is proportional to an integral multiple of the pulses output from the above scanning beam detecting means. These switches are set after the test print has been performed and in accordance with the printing state of the test print.

These various adjusting switches are mounted in the interior of the apparatus, and are operated by a service may be opening a cover. Each of these switches has a plurality of setting portions. The upper/lower cassette adjusting switch 440 has a plurality of setting portions corresponding to a positional shift of the lower cassette with respect to a central position of the upper cassette, the cassette/manual feed adjusting switch 441 has a plurality of setting portions corresponding to a positional shift of the manual feed guide with respect to the central position of the upper cassette, and the top margin adjusting switch 442 has a plurality of setting portions for adjusting a positional shift of the recording start position. Setting signals from these setting portions select corresponding data in the ROM. Particularly, a minimum change (1 bit) in the top margin adjusting switch is determined by the number of pulses obtained by integrating an output pulse from the scanning beam detection means. These switches are set by discriminating a print state discrimination result when the service man executes a test mode (to be described later) so as to perform a test print.

Figure 15:
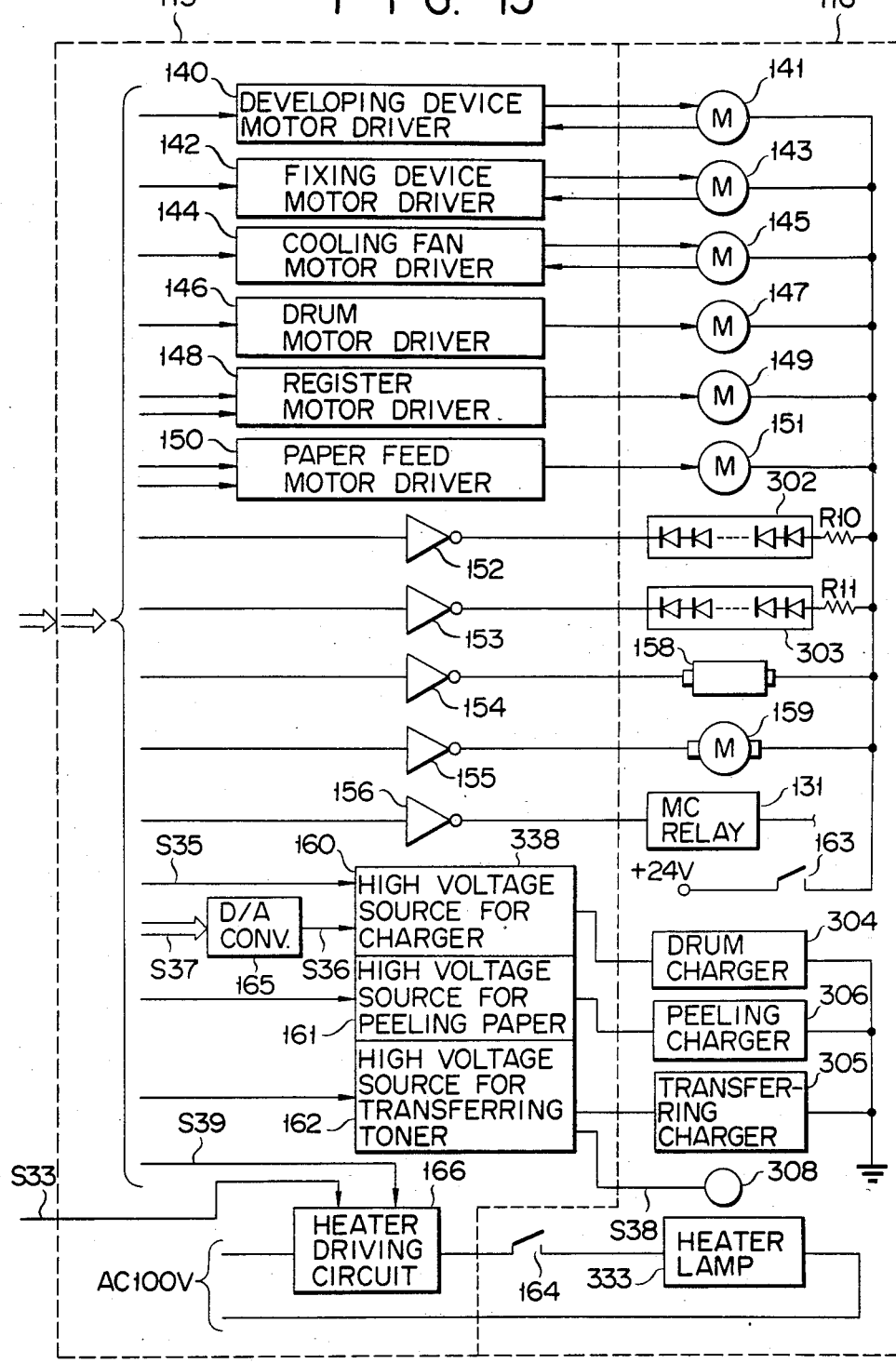
FIG. 15 is a detailed block diagram showing a driving circuit and an output element.

FIG. 15 is a detailed block diagram of the driving circuit 115 and the driven elements 116. Referring to FIG. 15, reference numeral 141 denotes a developer motor comprising a DC Hall motor; and 140, a driver for the motor 141, which performs PLL control. Reference numeral 143 denotes a fixer motor comprising a DC Hall motor; and 142, a driver for the motor 143, which performs PLL control. Reference numeral 145 denotes a fan motor comprising a DC Hall motor; and 144, a driver for the motor 145, which does not perform PLL speed control unlike the developer and fixer drivers. Reference numeral 147 denotes a drum motor for driving the photosensitive drum 301 comprising a 4-phase pulse motor; and 146, a driver for the motor 147, which adopts a constant current 1-2 phase excitation method. Note that the motor 147 is driven at a speed of about 1,200 PPS at which little vibration is generated. Reference numeral 149 is a register motor for driving the register rollers 329 and the manual feed roller 327, which comprises a pulse motor; and 148, a driver for the register motor 149, which adopts a constant voltage 2-phase excitation method. The motor 149 is driven at a speed of about 400 PPS.

It should be noted that when the motor 149 is rotated in the forward direction, the register rollers 329 are rotated, and when it is rotated in the reverse direction, the manual feed roller 327 is rotated. Driving force is transmitted through a one-way clutch to these rollers.

Reference numeral 151 denotes a paper feed motor for driving the lower and upper paper feed rollers 322 and 318, which comprises a pulse motor. In the same manner as described above, the forward or reverse rotation of the motor 151 is transmitted to these rollers through a one-way clutch. Reference numeral 150 denotes a driver for the motor 151, which adopts the same constant voltage 2-phase excitation method as the driver 148. The motor 151 is driven at a speed of about 400 PPS.

Reference numeral 302 denotes the lamp for removing residual charges on the drum 301, which comprises a plurality of red LEDs. Reference symbol R10 denotes a current control resistor for the lamp 302. Reference numeral 152 denotes a driver for the lamp 302. Reference numeral 303 denotes the lamp, which is positioned toward the transfer charger, for improving transfer efficiency, which comprises a plurality of red LEDs. Reference symbol R11 denotes a current control resistor for the lamp 303. Reference numeral 153 denotes a driver for the lamp 303. Reference numeral 158 denotes a solenoid for the toner recovering blade. When the solenoid 153 is turned on, the blade 310 is pressed against the drum 301. Reference numeral 154 denotes a driver for the solenoid 158. Reference numeral 159 denotes a toner supply motor for supplying toner to the developer 307 from the toner hopper. When the toner supply motor is rotated, the toner is supplied from the toner hopper to the developer 307. The toner supply motor 159 is operated in accordance with an output from the probe density detection sensor 342 shown in FIG. 14. Reference numeral 155 denotes a driver for the motor 159. Reference numeral 131 denotes the MC relay which is operated in accordance with a door switch in the same manner as in FIG. 14; and 156, a driver thereof. As shown in FIG. 15, a node of the power source side of the motors and lamps other than the MC relay 131, is connected to one contact 163 of the relay 131, and the other contact 164 is connected to a ±24 VB power source. When the MC relay 131 is turned on, the motors and lamps can be driven.

Reference numeral 304 denotes the charger for charging, a case of which is connected to a ground terminal of the printer main body. A corona discharging wire of the charger 304 is connected to the output terminal of a charging high voltage power source 160 of the high voltage source 338. Input terminals of the power source 160 are connected to an ON/OFF signal line S35 of a high voltage output and an analog control signal line S36 for changing the high voltage output current. The signal line S36 is connected to a D/A converter 165, and data supplied from the microprocessor 101 through a charging voltage control data bus S37 is D/A converted by the D/A converter 165 so as to control the output current of the power source 160. Reference numeral 306 denotes a charger for peeling a paper. The charger 306 is connected to the output of a high voltage power source 161. The power source 161 generates an AC output. Reference numeral 305 denotes the transfer charger for transferring the toner image formed on the drum 301 to the paper sheet. The charger 305 is connected to the output of a high voltage power source 162. The power source 162 includes a developer biasing power source in addition to the transfer charger output. An output line S38 of the power source 162 is connected to the magnet roller 308. A bias voltage is applied to the magnet roller through the output line S38, thereby providing a developing bias thereto. Reference numeral 333 denotes the heater lamp of the fixer, one terminal of which is connected to a terminal of an AC power source of 100 V. The other terminal of the heater lamp 333 is connected to the second contact 164 of the MC relay 131. The contact 163 is connected to a heater driving circuit 166. The lamp 333 is operated only when the MC relay 131 is turned on. Two input signals S33 and S39 are supplied to the circuit 166. The signal S33 is supplied from the thermistor 334 in the fixer shown in FIG. 14 so as to control the density of the fixer. The signal S39 is supplied from the microprocessor 101 so as to forcibly turn off the lamp 333.

Figure 16:
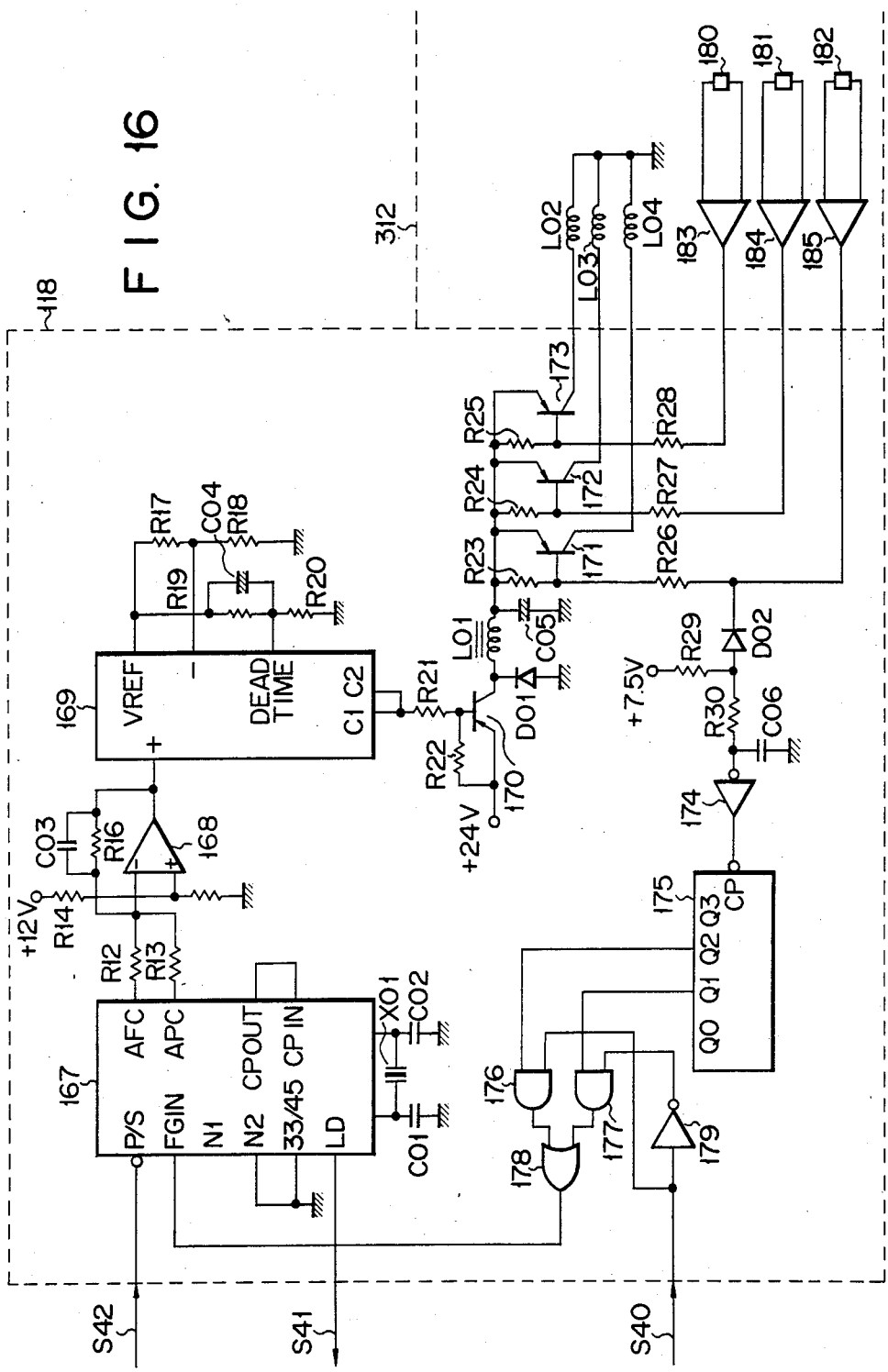
FIG. 16 is a detailed circuit diagram showing a motor driver and a laser scan motor in FIG. 13.

FIG. 16 shows a detailed circuit diagram of the laser scan motor 312 and the driving circuit 118 thereof shown in FIG. 13. In FIG. 16, reference numeral 312 denotes a circuit in the laser scan motor. Reference symbols L02, L03 and L04 denote coils. Reference numerals 180, 181 and 182 denote Hall elements for detecting the position of a rotor of the motor 312. Reference numerals 183, 184 and 185 denote comparators for the Hall elements 180, 181 and 182. Outputs from the comparators 183, 184 and 185 are connected to the bases of power transistors 171, 172 and 173 for driving the coils L02, L03 and L04 through resistors R26, R27 and R28. Base resistors R23, R24 and R25 are respectively connected between the bases and emitters of the transistors 171, 172 and 173. In accordance with the rotation of the rotor of the motor 312, the Hall elements 180, 181 and 182 are turned on in the order named. Therefore, the outputs from the comparators 183, 184 and 185 go to the LOW level in the order named. Thus, the power transistors 171 to 173 are turned on in the order of 173, 172 and 171, thus supplying a drive voltage to the coils L02, L03 and L04 in the order named. When the drive voltage is supplied, the laser scan motor 312 is rotated. The output from the comparator 185 passes through a diode D02 and is supplied to a frequency dividing counter 175 through a waveshaping circuit comprising an inverter 174. Outputs from output terminals Q1 and Q2 of the counter 175 are connected to corresponding input terminals of motor speed switching gates 176 and 177, respectively, and outputs from the gates 176 and 177 are connected to an input terminal FGIN of a PLL (phase-lock loop) control IC 167 through an OR gate 178. The other input terminals of the gates 176 and 177 are connected to an output of a speed control signal line S40 and an inverted output thereof. Therefore, when the line S40 is at the LOW level, the gate 177 is enabled, and the Q1 output from the counter 175 is supplied to the terminal FGIN of the IC 167. On the other hand, when the line S40 is at the HIGH level, the gate 176 is enabled, and the Q2 output from the gate 176 is supplied to the FG input of the IC 167. Input/output terminals of the IC 167 will be briefly described hereinafter. When a P/S (PLAY/STOP) terminal is at the HIGH level, the IC 167 stops the motor 312 and when it is at the LOW level, the IC 167 starts the motor 312. When the P/S terminal is at the HIGH level, outputs from terminals AGC and APC go to the HIGH level. The terminal FGIN is provided for receiving a rotation motor pulse signal from the motor 312. Reference symbols N1 and N2 are terminals for receiving signals for switching a frequency division ratio of a reference frequency divider in the IC 167; 33/45, a terminal for receiving a signal for switching the rotational speed of the motor 312; CPOUT, a terminal for generating a crystal reference frequency division output signal; CPIN, a terminal for receiving a reference frequency input signal; and LD, a terminal for generating a lock detection signal. When the rotational speed of the motor 312 is within the lock range, the HIGH level signal LD is generated, and the LOW level signal LD is normally generated. Reference symbol AFC denotes an 8-bit D/A converter output in the IC 167 as a speed control system output; and APC, an 8-bit D/A converter output in the IC 167 as a phase control system output. Reference symbol X01 denotes a crystal oscillator for producing a reference frequency; and C01 and C02, oscillation capacitors.

The output terminals AFC and APC of the IC 167 constitute an adder circuit using resistors R12 and R13. The circuit is connected to the inventing input terminal of an op amp 168. A voltage obtained by dividing a voltage of +12 V using resistors R14 and R15 is applied to the noninverting input terminal of the op amp 168. A resistor R16 and a capacitor C03 constitute a negative feedback circuit, and particularly, the capacitor C03 serves as a high-pass filter. Therefore, amplification by the op amp 168 is attenuated with respect to an input having a frequency higher than a given level. An output of the op amp 168 is connected to the plus input terminal of a pulse width modulation switching regulator IC 169. The IC 169 comprises a commercially available IC. The IC 169, a power transistor 170, a diode D01, a coil L01 and a capacitor C05 constitute a down switching regulator circuit. In the input/output terminals of the IC 169, the minus terminal is a comparison reference voltage terminal to which a voltage obtained by dividing a voltage appearing at the reference voltage output terminal VREF using resistors R17 and R18 is applied. A DEADTIME terminal is provided for defining a maximum pulse width of the output, to which a voltage obtained by dividing the voltage VREF using resistors R19 and R20 is applied. Output terminals C1 and C2 generate a voltage having a pulse width which varies in accordance with the potential of the plus input terminal. In other words, when the plus input terminal voltage is lower than the minus input terminal voltage, the pulse width of the voltage from the terminals C1 and C2 at the LOW level side is shortened, and a pulse width for turning on the transistor 170 is also shortened. Therefore, a voltage applied across the two ends of the capacitor C05 is low. Conversely, when the plus input terminal voltage is higher than the minus input terminal voltage, the pulse width of the voltage from the terminals C1 and C2 is prolonged and a voltage applied across the two ends of the capacitor C05 is high.

Control of the rotational speed of the scan motor 312 will be described hereinafter.

When a rotation start signal S42 of the motor 312 goes to the LOW level, both the outputs AFC and APC of the IC 167 are kept at the LOW level until the above-mentioned lock detection signal LD (on S41) is generated. The op amp 168 generates the HIGH level voltage. Therefore, an output pulse width of the IC 169 is long, and a voltage applied across the two ends of the capacitor C05 is about +16 V. Since any one of the Hall elements 180, 181 and 182 is turned on at the position at which the rotor of the motor 312 is stopped, one of the coils L02, L03 and L04 corresponding to the Hall element which is turned on is energized and the motor 312 thus starts rotating. The motor 312 is rotated gradually faster. In this state, the speed control signal line S40 is at the HIGH level, and the Q2 output of the counter 175 is applied to the FGIN terminal of the IC 167. Therefore, the counter 175 serves as an 8-frequency divider. When the frequency of the signal applied to the FGIN reaches about 96% of the reference frequency in the IC 169, the lock detection signal LD goes to the HIGH level, and the outputs of the AFC and APC terminals are not fixed at the LOW level (0 V), but are switched to the output voltage from the D/A converter in the IC 167. Thereafter, the scan motor 312 can be controlled to maintain a constant speed by the speed control system output AFC and the phase control system output APC.

In this embodiment, when a printing command is not supplied from the data controller 2 within a predetermined period of time, the scan motor 312 is switched to the standby mode and the output of the speed control line S40 goes to the LOW level. Therefore, since the counter 175 switches to a 4-frequency divider from the 8-frequency divider, the motor 312 is rotated at a speed 4/8, i.e., ½ the rotational speed corresponding to the 8-frequency division. The above-mentioned half speed control is performed for preventing a bearing of the motor 312 from being damaged when the motor 312 is rotated for a long period of time. It should be noted that in this embodiment, the motor is rotated at about 12,000 rpm in the printing operation mode, i.e., a high speed rotation mode, and is rotated at about 6,000 rpm in the standby mode.

Figure 17:
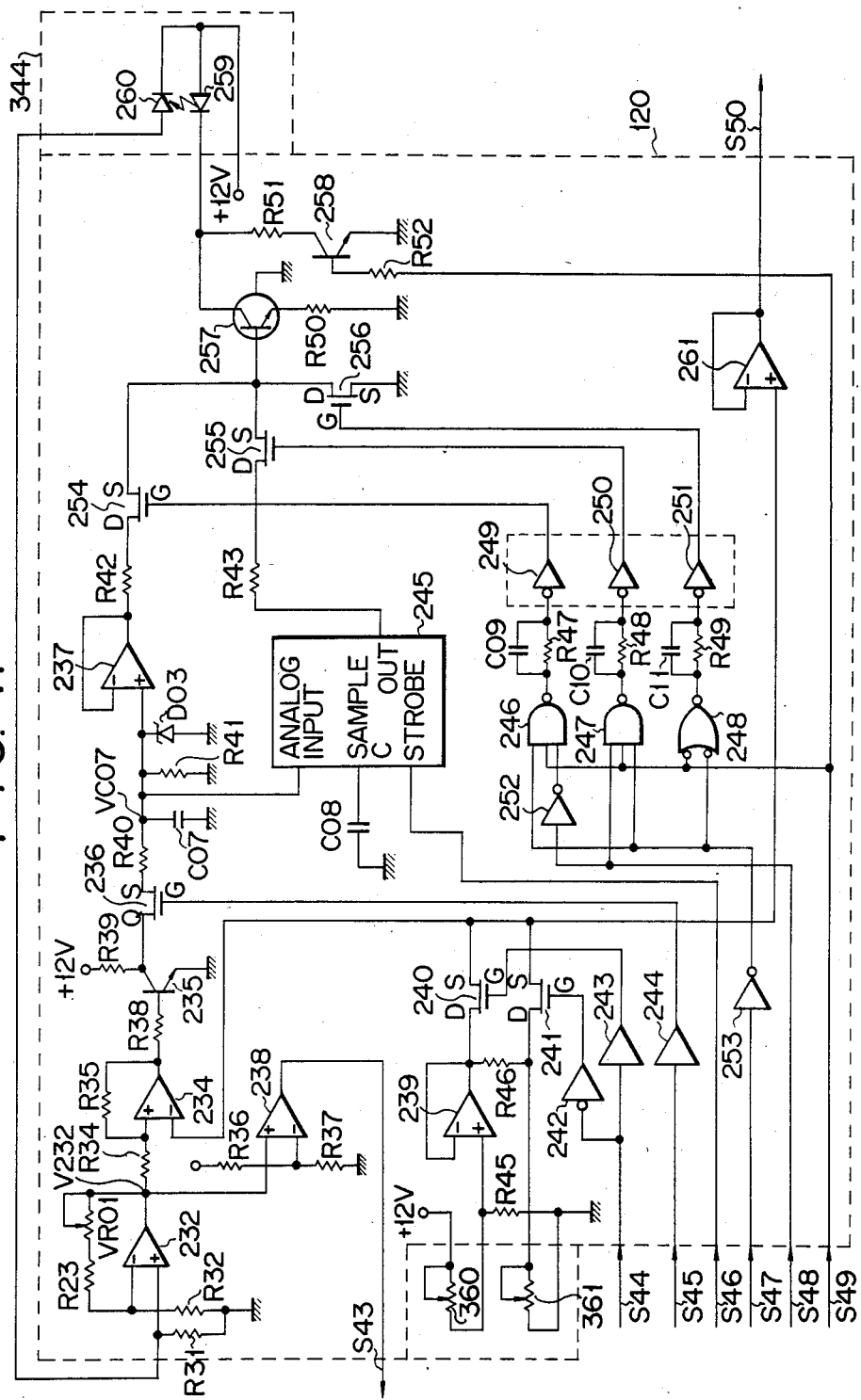
FIG. 17 is a detailed circuit diagram showing a laser modulation circuit and a semiconductor laser in FIG. 13.

FIG. 17 is a detailed circuit diagram of the laser modulation circuit 120 and the semiconductor laser 344 shown in FIG. 13. Referring to FIG. 17, reference numeral 344 denotes the semiconductor laser diode comprising a laser diode main body 259 and a photodiode 260 as a light detecting means for monitoring an output beam intensity from the diode 259. Reference numeral 257 denotes a high frequency transistor as a voltage-current converting means (or first current driving means) for performing optical modulation of the diode 259. Reference symbol R50 denotes a current detection resistor; 258, a transistor as a second current driving means for supplying a bias current to the diode 259; R51, a current control resistor; and R52, a base current control resistor. Reference numerals 254, 255 and 256 denote high speed analog switches for supplying a modulating signal to the laser diode 259. When the HIGH level voltage is applied to the gate (G) of each transistor, the resistance between the drain (D) transistor is OFF. Output power from the laser diode 259 has three levels. A first level is an output P(ON) for almost completely discharging charges on a portion of the drum 301 corresponding to a white portion of the paper. When the analog switch 254 is turned on, the laser diode 259 generates the output P(ON). A second level is an output "0", i.e., an output P(OFF) for leaving charges on the drum 301. When the analog switch 256 is turned on, the laser diode 259 generates the output "0", i.e., the output P(OFF). A third level is an output P(SH) between the first output P(ON) and the second output P(OFF) for increasing a printing density of one dot line. When the analog switch 255 is turned on, the laser diode 259 generates the output P(SH), which will be described in detail hereinafter.

Resistors R42 and R43 are provided for protection against the short-circuiting of the analog switches 254, 255 and 256 when they are turned on/off. Reference numerals 249, 250 and 251 denote gate drivers of the switches 254, 255 and 256. Reference symbols C09, C10 and C11 denote capacitors for increasing speed; and R47, R48 and R49, input resistors of the drivers 249, 250 and 251.

Reference numeral 246 denotes a 3-input NAND gate. When all the gate inputs go to the HIGH level, the output of the gate 246 goes to the LOW level, the switch 254 is turned on and the diode 259 generates the output P(ON). A first gate input of the three gate inputs of the gate 246 is connected to the output of an inverter 253, and the input of the inverter 253 is connected to a printing data signal S47 (at the HIGH level, the printing operation is enabled, and at the LOW level, it is disabled). A second gate input of the gate 246 is connected to the output of an inverter 252, and the input of the inverter 252 is connected to a shadow enable signal S48 (at the HIGH level, shadow ON, and at the LOW level, shadow OFF). A third gate input is connected to a laser enable signal S49 (at the HIGH level, laser ON, and at the LOW level, laser OFF). Therefore, the output from the gate 246 goes to the LOW level when the signal S49 is at the HIGH level, the signal S48 is at the LOW level and the signal S47 is at the LOW level. Reference numeral 247 denotes a 3-input NAND gate. When all the three gate inputs of the gate 247 go to the HIGH level, the output thereof goes to the LOW level, the switch 255 is turned on and the diode 259 thus generates the output P(SH). A first gate input of the three gate inputs is connected to the shadow signal S48, a second gate input is connected to the output of the inverter 253 and a third gate input is connected to the laser enable signal S49. Therefore, the output from the gate 247 goes to the LOW level when the signal S49 is at the HIGH level, the signal S48 is at the HIGH level and the signal S47 is at the LOW level. Reference numeral 248 denote a 2-input OR gate. When either of two gate inputs of the gate 248 goes to the LOW level, the output thereof goes to the LOW level, the switch 256 is turned on and the diode 259 generates the OFF-state output P(OFF).

Reference numeral 245 denotes a sample and hold IC used for controlling the output from the diode 259 to a level of the shadow output P(SH). Reference symbol ANALOG-INPUT denotes an analog voltage input for sampling; SAMPLEC, a terminal for connecting a holding capacitor C08; and STROBE, a strobe signal terminal for sampling, which is connected to a sample strobe signal S46. Reference numeral 237 denotes an op amp of a FET input type which constitutes a voltage follower circuit. Reference symbol D03 denotes a Zener diode which regulates the output of the diode 259 to be maximum. A resistor R40 and a capacitor C07 constitute an integrating circuit, and a resistor R41 is a discharging resistor for continuously discharging charges of the capacitor C07. Reference numeral 236 denotes an analog switch having a gate (G) connected to a buffer 244. A sample signal S45 is supplied to the input of the buffer 244. Reference numeral 253 denotes a transistor for level conversion; and R39, a resistor serving to limit a current supply to the capacitor C07 in the charging mode. Reference symbol R38 denotes a base current limiting resistor of a transistor 235; and 234, a comparator as a comparing means. The comparator 234 has a hysteresis characteristic by means of resistors R34 and R35. An output voltage from a laser monitor amplifier (op amp) 232 is applied to the plus input terminal of the comparator 234 through the resistor R34. The op amp 232 is provided for detecting an optical output from the diode 259 and serves as a current-voltage converting means. Resistors R32, R33 and VR01 are used for regulating the gain of the op amp 232. When the resistance of the variable resistor (or control) VR01 is changed, the gain of the op amp 232 can be varied. Reference symbol R31 denotes an output load resistor of the photodiode 260 in the semiconductor laser 344 from which a voltage proportional to the output current of the photodiode 260 can be obtained.

Figure 19:
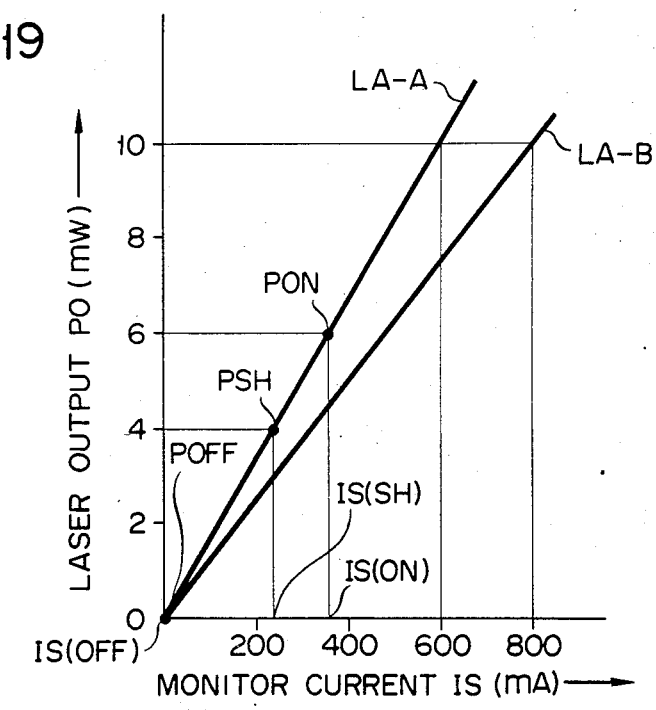

FIG. 19 shows the relationship between an optical output Po and a short-circuiting current Is of the photodiode 260. Referring to FIG. 19, reference symbol Is denotes a monitor current; and Po, an optical output of the diode 259. The output P(ON) is about 6 mW, the output P(SH) is about 4 mW, and the output P(OFF) is zero. In FIG. 19, LA-A and LA-B represent two different monitor characteristics of the laser diode. The control VR01 is adjusted so that when the optical output of the laser diode is 6 mW, the output voltage of the op amp 232 is about 3 V. Therefore, both the characteristics LA-A and LA-B of FIG. 19 can be adjusted by the control VR01. Reference numeral 238 denotes a comparator for checking if the diode 259 emits light. The output voltage of the op amp 232 is applied to the plus input terminal of the comparator 238, and a voltage which is divided by resistors R36 and R37 (in this case, set at about 2.0 V) is applied to the minus input terminal thereof. Therefore, when the diode 259 emits light and the output thereof is about 2 mW, the output of the comparator 232 goes from the LOW level to the HIGH level, thus generating the laser ready signal S43. An intensity setting voltage of the laser beam is applied to the minus input terminal of the comparator 234. The setting voltage is supplied from either of the analog switches 240 or 241. In other words, the switch 240 is turned on when the laser output P(ON) is generated, and the output voltage from the voltage follower 239 is applied to the minus input terminal of the comparator 234. A voltage divided by the main exposure adjusting potentiometer 360 as the first voltage varying means and a resistor R45 is applied to the plus input terminal of the voltage follower 239. When the potentiometer 360 is operated, the voltage supplied to the minus input terminal of the comparator 234 is also changed. The switch 241 is turned on when the laser output P(SH) is generated, and a voltage obtained by dividing the output voltage from the voltage follower 239 by a resistor R46 and the shadow exposure adjusting potentiometer 361 as the second voltage varying means is applied to the minus input terminal of the comparator 234. The voltage follower 239, the analog switches 240 and 241, the potentiometer 360, the resistor R45, the control 361 and the resistor R46 constitute an optical output setting means. A circuit for integrating a comparison result of the comparator 234 obtained in such a manner that a voltage detected by the photodiode 260 and amplified by the op amp 232 is compared with a setting voltage by the comparator 234 is referred to as an optical output stabilizing means.

The switches 240 and 241 are switched by a main exposure setting signal S44. When the signal S44 is at the LOW level, the output of an inverter 242 goes to the HIGH level and the switch 241 is turned on. When the signal S44 is at the HIGH level, the output of a buffer 243 goes to the HIGH level and the switch 240 is turned on. The outputs (S side) of the switches 240 and 241 are also supplied to a voltage follower 261, and an output S50 of the voltage follower 261 is used for compensating for a threshold level of a horizontal synchronizing pulse detection comparator of a beam detection circuit (to be described later).

Figure 18:
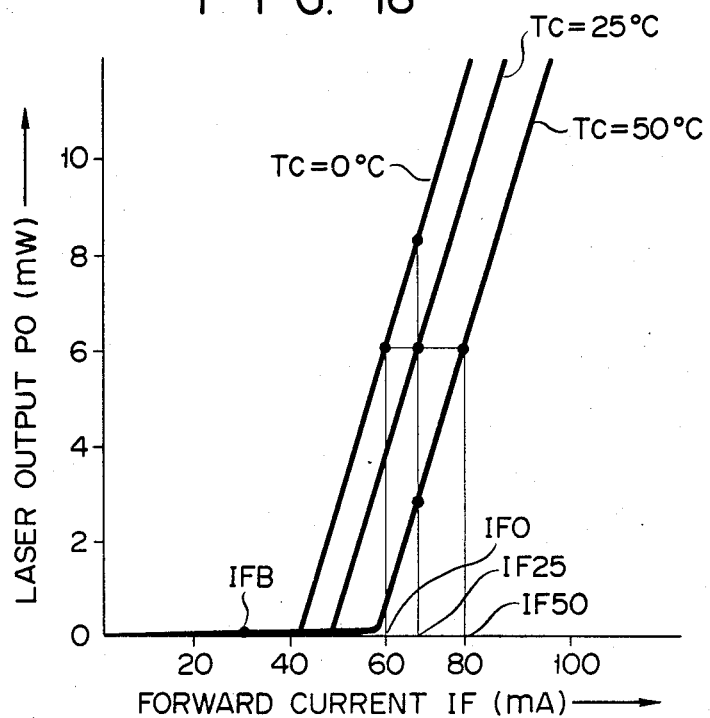
FIGS. 18 and 19 are graphs showing the relationship between a semiconductor laser and an optical output.

Current-output characteristics of the laser diode used in the printer of the present invention will be described below. FIG. 18 is a graph showing IF-Po characteristics. Reference symbol TC=0° C. denotes the IF-Po characteristics when the case temperature of the semiconductor laser 344 is 0° C.; TC=25° C., those when the case temperature is 25° C.; and TC=50° C., those when the case temperature is 50° C. The characteristics when the case temperature TC=25° C. will be exemplified. When the current IF flowing through the diode 259 is gradually increased from 0, the optical output Po starts to be generated from a point of IF=about 50 mA. At a point of IF=68 mA, the optical output reaches 6 mW which is the optical output P(ON). In the case of TC=0° C., the optical output Po starts to be generated at a point of IF=about 40 mA. For this reason, when the transistor 258 is turned on, a bias current IFB flows when the laser enable signal is at the HIGH level, thus reducing power loss of the laser modulation transistor 257. Therefore, stable operation of the transistor 257 even at high temperatures can be ensured by the bias current IFB. The amount of change in the current required for modulating the laser beam is IF25−IFB when TC=25° C. As compared to the case wherein the current of IF25 is directly supplied to the transistor 257, precision in a light amount stabilizing operation (to be described later) can be greatly improved. As can be seen from the graph in FIG. 18, since the output of the layer diode is considerably changed due to a change in temperature, the light amount stabilizing circuit is needed. The laser light amount stabilizing circuit according to this embodiment detects the light intensity from the diode 259 using the photodiode 260, and the short-circuiting current Is of the photodiode 260 can be controlled to be constant. As can be seen from FIG. 19, since the short-circuiting current Is is exactly proportional to the optical output Po, if the current Is is kept constant, the optical output Po can be kept constant. Since a drift in the photodiode 260 due to temperature is very small, the amount of change in the optical output is negligible even if the temperature is changed. Operation of the above-mentioned optical output stabilizing circuit will be described hereinafter with reference to FIGS. 17 and 20.

Figure 20:
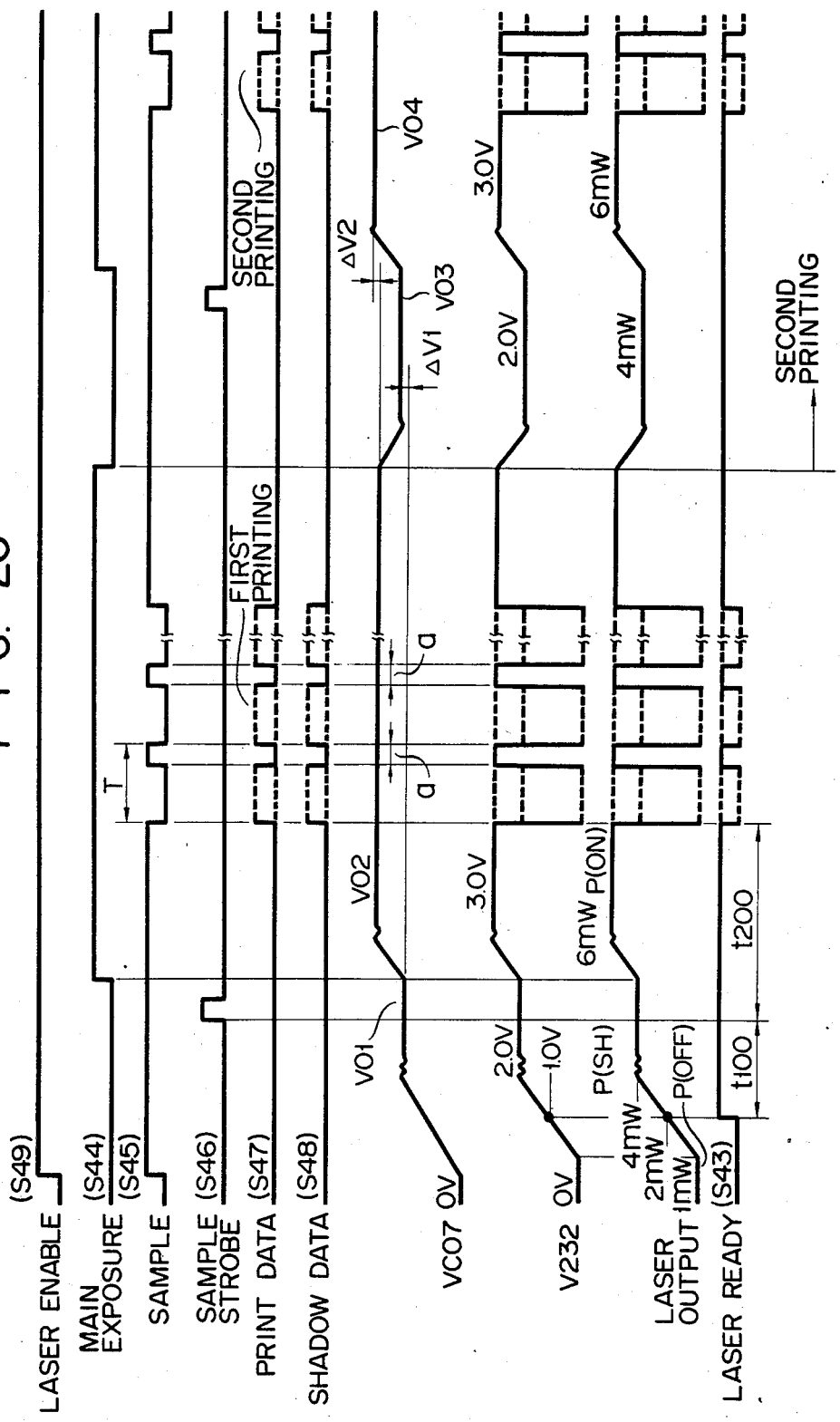
FIG. 20 is a timing chart for explaining an operation of the circuit shown in FIG. 17.

Referring to FIG. 20, when both the laser enable signal S49 and the sample signal S45 go to the HIGH level, the transistor 258 shown in FIG. 17 is turned on, and the bias current (about 30 mA) flows to the diode 259 through the resistor R51. At this time, since the printing data signal S47 and the shadow signal S48 go to the LOW level, all the inputs of the gate 246 of the gates 246, 247 and 248 only go to the HIGH level. Thus, the output from the gate 246 goes to the LOW level, and the analog switch 254 of the switches 254, 255 and 256 is turned on. When the signal S45 goes to the HIGH level, the analog switch 236 is turned on. At this time, the capacitor C07 is not yet charged, the output from the op amp 237 is 0 V, and the base output of the laser modulation transistor 257 is also 0 V. Therefore, at this time, only the bias current flows through the diode 259, and as can be seen from the characteristics shown in FIG. 18, the laser diode 259 does not emit light. Since the photodiode 260 does not detect the laser beam emitted from the laser diode 259, the monitor current Is is zero, and the output from the op amp 232 is also 0 V. Thus, the output of the comparator 234 goes to the LOW level, and the transistor 235 is turned off. For this reason, the capacitor C07 is charged through the resistor R39 and R40. In this case, a time constant determined by the resistors R39 and R40 and the capacitor C07 is selected to fall within the range between 20 and 50 msec. If the time constant is too small, the response time of the stabilizing circuit is too short, and a variation in the optical output level is wide. If too large, the circuit has a poor response time, and it takes a long time to stabilize the optical output. Since the capacitor C07 is charged, the output voltage of the voltage follower 237 is also gradually increased. Therefore, the current flows in the collector of the transistor 257 as the base voltage thereof is increased. The collector current Ic of the transistor 257 is {VB−VBE(SAT)}/R50. A current IF obtained by adding the bias current IFB from the transistor 258 and the current Ic from the transistor 257 flows in the diode 259. Thus, when the current Ic is increased and a forward current of the diode 259 reaches about 50 mA (TC=25° C.), the diode 259 emits light. In response to this, since the monitor current corresponding to the optical output generated flows in the photodiode 260, the plus input terminal voltage of the op amp 232 is increased and the output voltage thereof is also increased. Since the gain of the op amp 232 is preadjusted by the control VR01 so that the output voltage of the op amp 232 is about 0.5 V with respect to the output 1 mW of the diode 259, the optical output of the diode 259 is increased. When the optical output reaches 2 mW, i.e., the output voltage of the op amp 232 reaches about 1 V, the output signal of the comparator 238, i.e., the laser ready signal S43 goes to the HIGH level. Since the main exposure adjusting signal S44 is at the LOW level, the shadow exposure level (optical output P(SH)) voltage is applied to the minus input terminal of the comparator 234. The shadow exposure level voltage is set by the shadow exposure adjusting control 361 in the operation unit in accordance with the photosensitive characteristic of the photosensitive drum 301. Assume that this voltage is set at 2.0 V corresponding to the average optical output 4 mA. Therefore, when the optical output of the diode 259 is increased, and the plus input terminal voltage of the comparator 234 is higher than 2.0 V, the transistor 235 is turned on, thus discharging the capacitor C07 through the resistor R40. Thus, the base voltage of the transistor 257 is decreased and the optical output of the diode 259 is lowered below 4 mW. When the optical output of the diode 259 is lower than 4 mW, the plus input terminal voltage of the comparator 234 is also lowered below 2.0 V, thus turning off the transistor 235. Therefore, the capacitor C07 is charged again through the resistors R39 and R40. In this manner, since the optical output of the diode 259 varies nearly 4 mW, the comparator 234 is repeatedly turned on/off at a predetermined period. Due to the integrating effect of the resistors R39 and R40, the voltage applied across the two ends of the capacitor C07 approaches a value of V01 shown in FIG. 20 and is stabilized. After the laser ready signal S43 goes to the HIGH level, the microprocessor 101 generates the sample strobe signal S46 of the shadow level through the output port thereof after a predetermined time t6 has elapsed. When the signal S46 is generated, the sample and hold IC 245 samples and holds the voltage V01 (FIG. 20) of the capacitor C07 supplied to the ANALOG-INPUT terminal thereof, and stores the voltage in the holding capacitor CO8. Therefore, after the signal S46 goes to the LOW level, the control voltage V01 is continuously generated so as to generate the shadow level output P(SH) from the OUT terminal of the IC 245.

Whe the shadow level output P(SH) has been sampled and held, the microprocessor 101 switches the main exposure setting signal S44 into the HIGH level through the output port thereof. Therefore, the output voltage from the voltage follower 239 is applied to the minus input terminal of the compartor 234 through the switch 240. The main exposure level (optical output P(ON)) voltage is supplied to the output of the voltage follower 239. This voltage is set by the main exposure adjusting potentiometer 360 in the operation unit in accordance with the photosensitive characteristic of the drum 301, and is assumed to be set at 3.0 V corresonding to the averaage optical output 6 mW. Since the voltage supplied to the minus input termainal of the comparator 234 is switched to 3.0 V, the output therefrom goes to the LOW level and the transistor 235 is turned off. Therform the capacitor C07 is charged further, and the base voltage of the transistor 257 is also increased, thus increasing the optical output of the diode 259. When the optical output of the diode 259 approaches 6 mW, the output voltage V232 of the op amp 232 is about 3 V. When the output voltage V232 exceeds 3 V, the output of the comparator 234 goes to the HIGH level in the same manner as in the shadow level setting mode, the transistor 235 is turned on, and the capacitor C07 is discharged through the resistor R40. Thus, the base voltage of the transistor 257 is also decreased and the optical output of the diode 259 is 6 mW or lower. Therefore, the plus input terminal voltage of the comparator 234 is also decreased to 3.0 V or lower, and the transistor 235 is turned off. The capacitor C07 is charged through the resistors R39 and R40, and the optical output of the diode 259 exceeds 6 mW. In this manner, the optical output of the diode 259 varies near 6 mW, and the comparator 234 repeats the ON/OFF operation at a predetermined period. Due to an integrating effect of the resistors R39 and R40, the voltage of the capacitor C07 approaches V02 shown in FIG. 20 and is stabilized. When the main exposure level has been set, the microprocessor 101 initiates the operation of a sampling timer (to be described later), and performs the write operation in the drum 301. The sampling timer is sequentially triggered at a constant period T every time it receives a laser beam detection signal (to be described later), and generates the sampling signal S45 during an interval except for the write operation of the printing data, i.e., an interval a in FIG. 20. During an interval for which the printing data signal S47 and the shadow data signal S48 are at the HIGH level, since the sample signal S45 is at the LOW level, the analog switch 236 is turned off. Therefore, the laser beam emitted from the laser diode 259 is modulated by the signals S47 and S48 during the printing interval, and the optical output thereof has three levels, i.e., P(ON), P(SH) and P(OFF), as described above. In other words, the first level (P(ON)) corresponds to the case wherein the signal S47 is OFF, i.e., at the LOW level and the signal S48 is OFF, i.e., at the LOW level (printing output is white). In this case, the NAND gate 246 is enabled, only the switch 254 is turned on, the main exposure level voltage V02 is applied to the base of the transistor 257, and the optical output of the diode 259 is P(ON)=6 mW. The second level corresponds to the case wherein the signal S47 is at the LOW level and the signal S48 is at the HIGH level (printing output is halftone). In this case, the NAND gate 247 is enabled, only the switch 255 is turned on, the output voltage V01 of the IC 245 is applied to the base of the transistor 257, and the optical output of the diode 259 is P(SH)=4 mW. The third level corresponds to the case wherein the signal S47 is at the HIGH level and the signal S48 is at the LOW level (printing output is black). In this case, the OR gate 248 is enabled, and only the switch 256 is turned on. Therefore, the base of the transistor 257 is connected to ground GND, and the laser output of the laser diode 259 is P(OFF)=0, thus emitting no light. In this manner, the first printing operation is performed. After completing this printing operation, the microprocessor 101 switches the signal S44 to the LOW level through the output port, and sets the shadow exposure level P(SH) again. Therefore, the voltage applied to the minus input terminal of the comparator 234 becomes 2.0 V as a setting voltage of the shadow exposure level. Thus, the transistor 235 is turned on, and the capacitor C07 is discharged, thus gradually decreasing the charged voltage (VC07) thereon. In order to describe the output stabilizing operation of the laser diode 259, assume that the case temperature of the semiconductor laser 344 is increased by $\Delta T$ during the second printing operation. As is apparent from the graph shown in FIG. 18, when the case temperature is increased, the IF-Po characteristic curve of the diode 259 shifts to the right. In this case, if the same current flows in the laser diode 259, the laser output Po thereof is decreased. Therefore, in order to obtain a constant laser output, the current IF must be increased by a current $\Delta IF$ corresponding to the amount wherein the characteristic curve shifts to the right. The voltage VC07 of the capacitor C07 is set at V03 which is higher than the setting voltage V01 by $\Delta V1$ corresponding to $\Delta IF$, and the laser output of the laser diode 259 is set at P(SH)=4 mW in the same manner as in the first printing operation. Thus, similarly, the shadow exposure level P(SH) is set in the IC 245 by the signal S46. At this time, the current is increased so as to correspond to an increase in the case temperature of the semiconductor laser 344, and the voltage of the capacitor C07 is set at V04, which is higher than V01 by a compensation voltage $\Delta V2$ for compensating an increase in temperature, thus performing the second printing operation. In this manner, since the shadow exposure level P(SH) and the main exposure level P(ON) are kept precisely constant by means of the stabilizing circuit, high-quality printing can be performed. Note that at the main exposure level P(ON), the optical output stabilizing operation is performed so as to maintain a constant laser output except during the write operation of the printing data. At the shadow exposure level, before printing is initiated, the sample and hold operation is performed, and the laser output stabilizing operation is not performed during the write operation of the printing data. This is because the circuit would be complex and expensive, and since the shadow exposure level is provided as an auxilialy level, printing quality is not significantly influenced by a slight variation thereof. Note that when the setting voltage supplied to the comparator 234 is varied in accordance with the photosensitive characteristic of the drum 301, the main exposure adjusting potentiometer 360 is adjusted. The potentiometer 360 varies the input voltage of the voltage follower 239. Therefore, when the potentiometer 360 is adjusted, the laser output setting voltage in the P(ON) mode can be adjusted. On the other hand, in the P(SH) mode, the laser output setting voltage is obtained by dividing the output voltage of the voltage follower 239 by the resistor R46 and the potentiometer 361. Thus, when the potentiometer 360 is adjusted, the laser output setting voltages in the P(ON) and P(SH) modes are proportionally changed, and the relationship between the recording density and the application voltage is constant. Therefore, unlike a conventional apparatus, a cumbersome operation whereby the setting voltages in the P(ON) and P(SH) modes must be individually adjusted is not required, resulting in easy adjustment.

Figure 21:
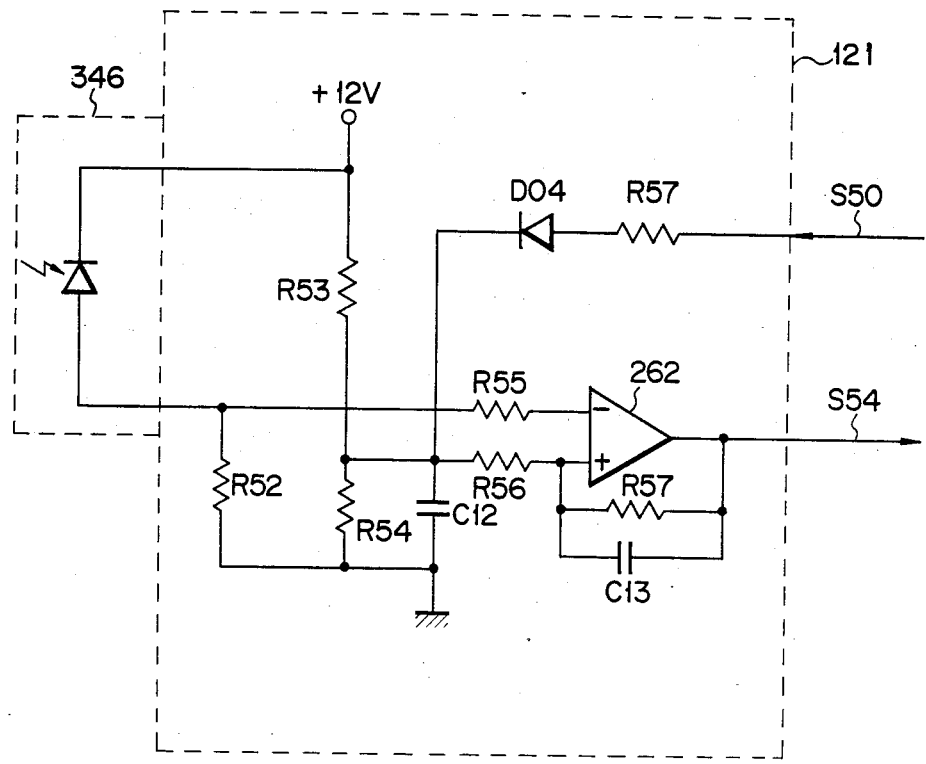
FIG. 21 is a detailed circuit diagram showing a beam detection circuit and a beam detector in FIG. 13.
Figure 22:
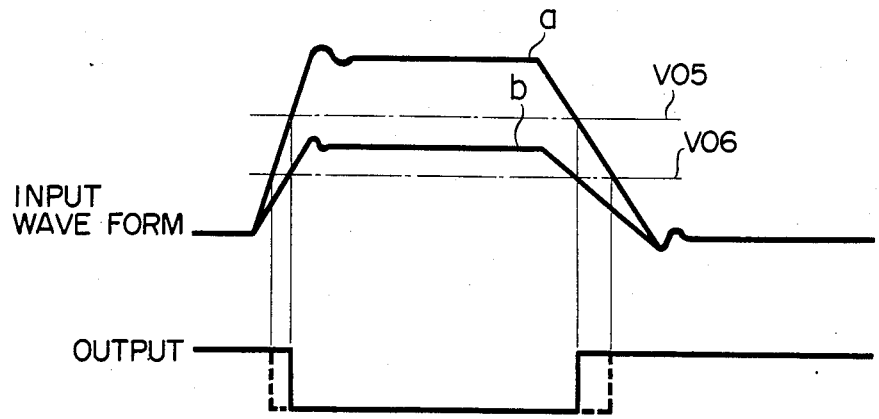
FIGS. 22 and 24 are waveform charts for explaining an operation of the circuit shown in FIG. 21.

FIG. 21 is a detailed circuit diagram of the beam detection circuit 121 and the beam detector 346 shown in FIG. 13. Referring to FIG. 21, reference numeral 346 denotes the beam detector comprising a PIN diode having a quick response time. As shown in FIG. 3, since the detector 346 generates a reference pulse signal when the printing data is recorded on the photosensitive drum 301, a pulse width and a pulse generation timing thereof must be precisely determined. Therefore, if the pulse width and the pulse generation timing are varied for each beam scanning by means of rotation of the polygonal mirror 313, a writing start point on the drum 301 is shifted, resulting in poor printing quality. The anode of the detector 346 is connected to the minus input terminal of a high speed comparator 262 as a comparing means through load resistors R52 and R55. A voltage divided by resistors R53 and R54 is applied to the plus input terminal of the comparator 262 through a resistor R56. The resistor R54 is connected to a capacitor C12 for removing noise components. Reference symbol R57 is a positive feedback resistor for providing a hysteresis characteristic; and C13, a feedback capacitor for performing high speed feedback so as to improve an output waveform. A threshold variable voltage S50 is applied to the plus input terminal of the comparator 262 through a diode D40 and the resistor R57. The voltage S50 is generated from the analog switches 240 and 241 (i.e., an output from the laser output setting means) (see FIG. 17). FIG. 22 shows the relationship between the minus input terminal voltage waveform, i.e., the output waveform of the detector 346 and the plus input terminal voltage of the comparator 262, and the output waveform of the comparator 262. When the laser beam passes through the detector 346 at high speed, a pulse current flows from the detector 346 (PIN diode), and voltages having waveforms a and b shown in FIG. 22 are supplied to the minus input terminal of the comparator 262. Assuming that a low voltage V06 is continuously applied to the plus input terminal of the comparator 262, since the voltage S50 is not applied thereto, the output waveform thereof is as indicated by the dotted line in FIG. 22 in the case of the waveform a, and is as indicated by the solid line in FIG. 22 in the case of the waveform b. Note that the waveform a corresponds to the case wherein the sensitivity of the drum 301 is low. In this case, at the main exposure level, the laser output exceeds 6 mW. The waveform b corresponds to the case wherein the sensitivity of the drum is high and the laser output is 6 mW or less. As can be seen from these output waveforms, when the plus input terminal voltage of the comparator 262 is set to be constant, the output waveform varies widely in accordance with the intensity of the laser beam radiated on the detector 346. By using the threshold variable voltage S50, when the intensity of the laser beam is high, the input voltage is compensated to a level of V05, and when it is small, the input voltage is compensated to a level of V06. Thus, the output waveforms can be kept constant, as shown in FIG. 22.

Figure 23A:
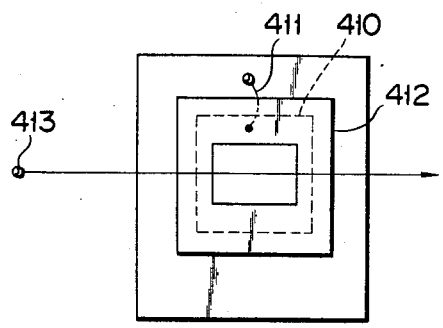
FIGS. 23A and 23B are respectively front and side views showing an example of an arrangement of the beam detector.
Figure 23B:
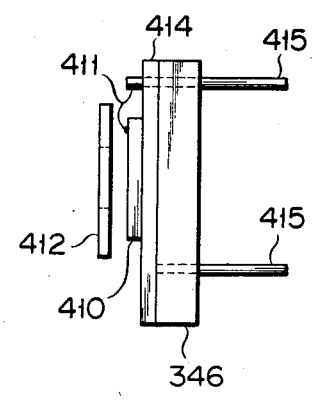
Figure 24:
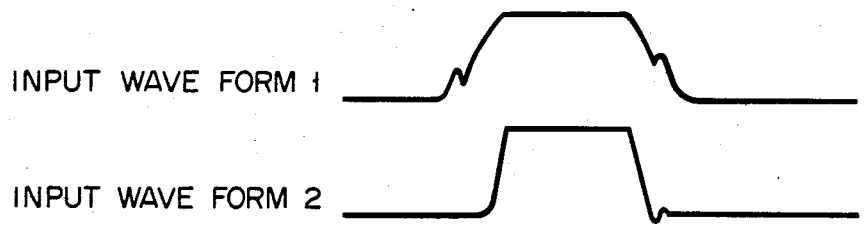

FIGS. 23A and 23B are views showing the beam detector (PIN diode) 346. Referring to FIGS. 23A and 23B, reference numeral 410 denotes a light recieving element; 411, an electrode line; 412; a mask plate; 413, a laser scanning beam; 414, a light-receiving element mounting base; and 415, an output lead wire. The PIN diode used in this embodiment has an outer size of 2.5×2.5 mm and a response time of 4 nsec. The laser beam 413 is radiated at a constant speed in the direction indicated by the arrow in FIG. 23A by rotation of the polygonal mirror 313. When the laser beam 413 passes above the light-receiving element 410, an output current flows in accordance with the optical output of the beam 413. An input waveform of the minus input terminal of the comparator 262 shown in FIG. 21 is as shown in FIG. 24. Referring to FIG. 24, an input waveform 1 corresponds to the case wherein no mask is provided on the light-receiving element 410, and noise components are generated before and after the output waveform. Even when the light-receiving element 410 is used for detecting a stationary or scanning beam spot, it is mainly used for detecting very low speed light, and end faces of the element 410 generally are not parallel to each other. When the laser beam passes such end faces, the output current from the element 410 is unstable. Therefore, in order to resolve such a drawback, the mask 412 which cannot transmit the laser beam 413 is mounted on the light-receiving surface of the element 410, thus preventing the output waveform from being adversely influenced. The mask 412 has a structure wherein a rectangular window is formed in a portion excluding end faces of the light-receiving element 410 and the electrode line 411. When the laser beam 413 passes the window of the mask 412, it is radiated onto the element 410. With this structure, when the precision of making the window is improved, particularly, the sides of the window are formed to be precisely parallel to each other, the input waveform to the comparator 262 free from noise component can be obtained as illustrated by the waveform 2 in FIG. 24.

Figure 25B:
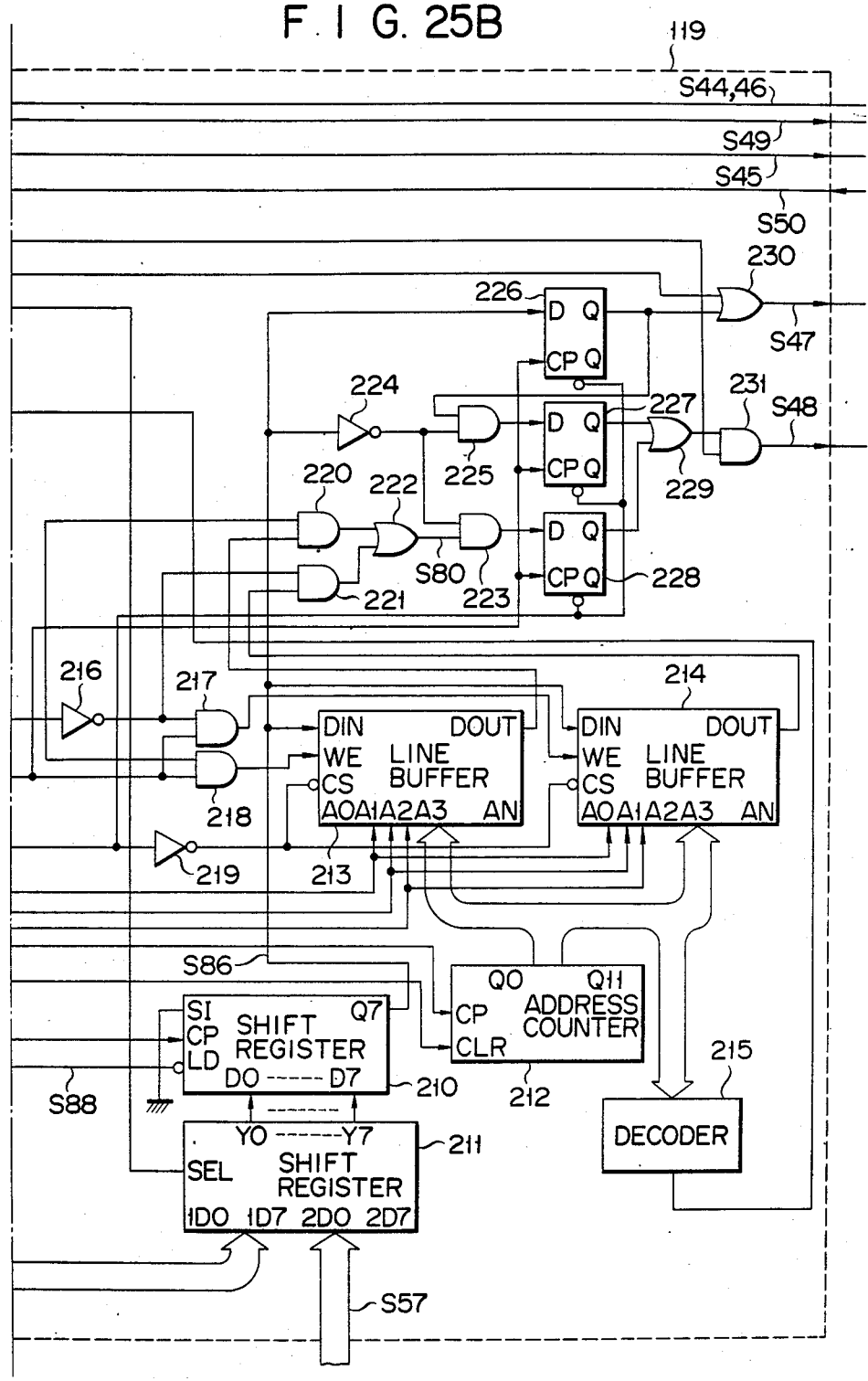

FIGS. 25A and 25B are a detailed circuit diagram of the printing data writing controller 119 in FIG. 13. The main functions of the controller 119 will be described below. The controller 119 serially converts the parallel printing data S57 so that the data S57 is recorded on a predetermined area of the drum 301 so as to correspond to a paper size to be printed, and supplies the converted data to the laser modulation circuit 120. The controller 119 fetches the shadow signal for improving printing quality from the data content of the data S57, and supplies it to the circuit 120 together with the printing data. The controller 119 generates a signal required for setting the optical output in the circuit 120. Furthermore, the controller 119 supplies to the interface 122 a timing signal for controlling data supply from the printing data controller 2. In addition, the controller 119 generates a test print pattern required for maintenance.

Referring to FIGS. 25A and 25B, reference numeral 186 denotes an I/O port for supplying/receiving signals required for control in the circuit 120 and the controller 119; and 187 and 188, counters/timers for controlling writing positions of the printing data, generation of the test pattern, sampling of the laser output and the like. Reference numeral 189 denotes a crystal oscillator for generating a reference clock of an image clock pulse having an oscillation frequency of about 32 MHz. Reference numeral 190 denotes a circuit for generating the image clock pulse (about 8 MHz) corresponding to 1 dot as a minimum modulation unit of the laser beam. Reference numeral 191 denotes a control counter for serially converting the printing data received from the interface 122 in units of bytes (8 bits); 192, a circuit for generating the test pattern used in the maintenance mode (when the circuit 192 is selected, the test print is performed, and the various adjusting switches described above are operated); 211, a multiplexer for selecting the test pattern data and the printing data from the interface 122; 210, a shift register for serially converting 8-bit parallel data from the multiplexer 211; 213 and 214, line memories having a capacity of 4096 bits; 212, an address counter for the memories 213 and 214; and 215, a decoder for generating a signal for controlling the circuit 192. Reference numerals 226, 227 and 228 denote flip-flops for synchronizing supply timings of the printing data and the shadow data.

Figure 26:
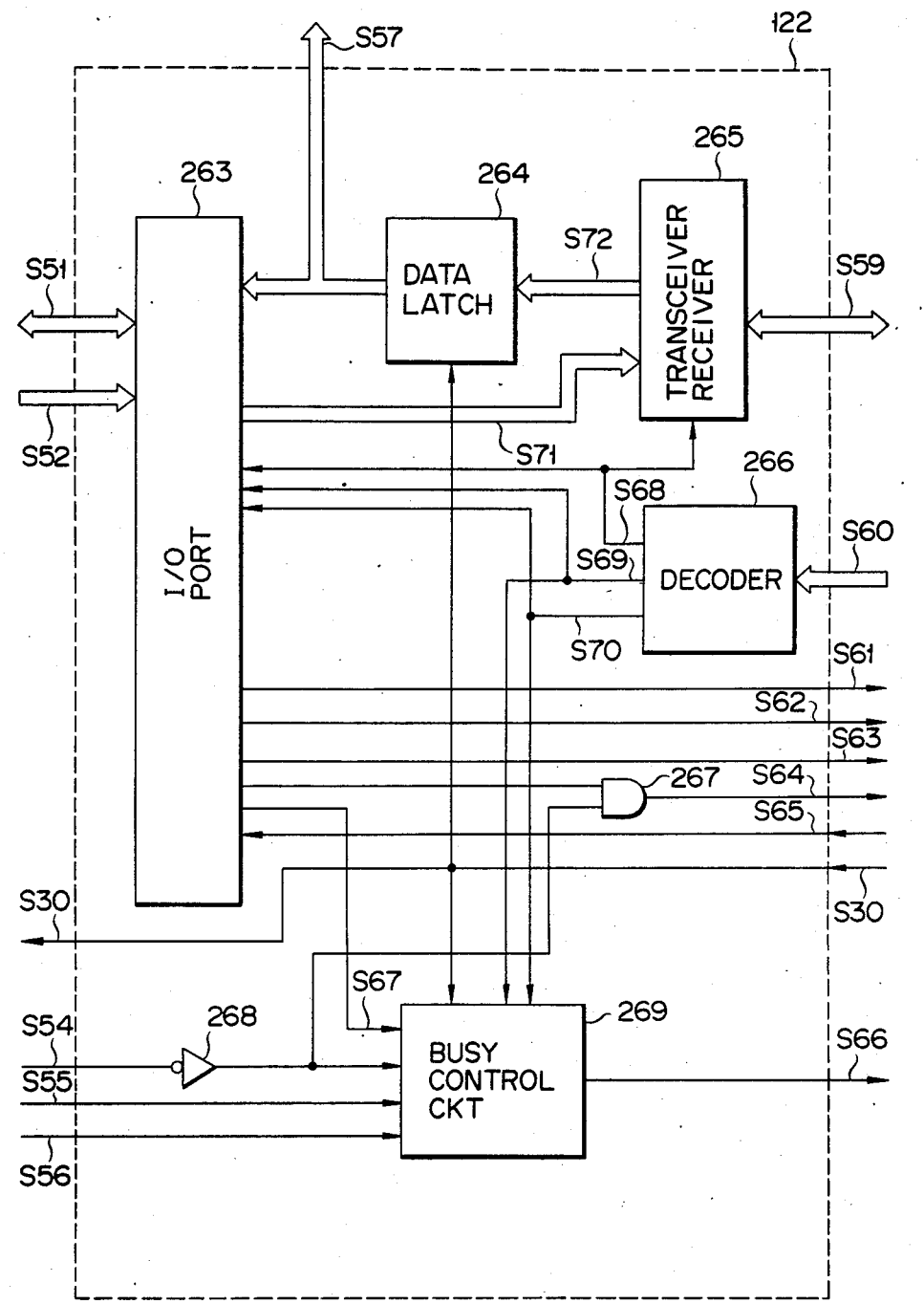
FIG. 26 is a circuit diagram of an interface in FIG. 13.

The counters 187 and 188 will be described in more detail below. Reference numeral 275 denotes a counter for determining a laser intensity compensation timing for each line (horizontal scanning line) by counting the reference clock signal S53 and generates a sample signal S75 used for intensity compensation and line start. Reference numeral 276 denotes a counter for determining a horizontal recording start position by counting a Q7 output (video 8-dot unit signal) S83 from the counter 191 and generates a horizontal recording start position (left margin) signal S84. Reference numeral 277 denotes a counter for determining a horizontal recording end position by counting the signal S83 and generates a data write end position (right margin) signal S85. Reference numeral 278 denotes a counter for determining a vertical recording start position by counting the output from a gate 198 which receives as two inputs a paper leading end position (page top) signal S74 generated from the I/O port 186 and a Q output of the flip-flop 204. The counter 278 generates a page top count output S76. Reference numeral 279 denotes a counter for determining a vertical recording end position by counting the output of the gate 198 and generates a page end count signal S77. Reference numeral 280 denotes a counter for controlling a vertical test pattern by counting the Q output from the flip-flop 204 and generates a test pattern control signal S79. FIG. 26 is a detailed circuit diagram of the interface 122 shown in FIG. 13. Referring to FIG. 26, reference numeral 263 denotes an I/O port for receiving the command data and the print start signal from the controller 2 and for supplying the status data and the ready signal to the controller 2; 264, an 8-bit latch for the command and printing data; and 265, a transmitter/receiver for an interface data bus S59. Reference numeral 266 denotes a decoder for a data selection signal S60, which designates data on the data bus S59; and 269, a busy control circuit for a busy signal for controlling a data supply timing with respect to the controller 2 when the printing and command data are to be received.

An interface signal will be described in more detail below. Referring to FIG. 26, reference symbol S59 denotes the bidirectional 8-bit data bus; and S60, the data selection signal on the data bus S59, which selects the data on the bus S59 by a combination of signals IDCOM and IDSTA. Reference symbol S61 denotes a signal IPRDY for indicating that the printing controller 100 is in the ready mode; S62, a signal IPREQ for allowing supply of a print start signal IPRNT from the controller 2; and S63, a signal IPEND. When the controller 2 receives the signal IPEND, it stops supplying the printing data. Reference symbol S64 denotes a supply request signal IHSYN for requesting the printing data to be supplied for one line; S65, the print start signal IPRINT; S30, a strobe signal ISTB of the command and printing data; S66, a signal IBSY for allowing supply of the signal S30 and fetching of the strobe data at the controller 2.

The command and printing data are generated on the output line (bus) S72 of the transmitter/receiver 265 when a status identification signal S68 is at the LOW level. The data on the bus S72 is latched by the latch 264 by the signal S30. When the latched data is the command data, it is latched by the I/O port 263, and the command is identified, and a given operation defined by the command is performed. The printing data is supplied through an output bus S59 to the data writing controller. The status data is supplied in the following manner. When a request command of the status data is received by the controller 100, a status content corresponding to this command is set in a status data output S71 of the I/O port 263. The status data S71 is supplied to the transmitter/receiver 265. The input data is generated onto the data bus S59 when the signal S68 is at the HIGH level.

FIGS. 27 and 28 show commands and statuses used in the controller 100 in detail. Referring to FIG. 27, reference symbols SR1 to SR6 denote status request commands corresponding to statuses 1 to 6 in FIG. 28; PSON, a power save command for reducing power consumption of the fixer 331; and PSOF, a release command for releasing the power save mode. In the nonrecording mode, power consumption of the fixer 331 is reduced so as to save power in accordance with the command PSON, and in the recording mode, power is increased to a normal value so as to fix toner in accordance with the command PSOF. Reference symbol CSTU denotes an upper cassette paper feed designating command; CSTL, a lower cassette paper feed designating command; VSYNC, a command for initiating supply start of the printing data from the controller 2; MF1 to MF9, commands for designating the manual feed mode; TBM1 to TBM4, top/bottom margin commands for designating the print start position on the paper; and SOF, a command for forcibly turning off the shadow exposure mode.

Referring to FIG. 28, "paper convey" denotes a status representing that a paper sheet is fed and being conveyed in the printer; "selection switch ON", a status representing that the selection switch 354 of the operation unit is depressed; "VSYNC request", a status representing that the printing controller 100 has received the print start command and the reception of the printing data is enabled; "manual feed", a status representing that the paper feed mode is in the manual feed mode; "upper/lower cassette", a status representing a selected cassette in the cassette paper feed mode; "top/bottom margin", a status representing a state of the top/bottom margin selected by the top/bottom margin command (TBM1 to TBM4); "cassette size (upper)" and "cassette size (lower)", statuses representing the cassette size codes of the loaded cassettes; "test/maintenance", a status representing a test/maintenance state; "data resupply request", a status representing the case wherein reprinting operation is required due to a papar jam and the like; "waiting", a status representing that the fixer of the printer is in the warming up state; and "power save", a status representing that the printer is in the power save mode by the power save command (PSON). A status "operator call" represents that at least one of the operator call factors of a status 4 has occurred. A status "service man call" represents that at least one of the service man call factors of a status 5 has occurred. A status "tray full" represents a state wherein a predetermined number of paper sheets or more is stacked on the tray and the tray is full. A status "toner bag replace" represents that the toner bag is filled to capacity with toner. A status "paper jam" represents that a paper jam has occurred in the printer. A status "toner empty" represents that no toner remains in the toner hopper. A status "cover open" represents that the front cover is not closed. A status "timing error" represents that a malfunction during transmission of the printing data has occurred. A status "fixer malfunction" represents that a malfunction such as heater disconnection, temperature fuse disconnection, and fixer malfunction or the like has occurred. A status "laser malfunction" represents that the output of the laser diode has not reached a repredetermined value or the beam detector has not detected the laser beam. A status "scan motor malfunction" represents that the scan motor has not reached the predetermined rotational speed after a given time has elapsed from when it was powered, or the predetermined rotational speed has not been maintained due to some cause. A status "heat roller replace" represents that a count of the fixer roller counter shown in FIG. 15 has reached a given value, and the fixer roller must be replaced. Similarly, a status "drum replace" represents that a count of the drum replace counter has reached a given value and the drum must be replaced, and a status "developing agent replace" represents that a count of the developing agent replace counter has reached a given value and the developing agent must be replaced.

FIG. 29 is a view illustrating a region irradiated with the laser beam during one scanning operation including the beam radiated portion 349 on the drum 301 shown in FIG. 3, and the positional relationship of a beam detecting position, a data writing position and the like in the beam radiated range. Referring to FIG. 29, reference numeral 416 denotes a beam scanning start point; 417, a beam scanning end point. The laser beam reaching the point 417 is then reflected by the next face of the polygonal mirror 313 and starts the next scanning operation at a time 0. Reference numeral 418 denotes a beam detection start point of the beam detector 346; and 428, a left end face of the drum 301; and 429, a right end face thereof. Reference numeral 419 denotes a left end face of the A3-size paper; and 420, a right end face thereof. Reference numeral 421 denotes a data write start point of the A3-size paper; and 422, a data write end point thereof.

Reference numeral 423 denotes a left end face of the A6-size paper; 424, a right end face thereof; 425, a data write start point thereof; and 426, a data write end point thereof. Reference numeral 427 denotes the center of the paper.

Reference symbol d4 denotes the distance between the points 418 and 421; d5, the distance between points 418 and 425; d6, the distance between points 418 and 426; and d7, the distance between the points 418 and 422. Reference symbol d8 denotes the distance between the point 418 and the right end face 420. Reference symbol d3 denotes a range for one beam scanning operation. Reference symbols d9 and d10 denote effective printing ranges for the A3- and A6-size paper, respectively. As can be seen from FIG. 29, since paper sheets are always fed about the center 427 in the printer of this embodiment, the distance between the write start point and the point 418 differs in accordance with each paper size. Therefore, when the detector 346 detected the laser beam in correspondence with the paper size, the data write operation must be performed after the time corresponding to the distance from the beam detected position to each write start point has elapsed. Instead of such control, since the printer of this embodiment does not adopt a paper edge feeding mechanism, the overall surface of the paper can be subjected to printing. In this embodiment, left and right margins of the paper are set to be 3 mm, but cannot be 0. In a conventional printer having the paper edge feeding mechanism, 8 to 10 mm for left and right margins are required, and a large portion of the paper cannot be subjected to printing.

Figure 30:
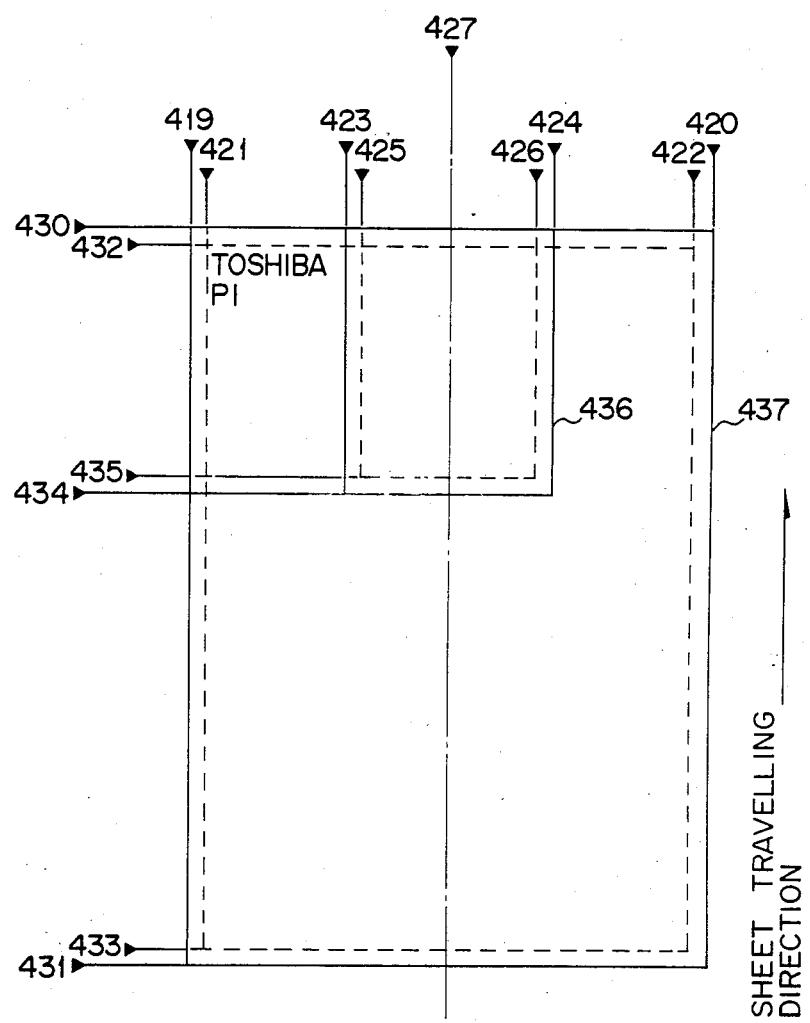
FIG. 30 is a plan view showing a printing area portion of the overall paper sheet including the paper size of FIG. 29.

FIG. 30 shows paper sizes and printing area portions in terms not only of the horizontal direction but also of the overall surface of the paper. Referrin9 to FIG. 30, reference numeral 436 denotes an A6-size paper; and 437, an A3-size paper. Reference numerals 419, 420, 421, 422, 423, 424, 425, 426 and 427 denote the points illustrated in FIG. 29. Reference numeral 430 denotes a leading end of the paper; 432, a vertical data write start point; 431, a trailing end of the A3-size paper; and 433, a data write end point thereof. Reference numeral 434 denotes a trailing end of the A6-size paper; and 435, data write end point thereof.

Figure 31:
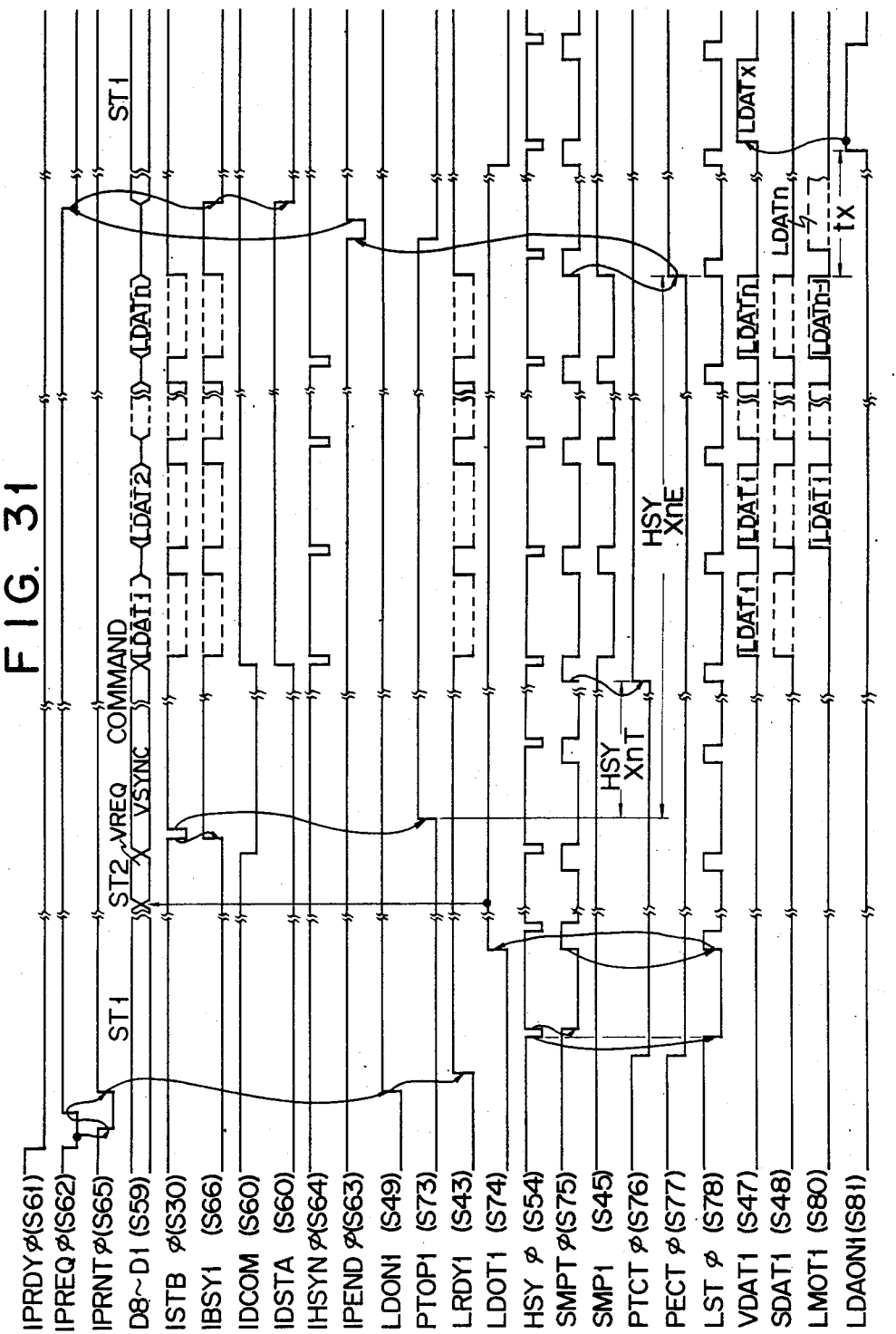
FIGS. 31 and 32 are timing charts for explaining an operation of the circuit shown in FIG. 25.
Figure 32:
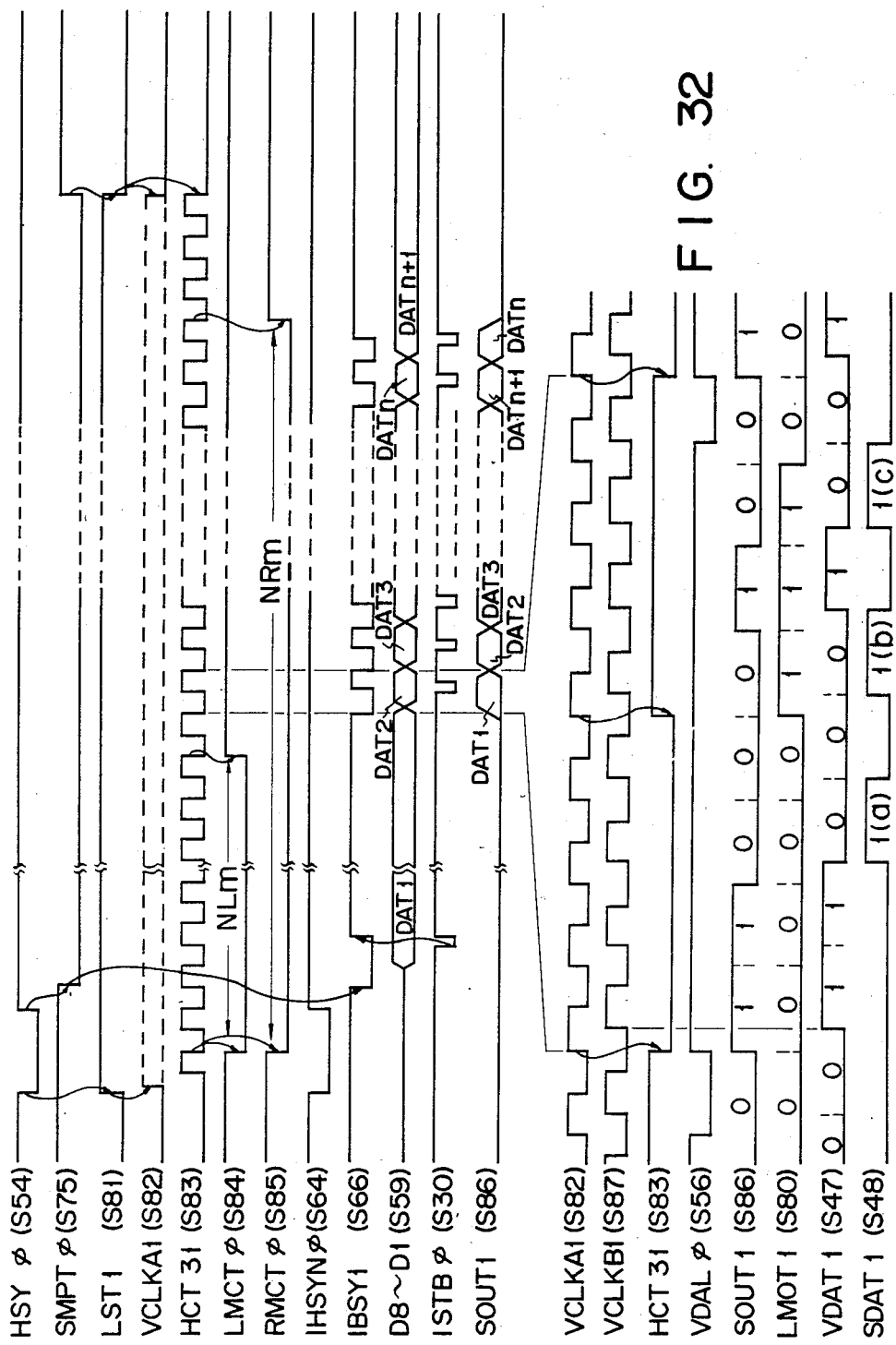

The operation of the apparatus with the above arrangement will be described hereinafter with reference to timing charts shown in FIGS. 31 and 32.

First, the ready signal IPRDYO (S61) of the controller 100 is changed in a print enable state. Simultanelusly, the print start signal IPREQO (S62) rises. Then, the laser enable signal LDON1 (S49) goes to "1" level. In response to the signal S49, the transistor 258 shown in FIG. 17 is turned on. At this time, the flip-flops 226 to 228 in FIG. 25 are not set, and both the printing data signal S47 and the shadow signal S48 are kept at "0" level. Since the signal S49 is at "1" level and the signals S47 and S48 are at "0" level, the gate 246 shown in FIG. 17 is enabled, the analog switch 254 is turned on, and the laser diode 259 emits light. In response to this, the photodiode 260 is operated, the operational amplifier 238 is operated through the operational amplifier 232, and the laser ready signal LRDY1 (S43) is generated. The sample signal SMPT0 (S75) is generated from the counter 275 of FIG. 25A in synchronism with the horizontal synchronizing signal HSY0 (S54). The signal S75 is utilized for setting a time corresponding to the distance d3 (the length of one line) between the points 416 and 417 in FIG. 29 defining the paper size. Therefore, the signal S75 is used for performing intensity correction and as a line start signal. That is, in response to the signal S75, the gate 193 shown in FIG. 25 is enabled, and the sample signal S45 is generated from the gate 194, thereby turning on the analog switch 236 through the gate 244 shown in FIG. 17. Thus, a correction signal is supplied to the laser diode 259 so as to perform intensity correction for each line. Reference symbol PTCT0 (S76) denotes an output signal of the counter 278 (page top counter) determining a leading end of the paper; and PECT0 (S77), an output signal of the counter 279 (page end counter) determining a trailing end of the paper. At a timing at which image data can be written, the status "VSYNC request" is supplied to an external circuit. Thus, the VSYNC command is produced, and in response to this, the signal PTOP1 (S73) is generated, thus starting the counting of the number of the HSYNC signals from the point defined by the signal S73. Similarly, the end position is designated. In order to change the designated value, a top margin nT and a bottom margin nE are provided. In this case, when the VSYNC is supplied, the PTOP signal is generated before a leading end of the paper. When a top margin of 5 mm is required, the number of lines including the top margin is counted. Assuming that the top margin is 10 mm, the data corresponding to this value is set in the timer. Similarly, the bottom margin is determined. When the data is set in the timer, the gate is enabled so as to start counting, and is disabled when the counting ends. In this manner, the printing area is determined by the gate 201 in FIG. 25A. Reference symbol LST0 (S78) denotes a $\overline{Q}$ output of the flip-flop 204 as a timing signal which is set by the HSYNC signal and is reset in synchronism with a leading edge of the sample timer signal (S75). This reset line data is included in the LDON signal (S49) shown in FIGS. 25A and 25B, and the reset operation is forcibly performed with the reset line data. In response to this, the Q output is generated from the flip-flop 204 and the clock generator 190 is operated sc as to count the clock signals from the oscillator 189. The generator 190 4-frequency divides the clock signals from the oscillator 189 and generates a signal in units of bits only when the line start signal LST is at the HIGH level. The output from the generator 189 corresponds to signals S82 and S87 having different phases, thereby synchronizing the printing operation for one line. Reference symbol VDAT1 denotes the printing data signal (S47) generated as serial data by the shift register 210. The register 210 is operated in response to the signal S82 from the generator 190. However, when the load signal S88 is not supplied to the register 210, the output S86 therefrom is at "0" (no write operation is performed with the laser beam). When the signal S88 is supplied thereto, the register serially converts the data D5 to D12 and generates the serial data. In this case, the data are loaded once for each 8 bits. A generation timing of the load signal S88 will be described hereinafter. In the actual write operation, data is set every time the paper size is changed, and this operation is controlled by the left and right margin counters 276 and 277 (data are d9 and d10 in FIG. 29). In this case, the left and right margins are defined with reference to the center of the paper. When the LST signal (S78) is generated in synchronism with the HSYNC signal, the flip-flop 196 is set, thereby enabling the gate 198. Thus, the counter 276 starts counting. In this case, the counter 276 counts the video clock signal not for each bit but for each 8 bits. When the count output generated for each 8 bits is set to correspond to the left margin NLm and the right margin NRm, the counting operation synchronous with the signal (S78) can be performed. When the preset number of count outputs has been generated, the signal S78 rises. Therefore, the gate 201 determines the vertical position, and the gate 199 determines the horizontal position. The data is written at the point when both the gates 201 and 199 charge to HIGH. At this timing, the load signal is generated, and the data S86 is generated from the register 210 to be converted into serial data.

A line memory out signal LMOT (S80) is an output of the OR gate 222, and controls which data stored in the line memories 213 and 214 is to be supplied. The timing of the signal S80 is controlled by the flip-flop 203. The output of the flip-flop 203 is altered every time the clock pulse is supplied thereto, thereby alternately, enabling the gates 220 and 221. Thus, the output DOUT from the line memory 213 or 214 is alternately read out. A write timing of the line memories 213 and 214 is also controlled by alternately enabling the gates 217 and 218. This is because when a shadow method (to be described later) is adopted, the data write and read operations can be simultaneously performed, thereby facilitating data processing.

Figure 43:
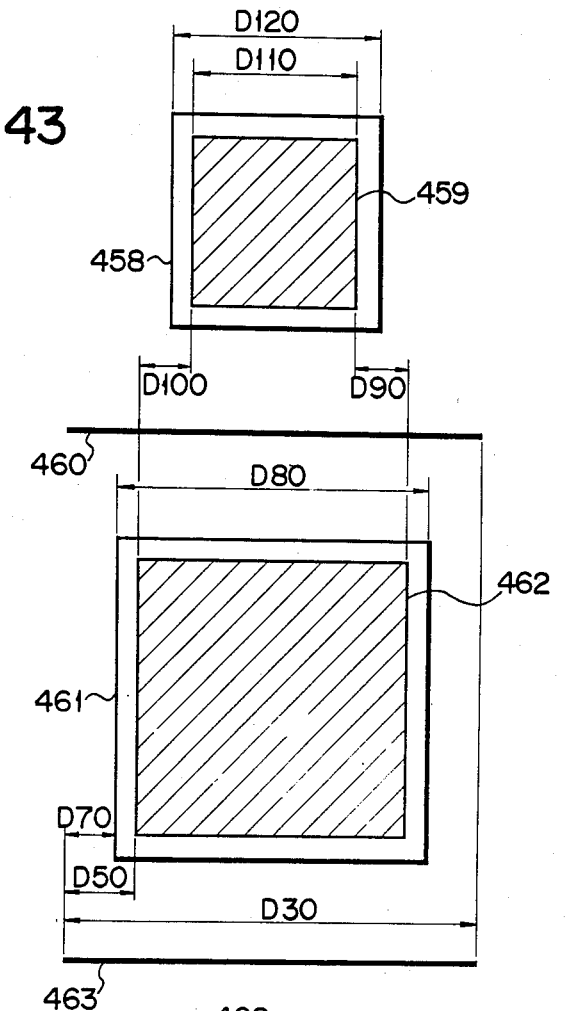
FIG. 43 is a view showing the relationship between the photosensitive member and the paper sheet.

A signal LDAON1 (S81) will be described with reference to FIG. 43.

In this recording apparatus, when the photosensitive drum 301 is not irradiated with the laser beam entirely along its axial direction, for example, only the small size paper (e.g., the paper 458 shown in FIG. 43 such as B5- or A4-size paper) is subjected to printing, toner is not applied to portions near the two ends of the drum 301. Even when large paper (e.g., the paper 461 shown in FIG. 43) is used, an unused region is present (in the small paper 458, a region used is a hatched potion 459). During printing, if there are many regions where no toner is applied, when the residual toner is removed by the cleaning blade after the recording operation, friction between the nonapplied region and the blade is high, thus damaging the surface of the drum. Thus, in the apparatus of this embodiment, as shown in the timing chart in FIG. 31, immediately after completing the printing operation for each paper sheet, the line data ON signal LDAON1 (S81) is generated, and during the interval of the signal S81, the printing data signal VDAT1 (S47) is forcibly supplied. With this operation, lines (images) 460 and 463 are formed on the drum 301 entirely along its axial direction after the printing operation for each paper sheet, thus eliminating the above drawback. In this case, this line data is generated after a predetermined time tx has elapsed from the falling of the data LDATn−1 preceding the final data LDATn in the line memory out signal LMOT1 (S80). Note that such a line need not always be formed for each paper sheet, and can be formed for each lot (e.g., every 10 or 100 paper sheets).

A method for adding a "shadow" image to a letter to be printed for improving its readability (a so-called shadow method) will be described with reference to FIGS. 33 to 36.

The gates 220 to 225 which alternately receive data from the memories 213 and 214, the three flip-flops 226 to 228 and the gate 213 at the output side thereof discriminate whether the shadow signal S48 is to be generated. The flip-flop 227 serves to discriminate formation of the shadow image in accordance with a change in the horizontal level (line direction), and the flip-flop 228 serves to discriminate the formation of the shadow image in accordance with a change in the vertical level. Assuming that the serial data to be written is read out from the line memory 213 and the readout data sets the flip-flop 226, the previous line data remains in the flip-flop 227. For this reason, when the current data is "0" and the previous data is "1", for example, the shadow signal S48 is generated. Similarly, the previous data and the current data are compared by the gate 223, and when the current line data is "0" and the previous line data at the same position along the horizontal direction is "1", the flip-flop is set and the signal S48 is generated. This state is illustrated using the shadow out signal SOUT1 (S86), the printing data signal VDAT1 (S47) and the shadow signal SDAT1 (S48) in FIG. 32.

Figure 33:
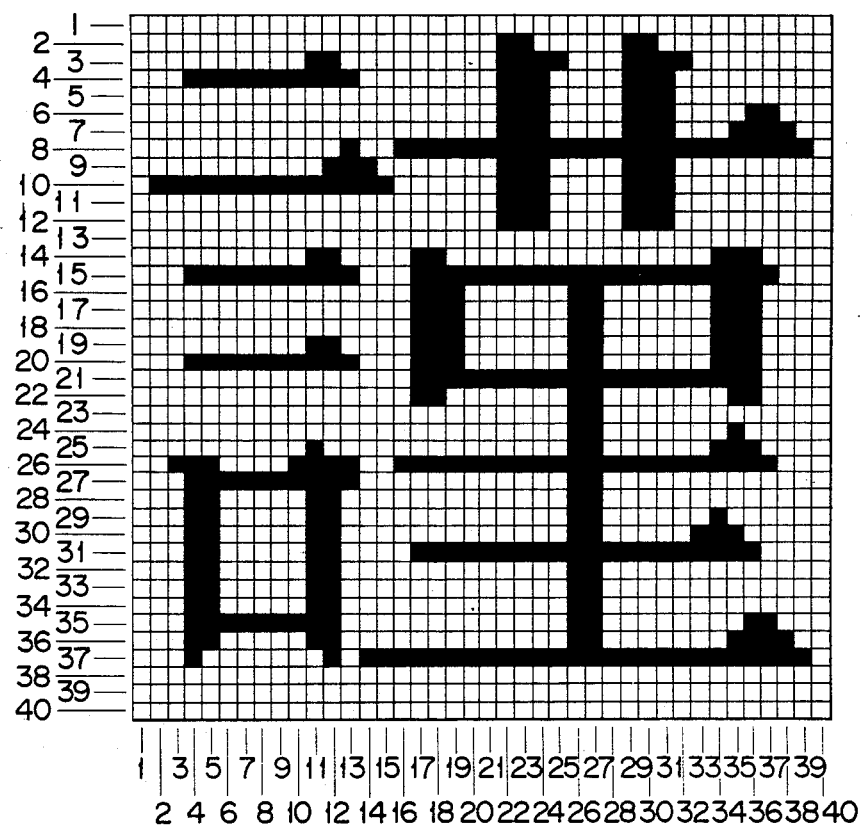
FIGS. 33 and 34 are illustrations showing printing patterns printed on the paper sheet.
Figure 34:
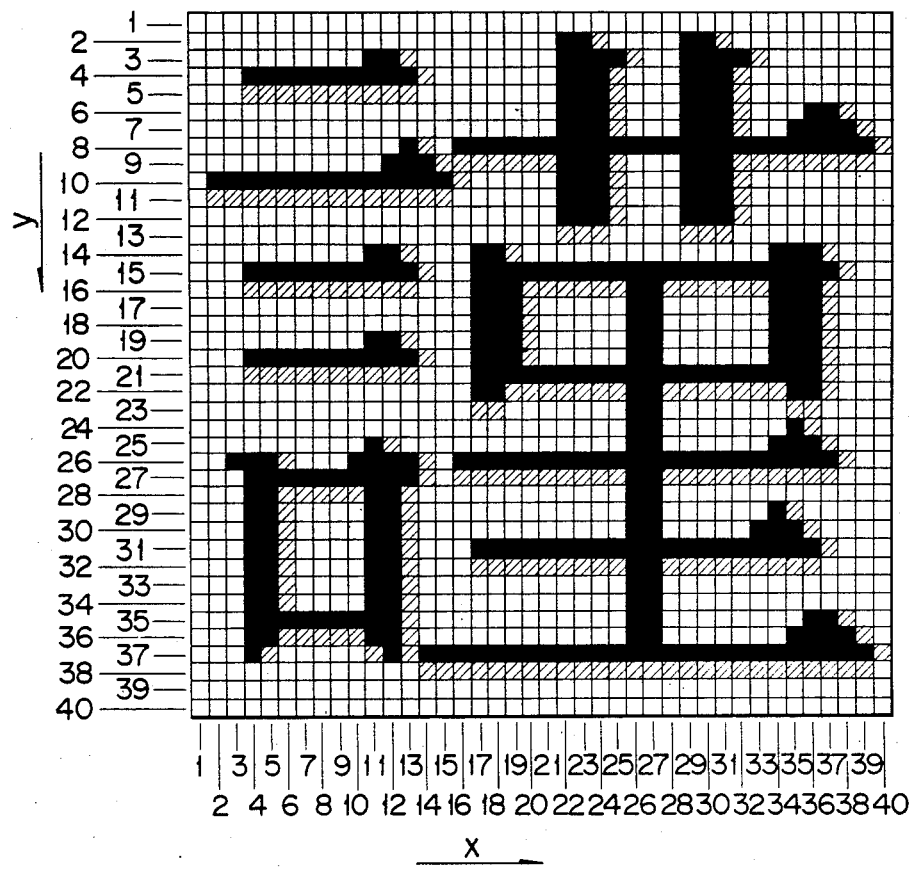

FIG. 33 shows a conventionally developed pattern where the shadow method is not used. FIG. 34 shows a developed pattern where the shadow method is used. In this manner, when a Japanese character "值" is printed, since the shadow image is added to the character shown in FIG. 34, it can be easily recognized.

Figure 35:
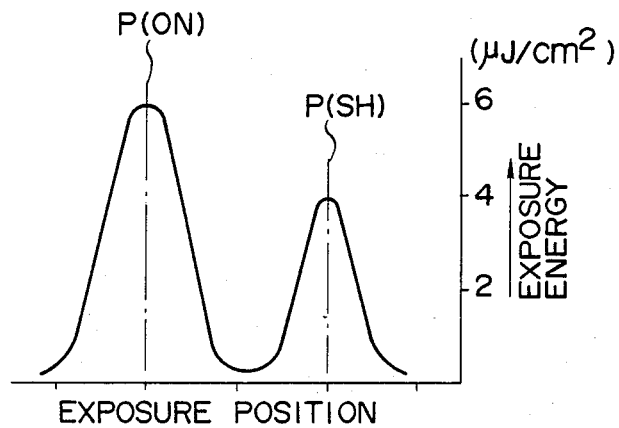
FIGS. 35 and 36 are graphs showing relationships among a surface potential, exposure energy and an exposure position for explaining an exposure control operation in the circuit shown in FIG. 25.
Figure 36:
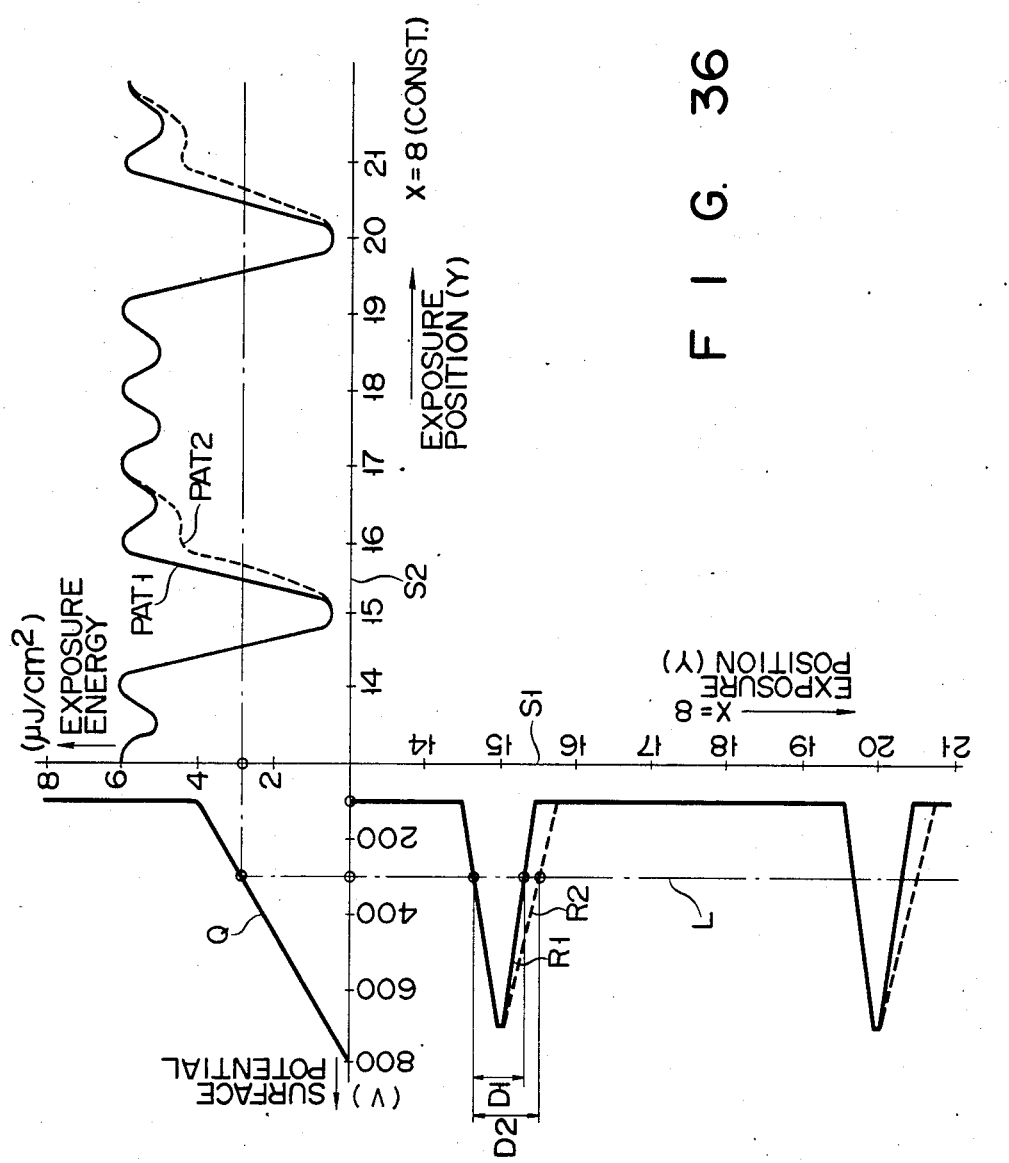

In FIG. 36, upon crossing vertical and horizontal lines S1 and S2, graphs PAT1 and PAT2 showing the relationship between an exposure position and exposure energy are arranged in an upper right region thereof, a graph Q showing the relationship between a surface potential of the photosensitive drum and the exposure energy is arranged in an upper left region thereof, and graphs R1 and R2 showing the relationship between the exposure position and tne surface potential are arranged in a lower left region thereof. It should be noted that in FIG. 36, a portion or "8" along the X direction and "14 to 21" along the Y direction of each of the characters shown in FIGS. 33 and 34 is sampled. As shown in FIG. 36, the graphs PAT1 and R1 of the pattern shown in FIG. 33 differ rrom the graphs PAT2 and R2 of the pattern shown in FIG. 34. Particularly, in image developing characteristics, it is found that a width D2 of the graph R2 in FIG. 34 is larger than a width D1 of the graph R1 in FIG. 33 at a developing level L. It should be noted that FIG. 35 is a graph showing the relationship between the exposure position and the exposure energy. The exposure energy of P(ON) is set to be, e.g., 6 mW in the main exposure mode, and that of P(SH) is set to be, e.g.. 4 mW in the shadow exposure mode.

The shadow method can be summarized as follows.

In an apparatus for recording data (e.g., character data and the like) on a recording photosensitive member by means of beam scanning so as to correspond to a difference in beam intensity, serial, binary input data are recorded in accordance with a beam having first and second intensities (i.e., the levels P(ON) and P(SH)), and when the input data have a specific relationship, the input data are recorded by means of a beam having a third intensity (halftone) between the first and second intensities. When beam scanning is performed, e.g., for each horizontal line, tne specific relationship is discriminated as follows: (a) when it is discriminated that the binary data along the horizontal line is changed from significant recording data (for forming a character) into insignificant recording data (where a character is not formed), the insignificant recording data portion is irradiated with the beam having the third intensity immediately after this change; and (b) current line data in the horizontal line is compared with previous line data in the vertical direction at a position corresponding to the current data, and when they are changed from significant into insignificant data in the same manner as in (a), the insignificant data portion is scanned with the beam having the third intensity immediately after this change.

Note that when the shadow method is adopted, it can be applied irrespective of the type of recording data (e.g., character and image data). However, this method is preferably used for character data. In this case, as shown in a flow chart in FIG. 55A, a microprocessor checks if a "shadow" flow is to be executed. If the input data is character data, the flow advances to the "shadow" ON flow, and if it is other than the character data (e.g., image data) the microprocessor does not execute the "shadow" flow. A command in this case is "SONF shadow ON/OFF" shown in FIG. 27. Alternatively, a "shadow ON/OFF" switch if provided on an operation panel and is selected by the operator.

If the shadow method as described above is used, when the recording data is character data, the "shadow" image can be added, thus improving printing quality. Particularly, unlike a conventional recording method using two beam intensity levels, in a high-density beam recording mode, a "brur" line due to a decrease in a printing density of one dot line is not formed. As a result, since the printing density of one dot line can be increased, printing quality of a complex kanji font having a 40×40-dot configuration can be improved. In addition, since the tolerance range of a vertical drift of a beam radiated on the photosensitive drum due to "face drift" of a polygonal mirror can be widened, the polygonal mirror can be easily manufactured, thus reducing its cost.

Note that in addition to character data, the shadow image can be added to simple figure data.

Charging correction will be described with reference to flow charts shown in FIGS. 37 to 41 and 56.

Figure 37:
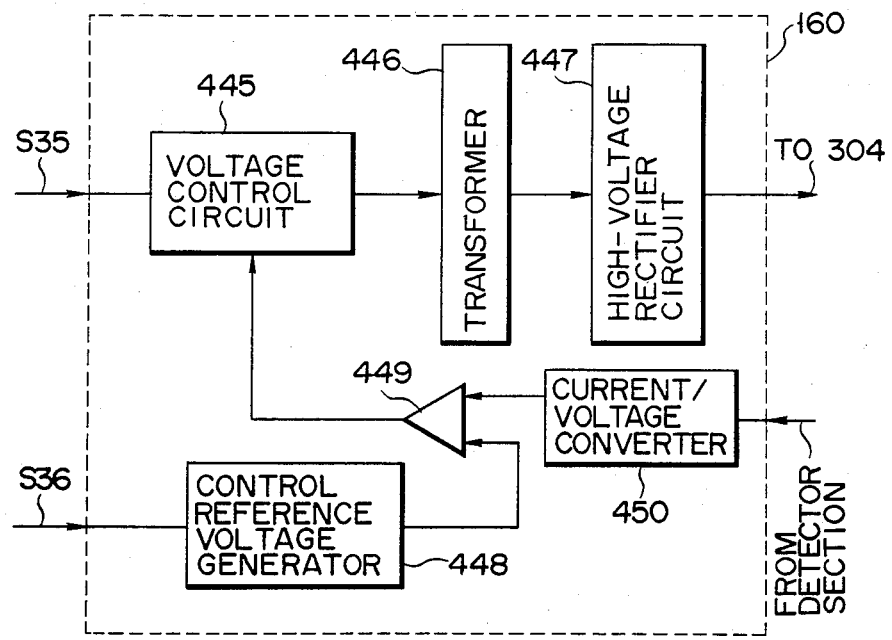
FIG. 37 is a detailed block diagram of a charging high voltage power source in FIG. 15.

FIG. 37 shows an arrangement of the charging high voltage power source 160. The power source 160 comprises a voltage controller 445 controlled by a high voltage power source ON/OFF signal S35; a step-up transformer 446 having a primary side for receiving a frequency output from the controller 445 and a secondary side for generating a high voltage output; a high voltage rectifier 447 for rectifying the output from the transformer 446 so as to supply a rectified output to the charger 304; a current-voltage converter 450 for converting a current flowing through the charger 304 into a voltage; and an operational amplifier 449 which receives the output from the converter 450 as one input and the output from a reference voltage generator 448 as the other input. The generator 448 is controlled by an analog control signal S36 so as to generate different reference control voltages. With this arrangement, in accordance with the output from the generator 448, the output frequency of the controller 445 is determined, and the high voltage output is accordingly generated from the transformer 446. The current flowing through the charger 304 is supplied to the converter 450, and the output voltage from the converter 450 is compared with the reference voltage by the operational amplifier 449. Thus, since the power source 160 is controlled to adjust these voltages so that they coincide with each other, an output application voltage can be stabilized.

The content of the analog control signal S36 will be described in detail.

Figure 38:
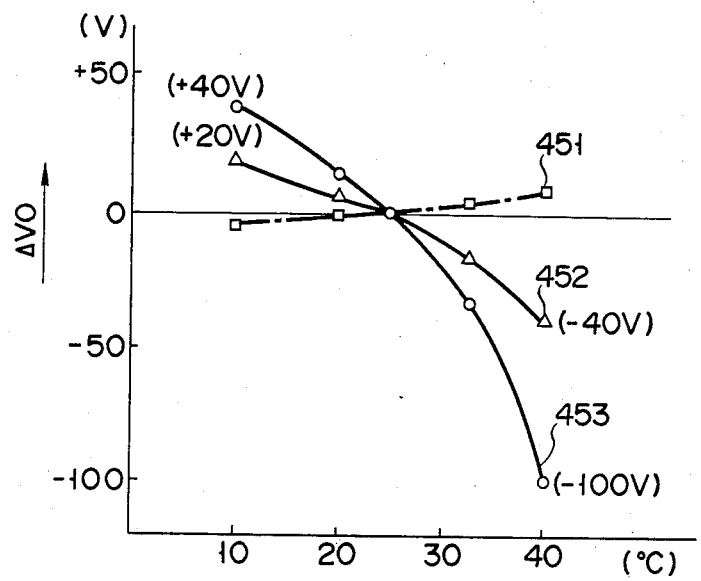
Figure 39:
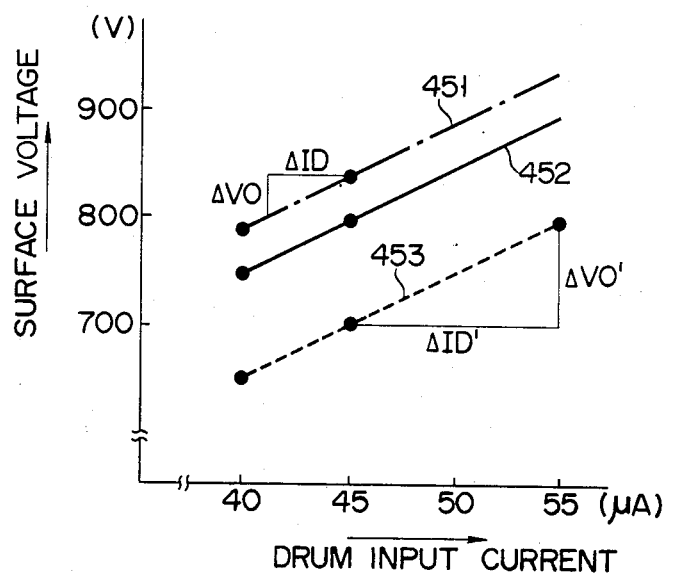
FIGS. 39 to 41 are graphs for explaining an operation of the circuit shown in FIG. 37.
Figure 41:
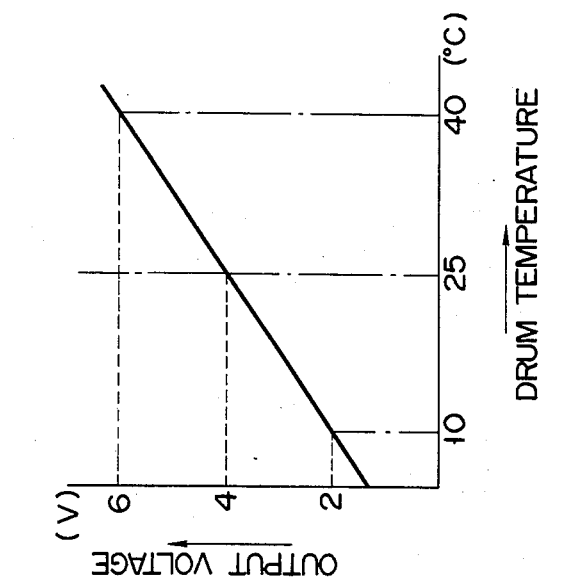
Figure 40:
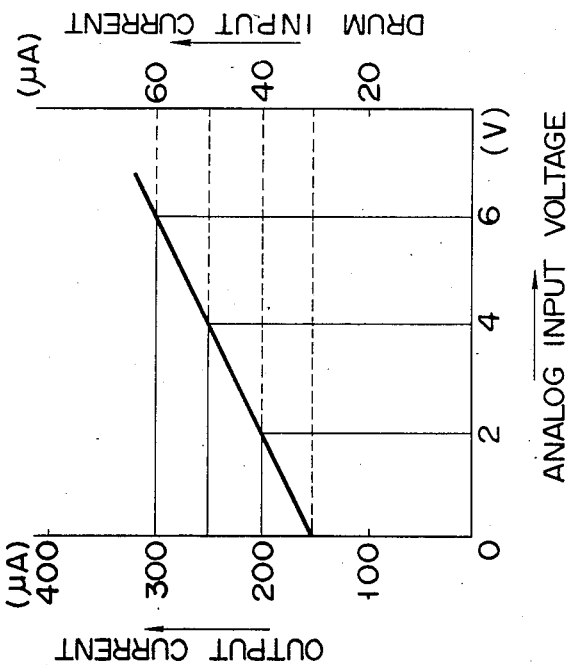

As shown in FIG. 38, the surface potential of the photosensitive drum 301 is greatly changed in accordance with a change in temperature. In FIG. 38, the abscissa represents a temperature and the ordinate represents an amount of change $\Delta V0$ in the surface potential. In this case, drums 451, 452 and 453 have different characteritics. FIG. 39 shows the relationship between drum flow-in currents ID qf the drums 451, 452 and 453 and the surface potential V0 indicated by parallel lines. In order to maintain a constant surface potential, the current ID can be changed. As can be seen from FIG. 39, for example, in the drum having the characteristic 451 in FIG. 38, in order to maintain the surface potential at 800 V, the amount of change $\Delta ID$ in the current ID corresponding to the amount of change $\Delta V0$ in the surface potential can be substracted from the current ID. In the drum having the characteristic 453, an amount of change $\Delta ID'$ corresponding to the amount of change $\Delta V0'0$ can be added to the current ID (various characteristic data of the photosensitive drum are stored in the RAM 107). Note that since the current ID and an output current are proportional as shown in FIG. 40, when the analog signal (input voltage) S36 supplied to the generator 448 in the power source 160 is changed to 2 V, 4 V and 6 V, the current ID can be adjusted. FIG. 41 shows the relationship between an analog input current (an output voltage from the D/A converter shown in FIG. 15) and drum temperature. For example, the temperature of the drum 301 is detected by the temperature sensor 442 (thermistor shown in FIG. 14), and the signal S36 is applied thereto in accordance with a change in temperature.

The charging correction is performed as described above, and the operation will be further described hereinafter with reference to FIG. 56. When the thermistor 342 shown in FIG. 14 detects the drum temperature, the detection signal therefrom is converted into a digital signal by the A/D converter 271. Thereafter, the microprocessor fetches a value DΔT obtained by subtracting the current temperature data DTn from the temperature data DT25 at a temperature of 25° C. Then, the microprocessor fetches the reference data DV25, calculates DV25+DΔV, and supplies the sum data DVn to the D/A converted 165. The microprocessor discriminates the drum characteristic No with reference to the drum characteristic data at the address "6000" in the RAM 107 shown in FIG. 45B, and fetches feedback error data DΔV. Then, the microprocessor fetches the reference data DV25 at a temperature of 25° C., calculates DV25+DΔV, and supplies the sum data DVn to the D/A converter 165. The microprocessor applies the voltage Vn to the analog input of the high voltage power source 160, and turns on the control input signal S35 of the power source 160, thus performing correction. As the temperature increases, the correction is repeated, and the surface potential of the drum is kept constant.

Note that the various drum characteristics stored in the RAM 107 can be enternally designated by the operator. That is, as shown in flow Ⓒ in FIG. 60B, and If YES in this step, the drum characteristic No is set, thereby turning on test key. Thereafter, the drum characteristic No is written in the drum characteristic No area of the RAM 107. Therefore, the current drum characteristic is always selected thereafter, and the correction is performed in accordance therewith.

When the above charging correction is performed, even if the drum temperature is changed due to an environmental change or on increase in temperature of the interior of the printer, the charging potential of the drum can be kept constant. Thus, a decrease in the charging potential due to a change in temperature, a decrease in the printing density or degradation in the printing quality due to an increase in the charging potential can be prevented, and clear images can always be provided. In this embodiment, when data classifying the temperature characteristics of the drum is inputted (set in an external circuit), since the correction in accordance therewith can be performed, temperature correction of the charging characteristic can be precisely performed. Therefore, a variation in the temperature characteristics of the drum can be eliminated and photosensitive drums having various specifications can be adopted.

Operation of the overall apparatus according to the present invention will be described with reference to flow charts shown in FIGS. 47A to 56 and timing charts shown in FIGS. 57 to 59.

Respective timers (counters) used in a description of an operation hereinafter will be defined. A timer A is provided for a stand-by operation from a print start to generation of a signal VSYNC, a timer B controls from the generation of the signal VSYNC to reception of the data, timers C and D control from data transmission start to register motor stop and toner replenishment, and a timer E controls data reception end and stop sequences.

The microprocessor checks if; the door switch 129, the paper discharge switch 336, the manual stop switch 328, and the pass sensor 123 are turned off, if the temperature fuse 130 is disconnected, the paper discharge tray 384 is full, and the operation mode is set in the test print, maintenance or replace mode. If there is no problem in these steps, the MC relay 131, the fixer heater lamp 333 and the scan motor 312 are turned on, thereby initiating the timer A (TIMA). When the count of the timer A reaches a predetermined time t1, mechanisms such as the drum motor, developer motor and the like are turned on. When the count of the timer A reaches a predetermined time t2, the laser 344 is turned on. When the count of the timer A reaches a time t25, the microprocessor checks if the laser is in the ready mode. If Y (yes) on this step, the timer TIMA=t26 is counted, and the transfer charger, the laser, developer motor, and the developing bias are respectively turned off When the count of the timer A reaches a time t27, the drum motor, the heat roller motor, the discharging lamp, and the pretransfer discharging lamp are turned off. At a timing TIMA=t29, the microprocessor checks if the scan motor and the HSYNC signal are in the ready mode, and if Y (yes) in this step, the timer A is stopped (see FIG. 47C).

Then, the microprocessor discriminates if the "tray full" flag in the status 4 is "1", if the "toner bag replace" flag in the status 4 is "1", and if the "toner empty" flag is "1". If "tray full" is indicated, after the paper sheets on the tray are removed, the microprocessor sets "0" in the "tray full" flag, and resets the paper discharge tray counter. If the "toner bag replace" flag is "1", after the toner bag is replaced, the microprocessor resets this flag. Similarly, in the case of "toner empty", after toner is supplied to the toner hopper, the microprocessor resets this flag. After these steps, the microprocessor discriminates if the "power save" flag of the status 3 is "1". If N (no) in this step, the microprocessor then discriminates if the "paper empty" flag is "1". If Y in this step, the microprocessor checks if the "cassette paper empty ON" flag is "1", and if N in this step, the microprocessor sets "0" in the "paper empty" flag. If the "fixer ready" flag is "1", the microprocessor sets "0" in the "waiting" flag. Then, the signals IPRDY and IPREQ go to the HIGH level, and the microprocessor checks if the "power save" flag and the "paper empty" flag are "1". If N in both steps, the timer A is started. When TIMA=t01, the register motor 149 is rotated in the reverse direction, and when TIMA=t02, the register motor is stopped. In this state, the leading end of the paper is held by the paper feed roller. Then, the microprocessor checks if the "manual feed" flag is "1", and if N, the microprocessor checks if the signal IPRNT is ON. If Y in this step, the signal IPREQ goes to the LOW level. Then, the microprocessor checks if the timer E (TIME) is in operation. If Y in this step, the microprocessor checks if TIME=t30. If Y in this step, the timer E is stopped, and the transfer charger 305, the peeling charger 306, the developer motor 141, and the fixer motor 143 are turned on. If the count of the timer E is not the time t30, the timer E is stopped, and the flow advances to a flow Ⓕ (see FIG. 48C).

Then, the timer A is started, and the blade solenoid 158 is turned on. When TIMA=t1, the developer motor 141, the discharger lamp 302, the lamp 303 and the drum motor 147 are turned on. When TIMA=t2, the transfer charger 305 and the fixer motor 143 are turned on. When TIMA=t3, the peeling charger 306 is turned on. When TIMA=t4, the timer A is reset and started again. Then, the microprocessor checks the "manual feed" flag, and thereafter, checks the "cassette upper/lower" flag. If the upper cassette is designated, the microprocessor rotates the paper feed motor 151 in the forward direction so as to feed the paper sheet from the upper cassette. If the lower cassette is designated, the microprocessor waits until TIMA=t5, and then rotates the motor 151 in the reverse direction so as to feed the paper sheet from the lower cassette. When TIMA=t5, the laser 344 is turned on, and when TIMA=t6, the charger 304 is turned on. When TIMA=t7, the microprocessor checks if the laser 344 is in the ready mode. If Y in this step, the microprocessor sets "1" in the "VSYNC request" flag in the status 1. Thereafter, the microprocessor starts the timer B (TIMB), and the flow advances to a flow Ⓖ (see FIG. 49B).

When TIMA=t31, the microprocessor stops the motor 151, and then checks if the VSYNC command is received. If Y in this step, the microprocessor checks if TIMB<t32. If Y in this step, the microprocessor stops the timer B and starts the page top and end counters, and the flow advances to the image recording processing. Then, the microprocessor starts the timers C and D (TIMC and TIMD). When TIMA=t34, the timer A is stopped, and the motor 151 is stopped. When TIMC/D=t35, the motor 149 is rotated in the forward direction, and the counter 354 is turned on. When TIMC/D=t36, the microprocessor discriminates the toner concentration. When the concentration is low, the microprocessor turns on the motor 159. The microprocessor checks if "page end interruption" is performed. If Y in this step, the microprocessor instructs the image write end pulse IPEND to be generated. Thereafter, the microprocessor increments the respective counters by one. Then, in this case, if any of; the "tray full" flag, the "drum replace" flag, the "developing agent replace" flag and the "heat roller replace" flag are "1", these states are displayed. Note that when it is discriminated whether or not the VSYNC command is received, if the result is yes (Y), the flow advances to the recording operation flow, as described above. On the other hand, if no (N), the charger 304 is turned off, it is checked if the timer B (TIMB), as a count means for counting a reference operation time from when peripheral devices required for the recording operation (e.g., the developer, the transfer charger, the cleaning blade, the laser diode, and the like) start operating, has counted a given time t46. If the time t46 has elapsed, the laser diode 344 is kept off for a given time interval t04 (i.e., the signal LDAONI (S81) goes to HIGH level for a time interval t05). As a result, the black line 460 (463) shown in FIG. 43 is recorded on the surface of the photosensitive drum 301 along its axial direction. Thus, if the stand-by mode is prolonged, since an image is recorded on the drum 301, toner is applied thereon and is removed by the cleaning blade as in a normal operation. In this manner, the surface of the drum and the cleaning blade can be prevented from being damaged. Thereafter the flow advances as follows. When TIMB=t47, the laser 344, the charger 306 and the motor 141 are turned off. When TIMB=t48, the charger 305 and the motor 143 are turned off. When TIMB=t49, the motor 147 and the lamps 302 and 303 are turned off. When TIMB=t50, the blade solenoid 158 is turned off. When the microprocessor checks if TIMB<t32, if the result is N, the microprocessor then checks if TIMB<t33. If N in this step, the microprocessor stops the timer B and starts the timer A. Thereafter, the microprocessor turns on the solenoid 158. When TIMA=t1, the microprocessor turns on the motors 141 and 147 and the lamps 302 and 303. When TIMA=t2, the microprocessor turns on the charger 305 and the motor 143. When TIMA=t3, the microprocessor turns on the peeling charger 306. Then, the microprocessor checks if TIMA=t4, and temporarily stops the timer A and starts it again. Thereafter, the microprocessor turns on the motor 141, the chargers 305 and 306 and the motor 143. When TIMA=t5, the laser 344 is turned on. When TIMA=t6, the charger 304 is turned on. When TIMA=t7, the microprocessor checks if the laser is in the ready mode. If Y in this step, the microprocessor stops the timer A (see FIG. 50).

The microprocessor checks if the toner full switch 126 is turned on. If Y in this step, this state is displayed. If N in this step, the microprocessor checks if the toner empty switch 125 is turned on, and the checked state is displayed. Then, the microprocessor checks if the "manual feed" flag is "1". If N in this step, the microprocessor displays this state and sets "1" in stop flag STPF flag. Then, the microprocessor starts the timer E. The microprocessor checks if STPF=1. If Y in this step, the microprocessor sets "0" in the STPF and disables the print ready signal IPRDY. If STPF is not "1", the microprocessor checks if the "manual feed" flag is "1". If Y in this step, the microprocessor stops the timer E, turns off the switch 328, sets "0" in the "manual feed" flag, stops TIMB, and then checks if the paper empty detection switch is kept ON. If N in this step, the print request signal IPREQ goes to the high level, and the flow returns to a flow Ⓘ in FIG. 48A (see FIG. 51B).

Figure 52A:
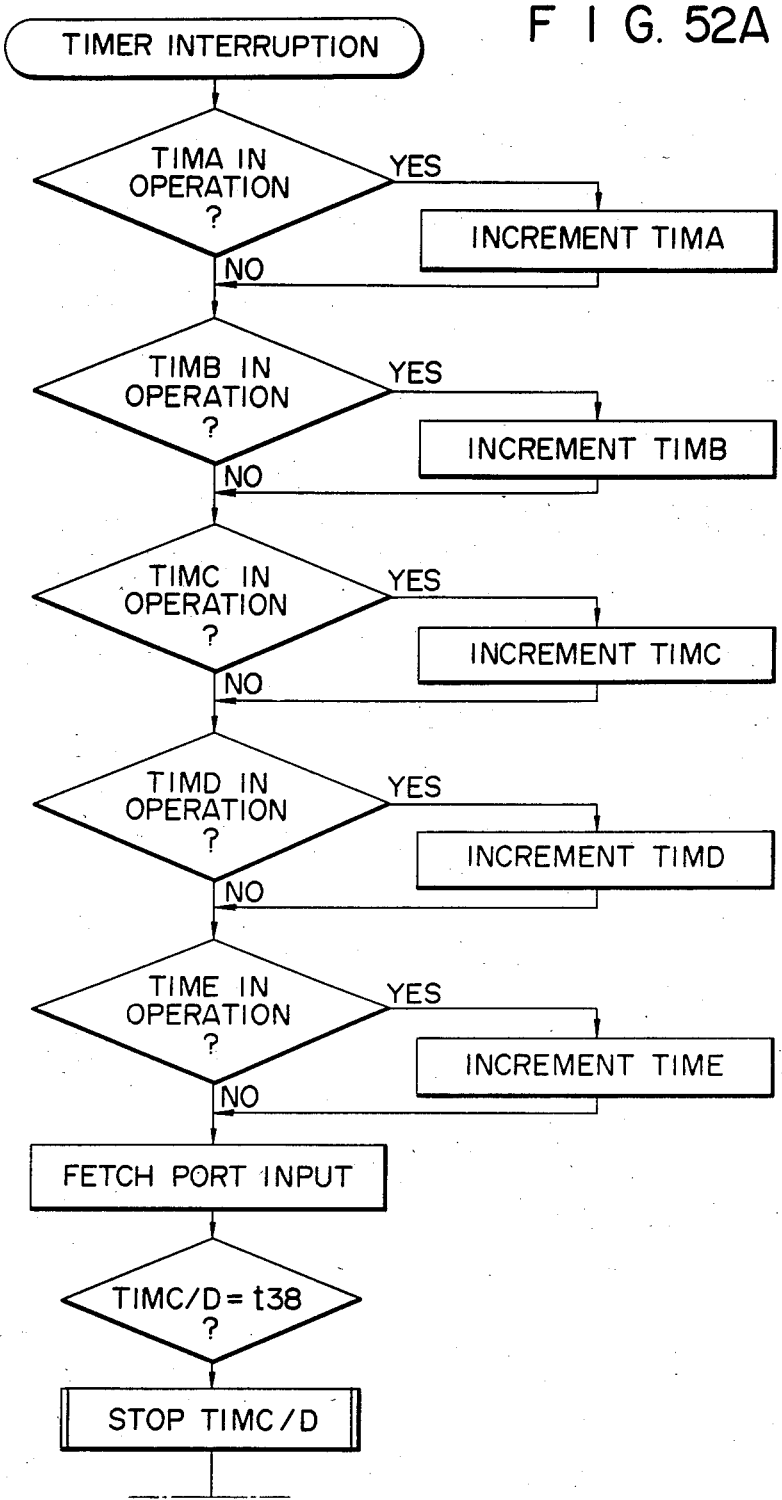
Figure 52B:
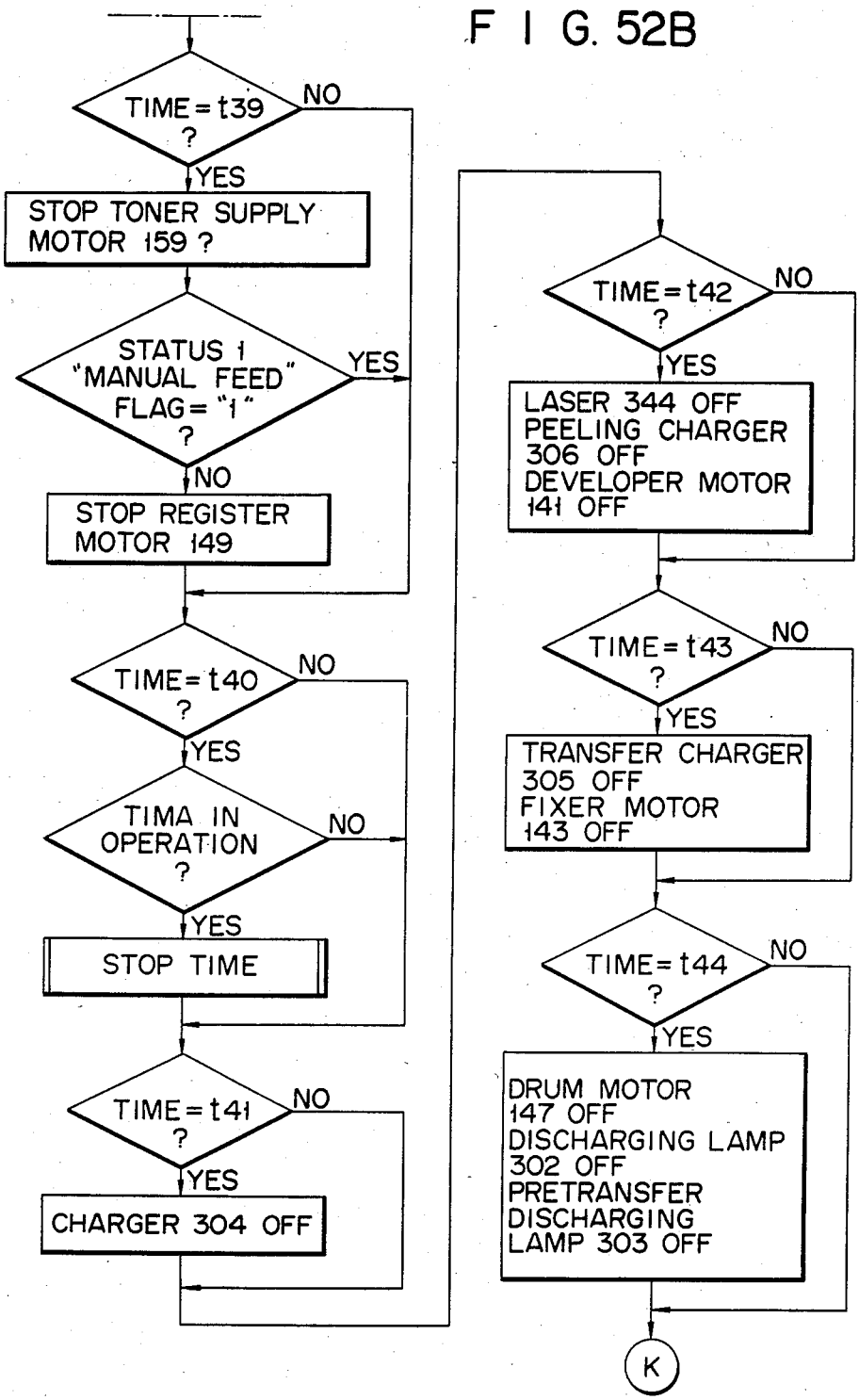

A content of timer interruption in the above flows will be described with reference to FIGS. 52 and 53. The microprocessor checks if the timers A, B, C, D and E are in operation, respectively. If Y in these steps, these timers are respectively incremented. All the input data are fetched by a port input fetching portion. When TIMC/D=t38, the timers C and D are stopped. Then, the microprocessor checks if TIME=t39, and thereafter the timer E (TIME) is continuously operated. When the time of the timer E has reached respective preset times, the motors 159 and 149 are sequentially stopped. After TIME=t4, the microprocessor checks if the timer A is in operation (this is to check if the next printing operation is bing performed). If Y in this step, the timer E is stopped. Thereafter, when TIME=t41, the charger 304 is turned off. When TIME=t42, the laser 344, the charger 306, and the motor 141 are turned off. When TIME=t43, the charger 305 and the motor 143 are turned off. When TIME=t44, the motor 147 and the lamps 302 and 303 are turned off (see FIG. 52).

When TIME=t45, the solenoid 158 is turned off, and the timer E is stopped. The microprocessor checks if the fixer temperature is normal, if the fixer temperature fuse is disconnected, if the scan motor 312 is in the ready mode, and if the door switch 129 is turned off. Then, in accordance with the above checking result, various operations are performed.

Figure 54A:
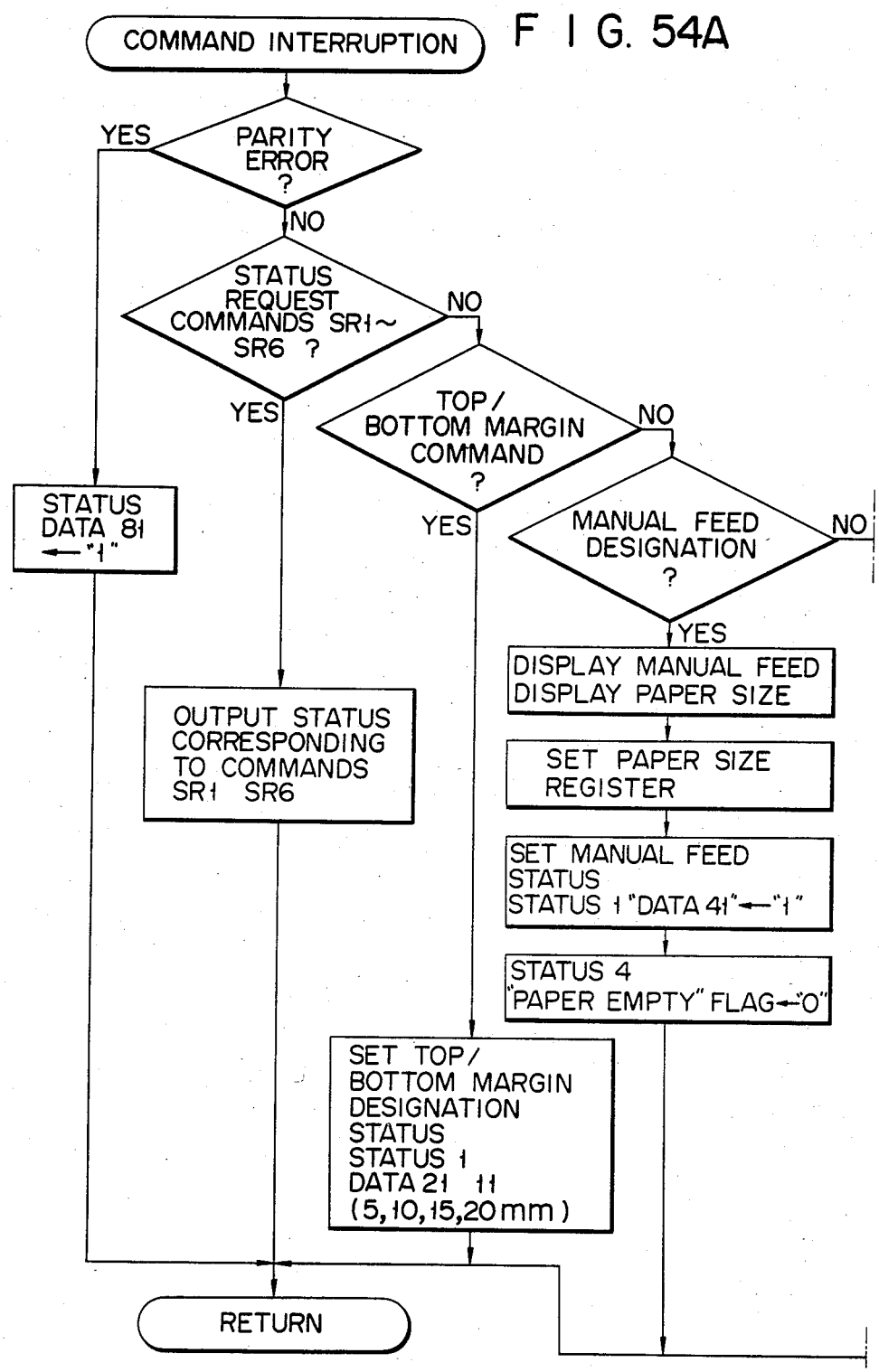
Figure 54B:
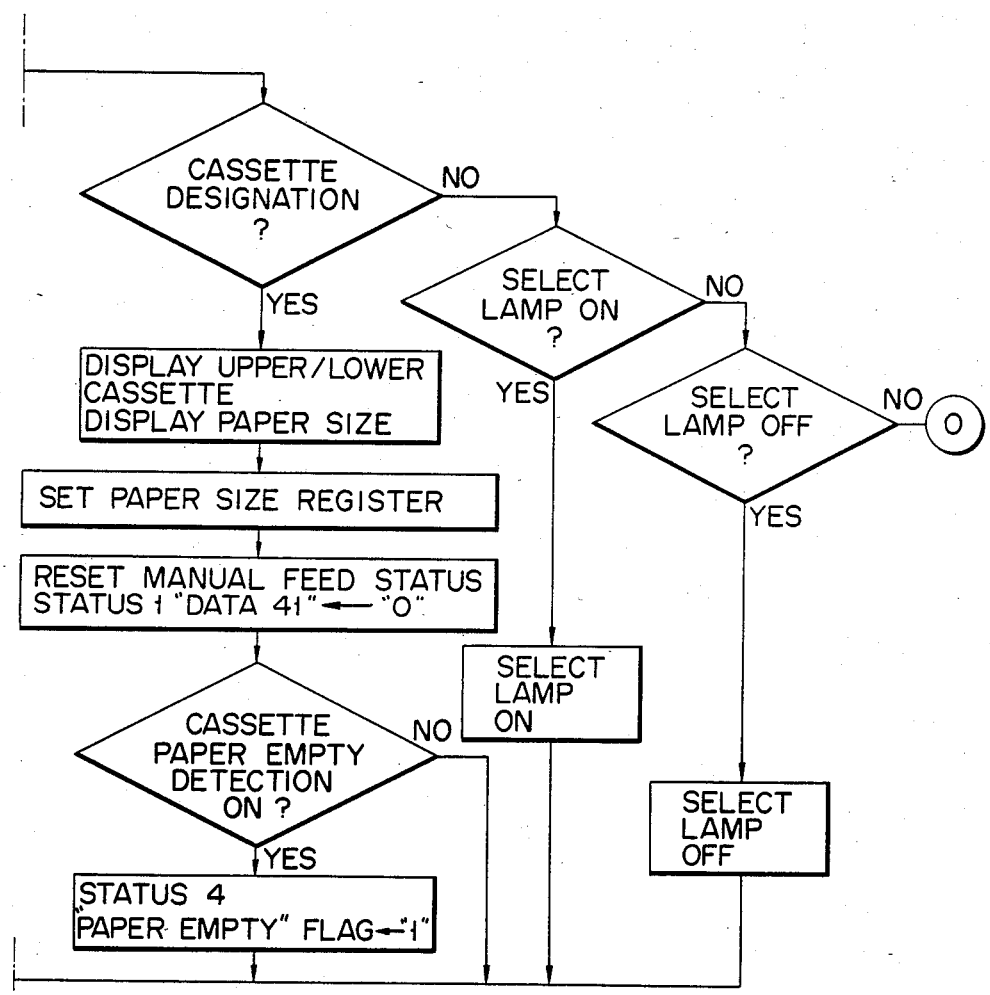

Command interruption in the above flows will be described below with reference to FIGS. 54A and 54B. When the flow enters the command interrupt process, the microprocessor checks a parity error. If Y in this step, the flag of the status DATA 81 is set to be "1", thus representing "illegal command error". If N in this step, the microprocessor checks if the "status request" command falls within the range between SR1 to SR6. If Y in this step, the status of the corresonding command is generated. If N in this step, the microprocessor checks if the command is the "top/bottom margin" command. If Y in this step, the top and bottom margins are designated, and the "top/bottom margin" flag is set to be "1", thereby designating any of the DATA 21 to 11 therein. If the command is not the "top/bottom margin" command, the microprocessor checks if the command is the "manual feed" command. If Y in this step, a display representing the manual feed and its paper size is performed, and the paper size register is set. The "manual feed" flag is set to be "1" in the status 1, and the "DATA 41" flag is set to be "1" in the status 4. Then, the microprocessor sets "0" in the "paper empty" flag in the status 4. If the command is not the "manual feed" command, the microprocessor checks if the command is the "cassette designation" command. If Y in this step, the paper sizes of the upper and lower cassettes are displayed, the paper size register is set, and the "manual feed" status is reset, i.e., the "DATA 41" flag is "0". Then, the microprocessor checks if the paper sheets remain in the tray. If Y in this step, the "paper empty" flag is set to be "1". If the command is not the "cassette designation" command, the microprocessor checks if the command is the "select lamp ON" command for turning on an on-line select lamp (designated from an external device, e.g., the host system). If Y in this step, the select lamp is turned on. If N in this step, the microprocessor checks if the command is the "select lamp OFF" command. If Y in this step, the select lamp is turned off, and if N, the flow advances to the next process.

Flow charts shown in FIGS. 55A to 55C will be described below.

Figure 55A:
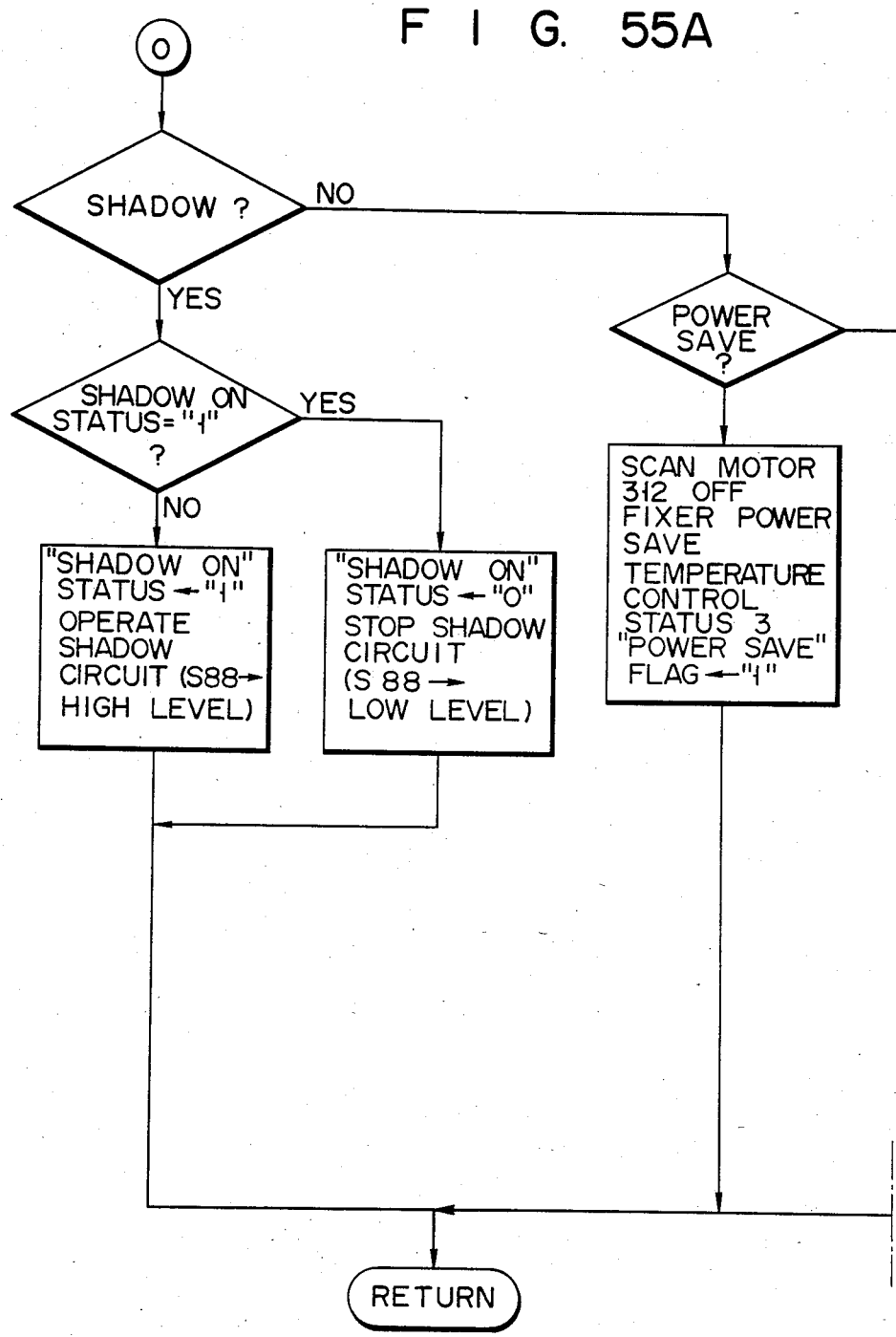
Figure 55B:
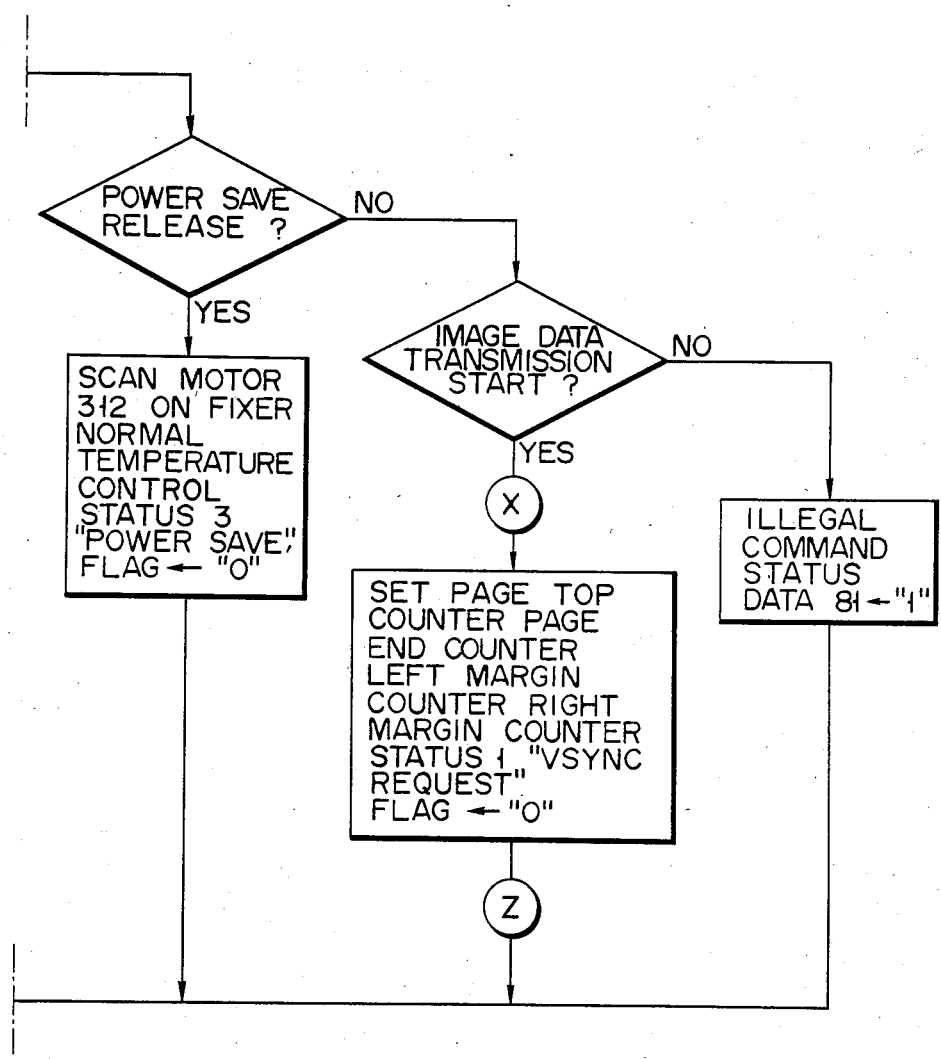
Figure 55C:
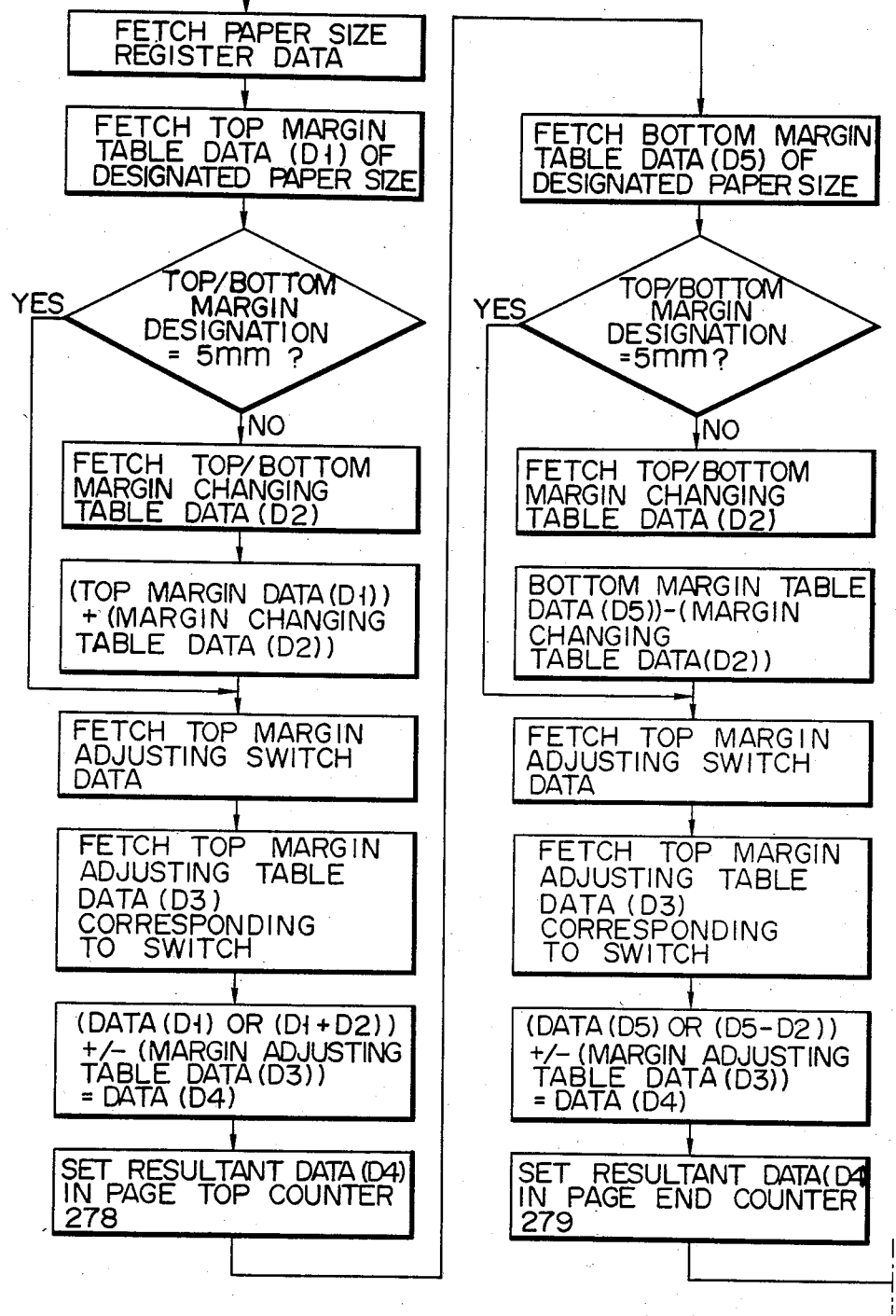
Figure 55D:
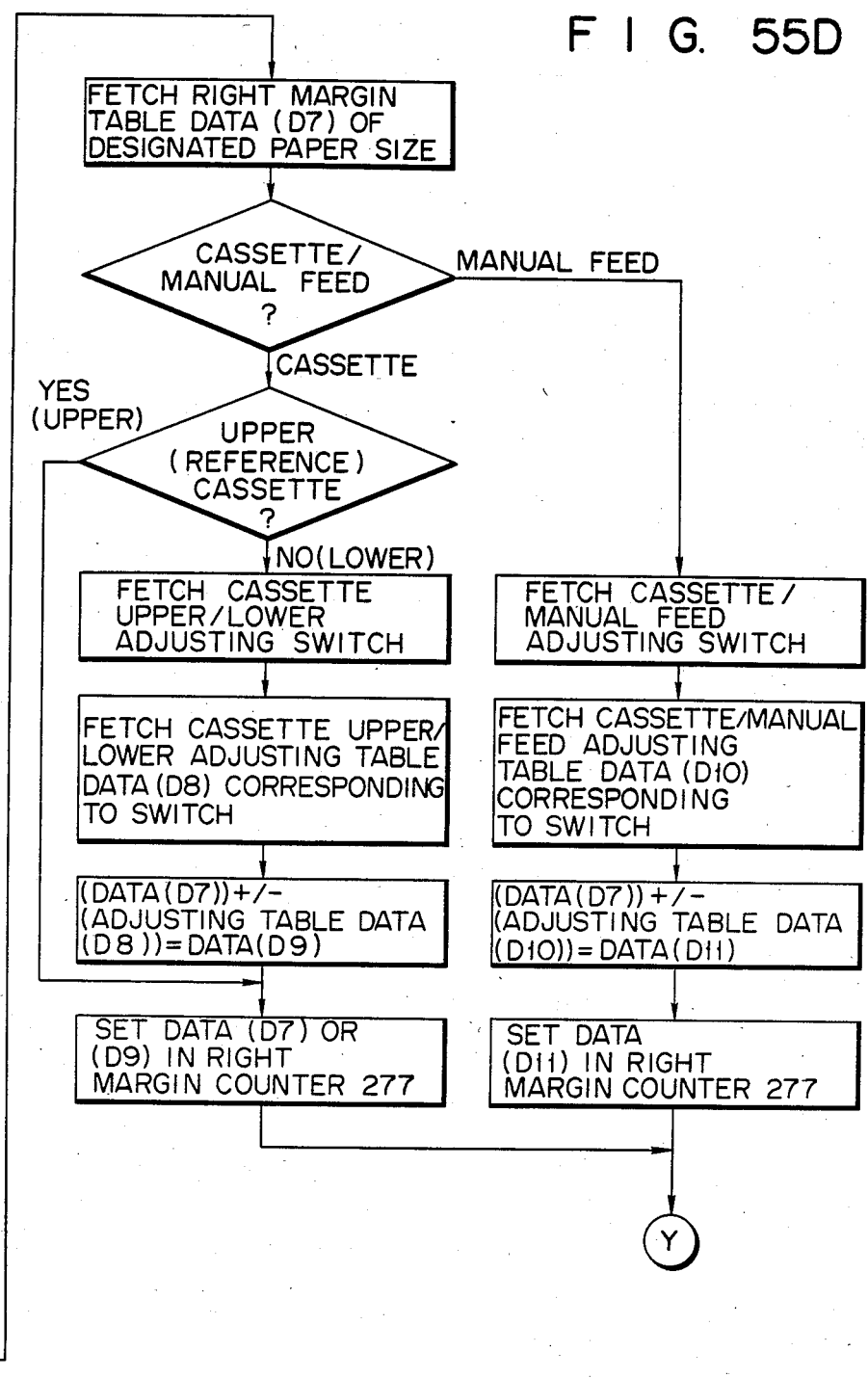
Figure 55E:
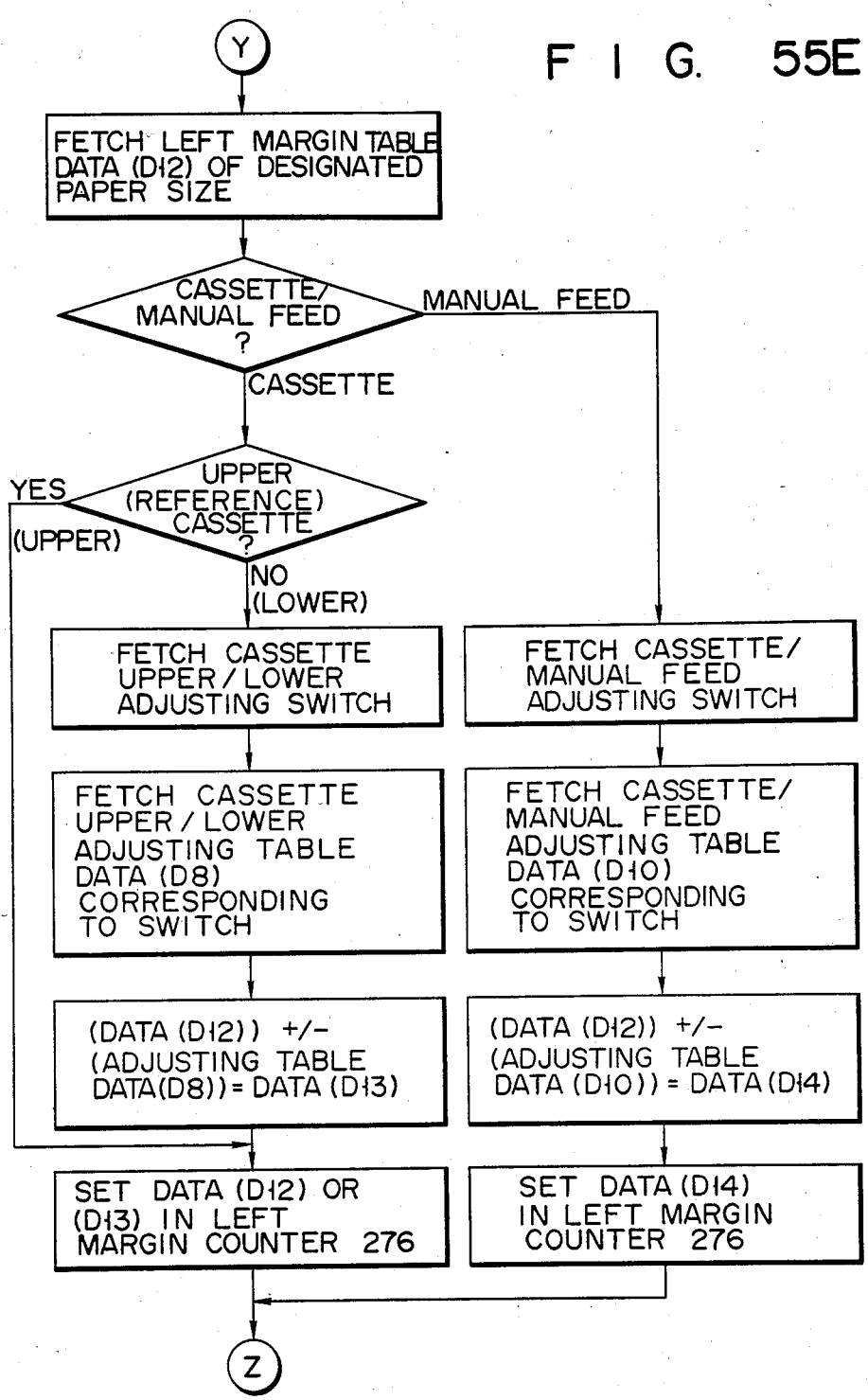

The flow shown in FIG. 55A includes the power save process in addition to the shadow method process. In the power save mode, the scan motor 312 is turned off, and the fixer is controlled to have the temperature which use the least power. The "power save" flag in the status 3 is set to be "1". When the power save mode is released, the motor 312 is turned on, the fixer is controlled to have the normal temperature, and the "power save" flag in the status 3 is set to be "0". When the VSYNC command is detected, the flow advances to the process shown in FIGS. 55B and 55C.

The paper size data is fetched from the paper size register, and the top margin table data (D1) of the designated paper size is fetched. The microprocessor checks if the top/bottom margin is designated to be 5 mm, and if N in this step, the top/bottom margin changing table data D2 is fetched. Then, the data D1 and D2 are added to each other, and data of the top margin adjusting switch (442 in FIG. 14) is fetched. Then, the top margin adjusting table data D3 corresponding to the data of the switch 422 is fetched, the data D3 is added/subtracted to/from the data D1 or (D1+D2), and the resultant data D4 is set in the page top counter 278. The bottom margin table data D5 of the designated paper size is fetched, and the microprocessor checks if the top/bottom margin is designated to be 5 mm. If N in this step, the top/bottom margin changing data D2 is fetched. Then, the data D2 is subtracted from the data D5, data of the top margin adjusting switch 422 is fetched, and the top margin adjusting table data D3 corresponding to the data of the switch 422 is fetched. Then, the data D3 is added/subtracted to/from the data D5 or (D5−D2), and the resultant data D4 is set in the page counter 279. The right margin table data D7 of the designated paper size is fetched, and the microprocessor discriminates the cassette or manual feed mode. If the cassette feed mode is selected, the microprocessor checks if the upper (reference) cassette is selected. If N in this step, the lower cassette is selected, and data of the cassette upper/lower adjusting switch (441 in FIG. 14) is fetched. Then, the cassette upper/lower adjusting table data D8 corresponding to the data of the switch 411 is fetched. The data D8 is added/subtracted to/from the data D7, and the resultant data D9 or D7 is set in the right margin counter 277. When the manual feed is designated, the data of the cassette/manual feed adjusting switch (440 in FIG. 14) is fetched, and the cassette/manual feed adjusting table data D10 corresponding thereto is fetched. Then, the data D10 is added/subtracted to/from the data D7, and the resultant data D11 is thus set in the counter 277.

Then, the left margin table data D12 is fetched, and the cassette or manual feed mode is discriminated. If the cassette feed mode is selected, the microprocessor checks if the upper (reference) cassette is selected. If N in this step, it is determined that the lower cassette is selected. Data of the switch 440 is fetched, and the cassette upper/lower adjusting table data D8 corresponding thereto is fetched. The data D8 is added/subtracted to/from the data D12, and the resultant data D13 is set in the left margin counter 276. When the manual feed mode is selected, data of the switch 441 is fetched, and the data D10 corresponding thereto is fetched. The data D12 is added/subtracted to/from the data D10, and the resultant data D14 is set in the counter 276.

The printing operation on sheets fed from the cassette in the flow is shown in the timing chart shown in FIG. 57. When the print start signal IPRNT0 (S65) is generated, the print start enable signal IPREQ0 (S62) rises. Thereafter, the developer motor 141 is turned on, and the paper feed motor 151 is operated so as to convey the paper sheets in the cassette between times t4 and t8. In this case, the semiconductor laser 344 is turned on at a time t5, and starts writing the data at a time t7 (a hatched portion of times t7 to t11 corresponds to a data write interval). At a time t9, the register motor 149 is rotated, and the data recorded on the photosensitive drum is transferred to the paper. The data write operation is performed until the signal IPREQ0 (S62) falls at the time t11. After the time t11, the motor 149 is continuously rotated until the time t12, and then stopped. Thereafter, the laser 344 is turned off at the time t14.

Figure 59:
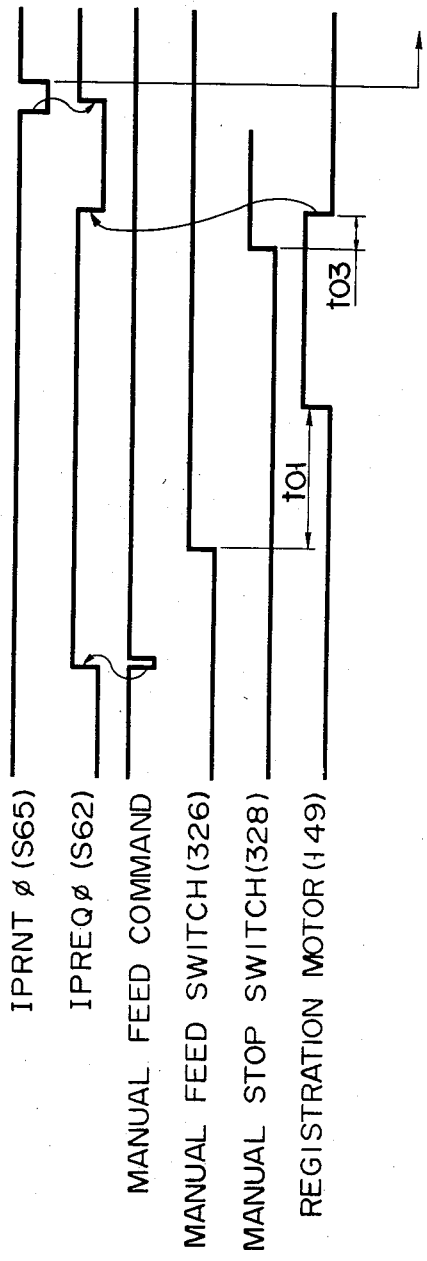

FIGS. 58 and 59 are timing charts for explaining the printing operation in the manual feed mode. A difference between the cassette and manual feed modes will be described hereinafter.

In FIGS. 58 and 59, the motor 151 is not used, and the motor 149 is rotated in the reverse direction so as to drive the paper feed rollers used for conveying paper. When the motor 149 is rotated in the forward direction, the register rollers are driven. When the "manual feed" command is supplied, the signal IPREQ0 (S62) rises. FIG. 58 shows the case wherein the paper sheets are set on the manual feed guide before the manual feed command is generated. When the manual feed switch 326 is turned on by setting the paper, the motor 149 is slightly rotated in the reverse direction after a time t01 has elapsed, and stops before passing the trailing end of the paper. When the manual feed command is generated and the signal IPREQ0 (S62) rises, the motor 149 is rotated in the reverse direction again so as to convey the paper sheet to the transfer position, and is thereafter stopped. Therefore, before generating the manual feed command, the paper sheets fed from the cassette can be subjected to printing. FIG. 59 shows the case wherein the paper sheets are set on the manual feed guide after the manual feed command is generated, and the manual feed switch 326 is turned on. In this case, the register motor 149 is continuously rotated in the reverse direction after the time t01 has elapsed so as to convey the paper to the transfer position. Note that in both cases, when the manual stop switch 328 is turned off, the register motor 149 is stopped at a time t21 after a predetermined time (t20) has elapsed. This can prevent a paper jam even though the paper set on the manual feed guide is longer than the displayed paper size. In the cassette mode, since the paper size is defined by the cassette, such an operation is not needed. Therefore, when the paper sheets set on the guide are used up, if a paper sheet larger than the size of the data to be printed is used, the printing operation can be continued. In addition, paper other than the standard size can be used, thus increasing utility of the apparatus.

Figure 47A:
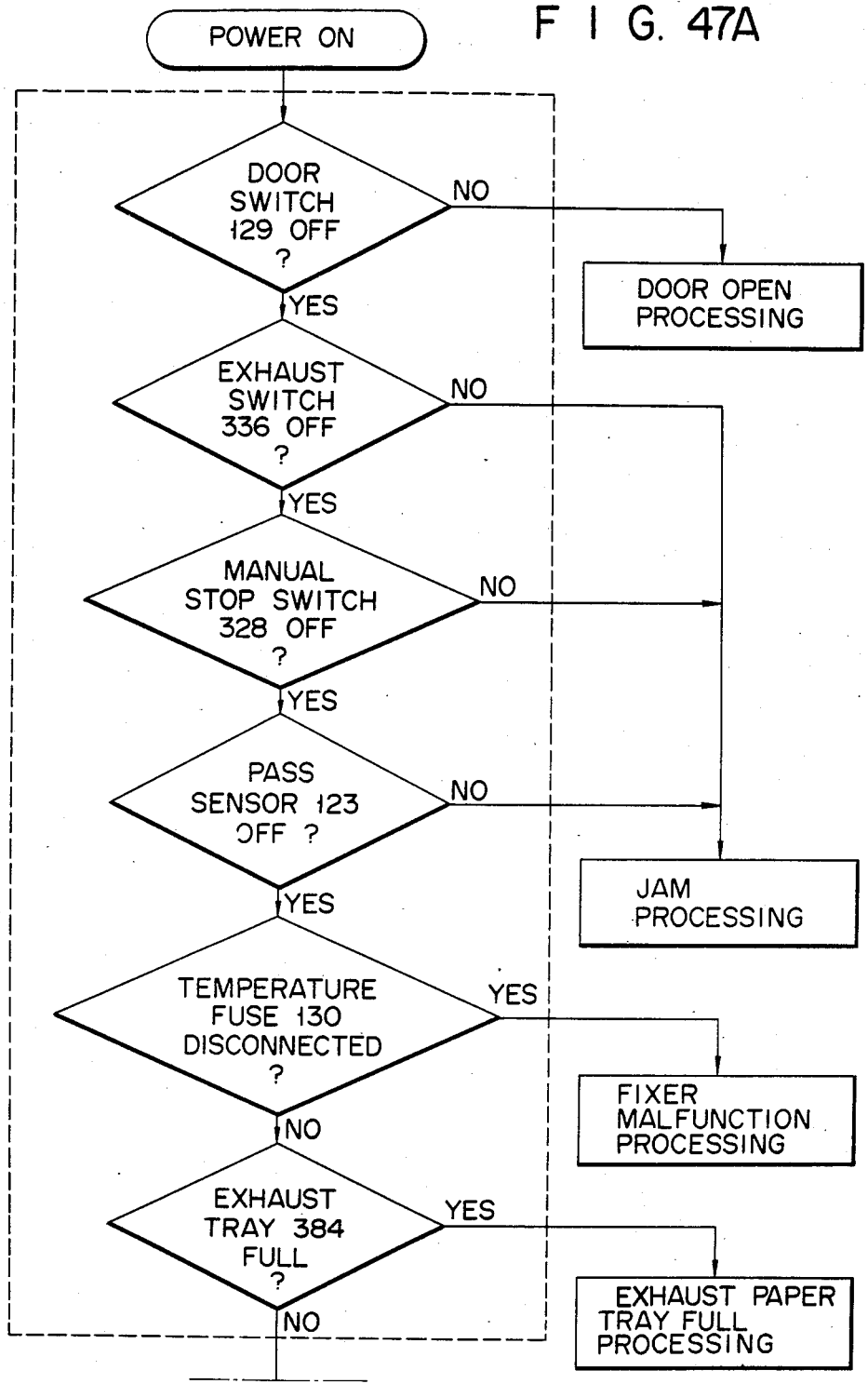
Figure 47B:
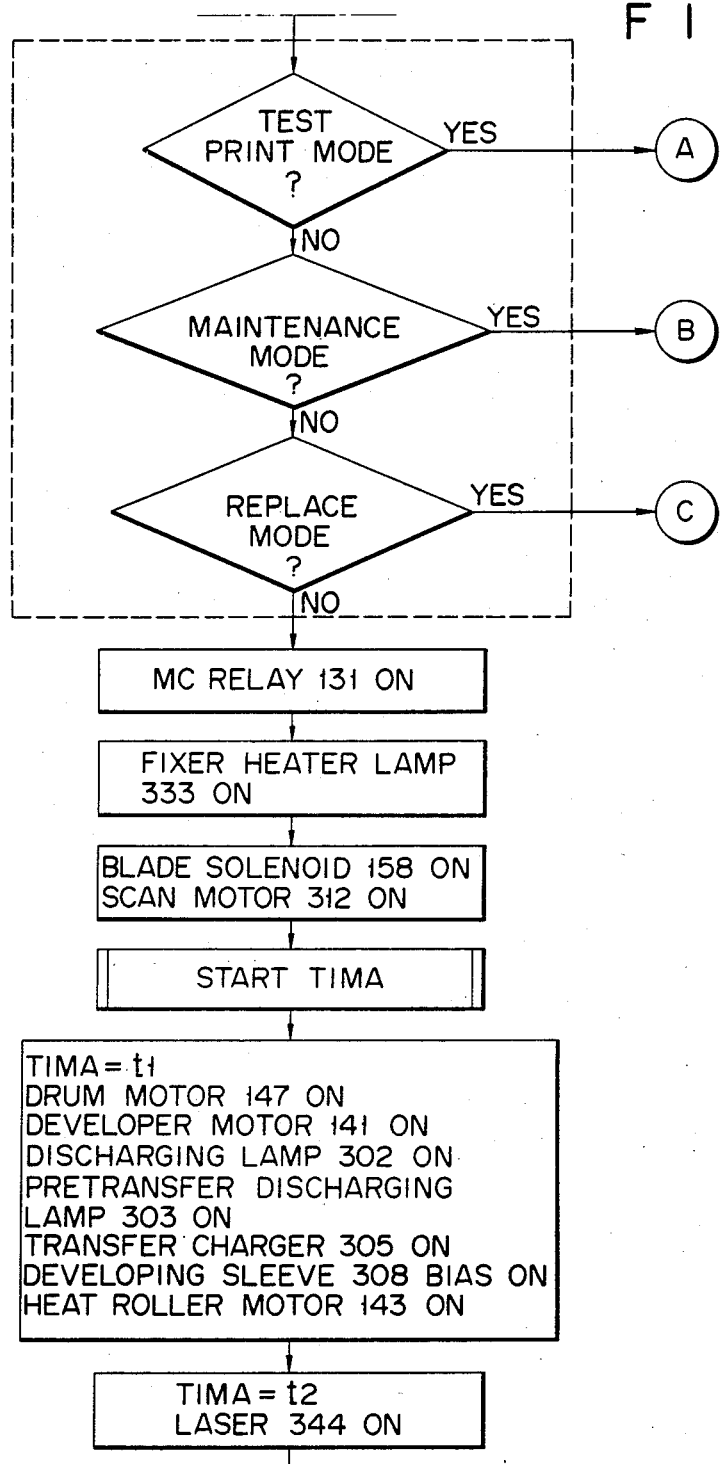
Figure 47C:
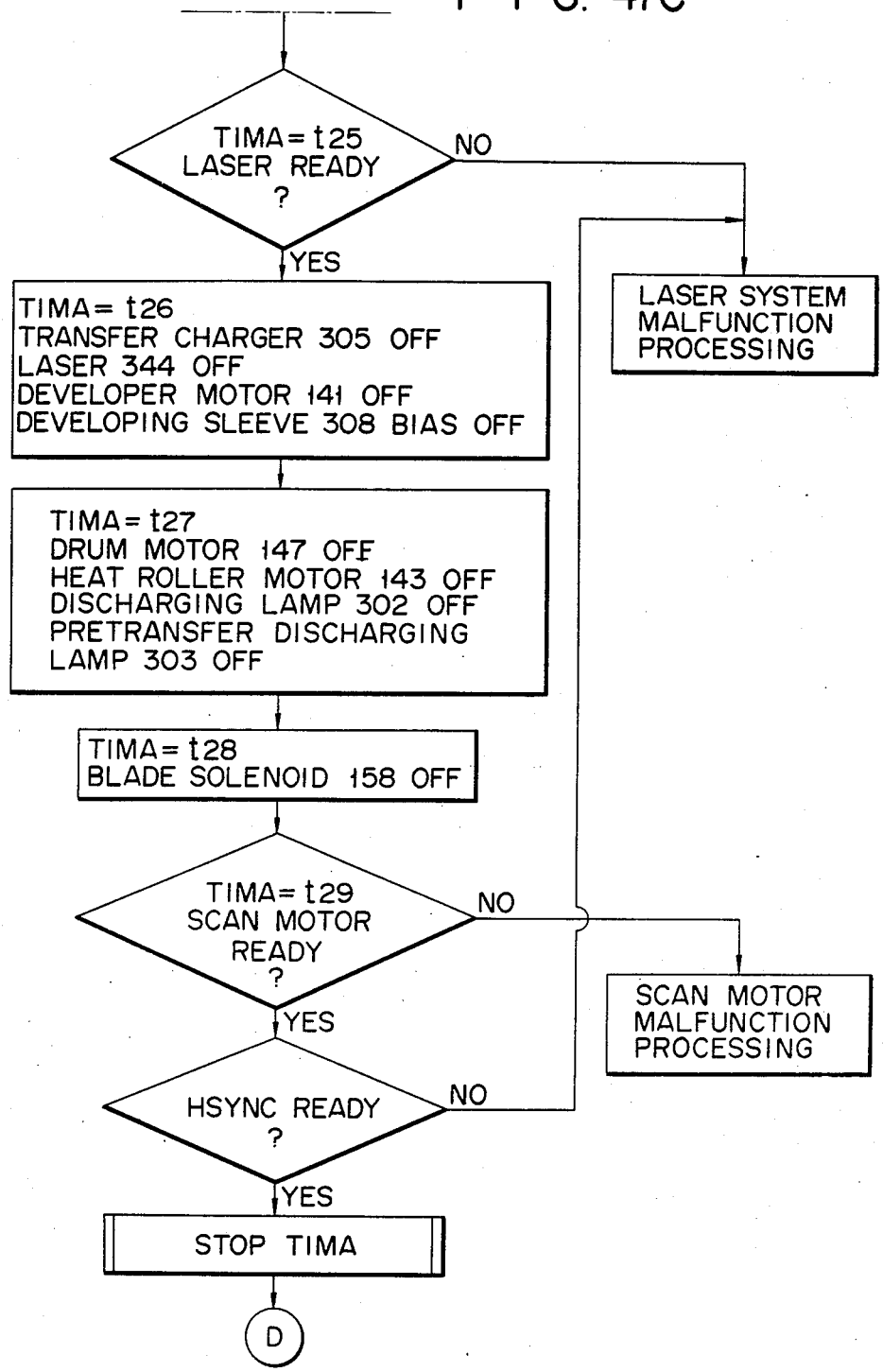
Figure 48A:
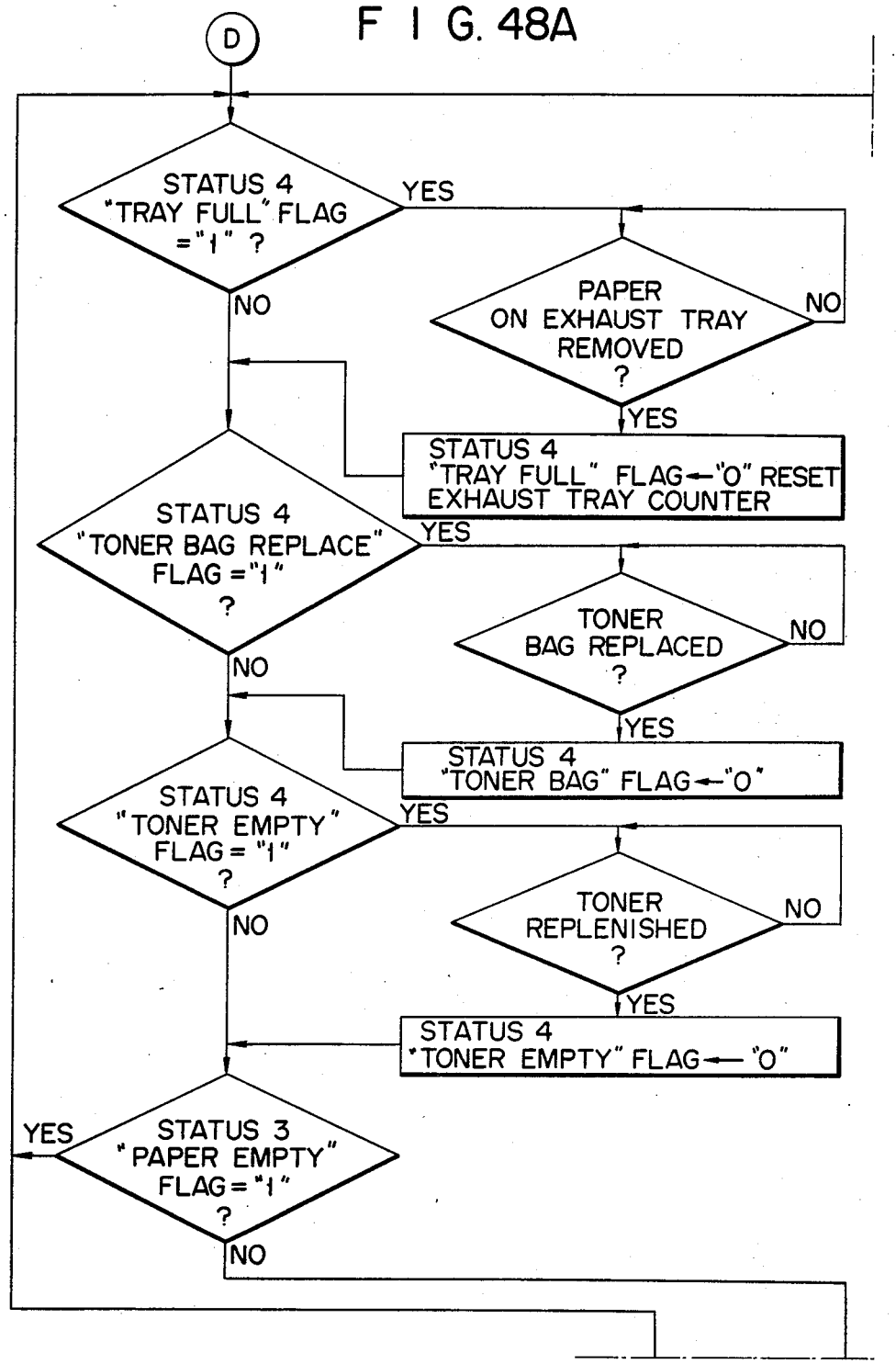
Figure 48B:
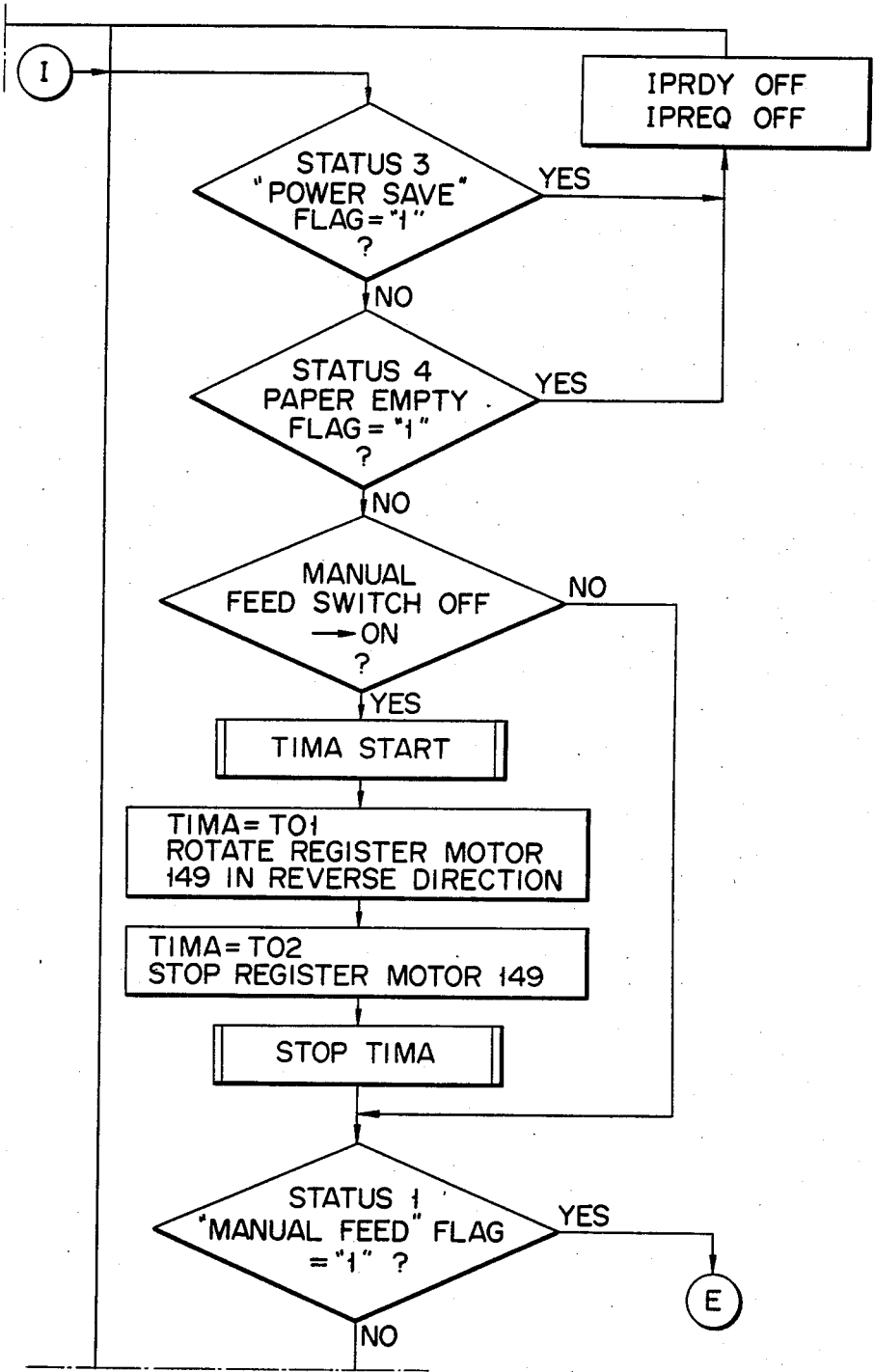
Figure 49A:
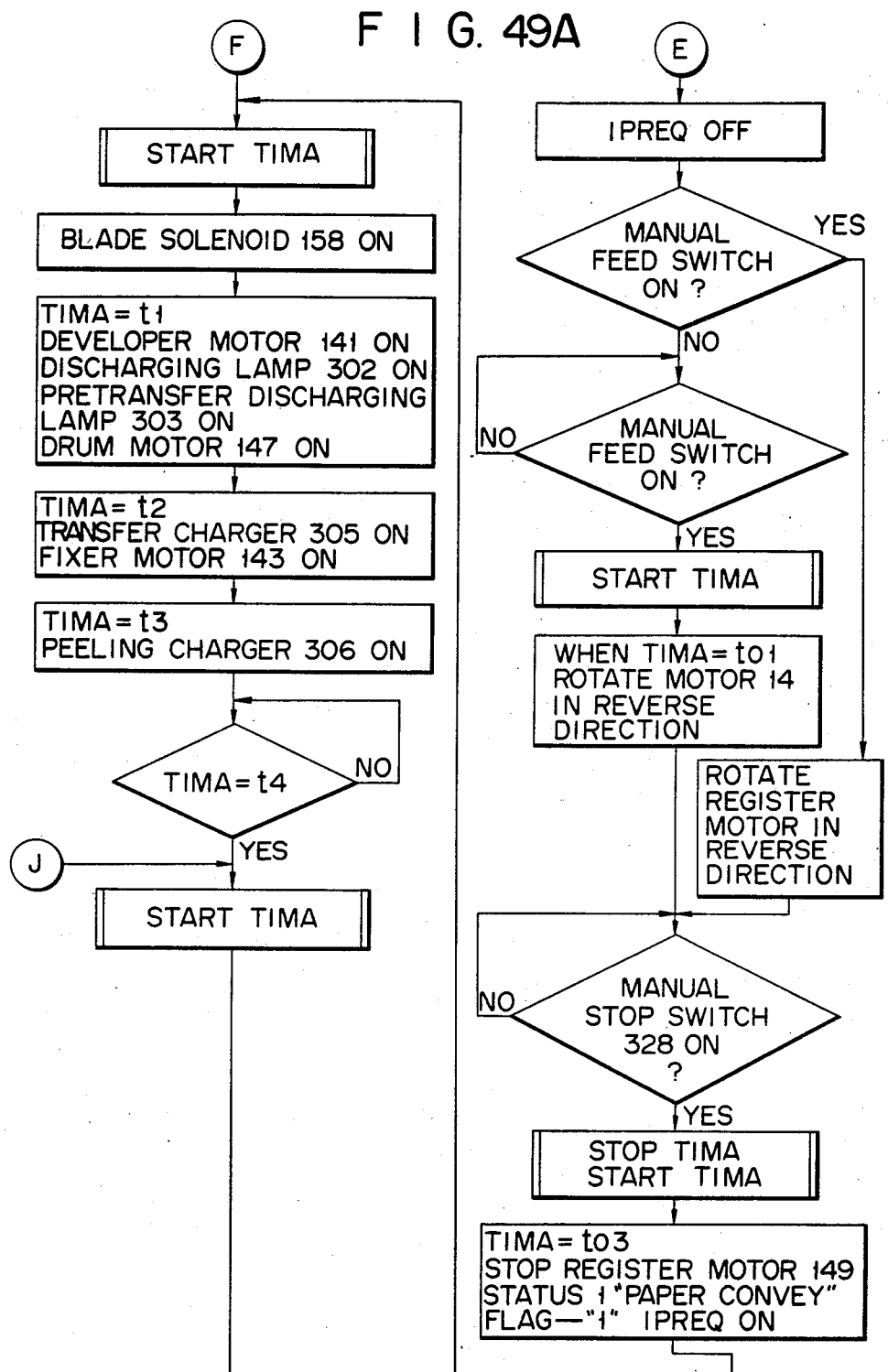
Figure 49B:
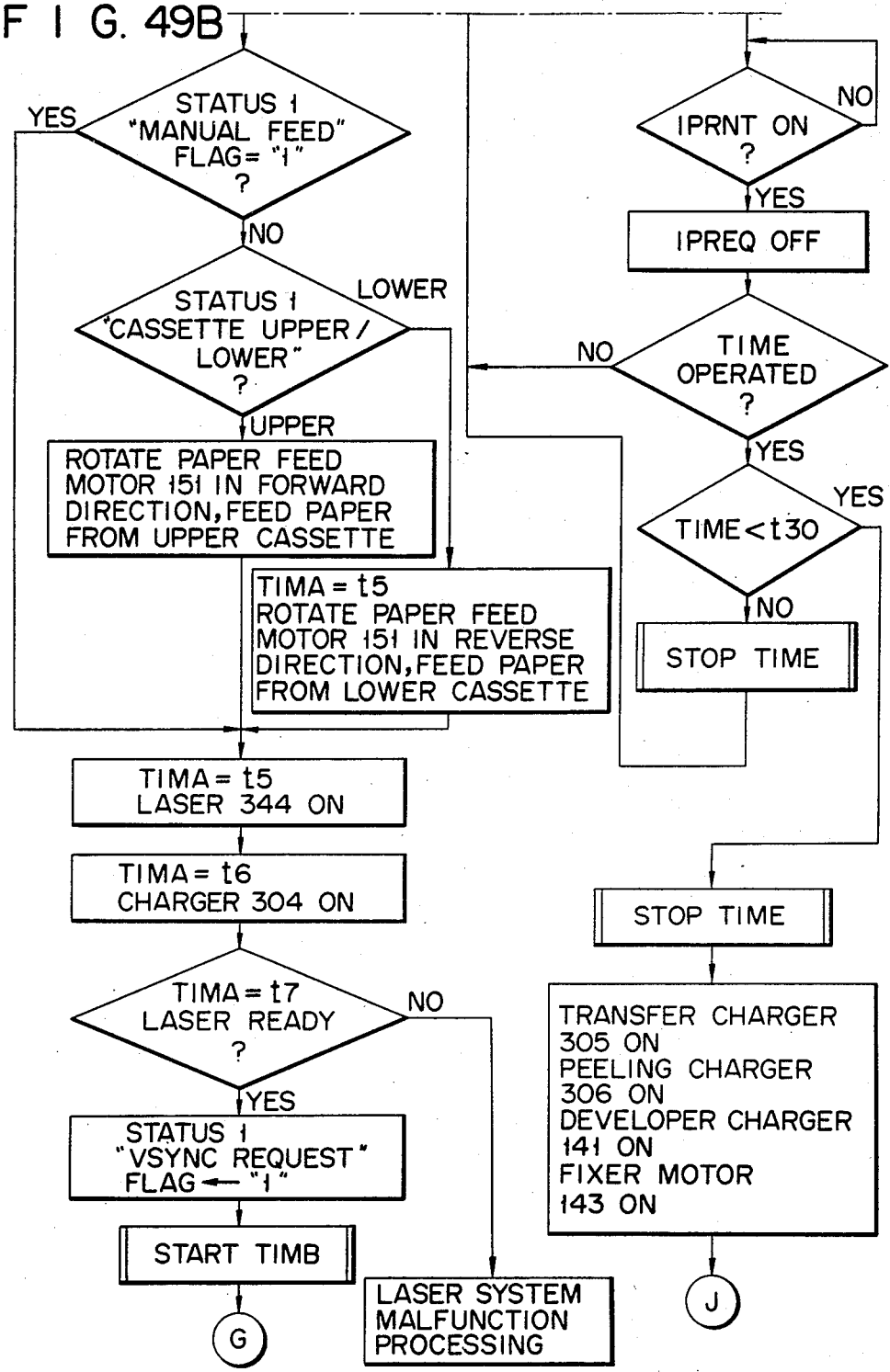
Figure 50A:
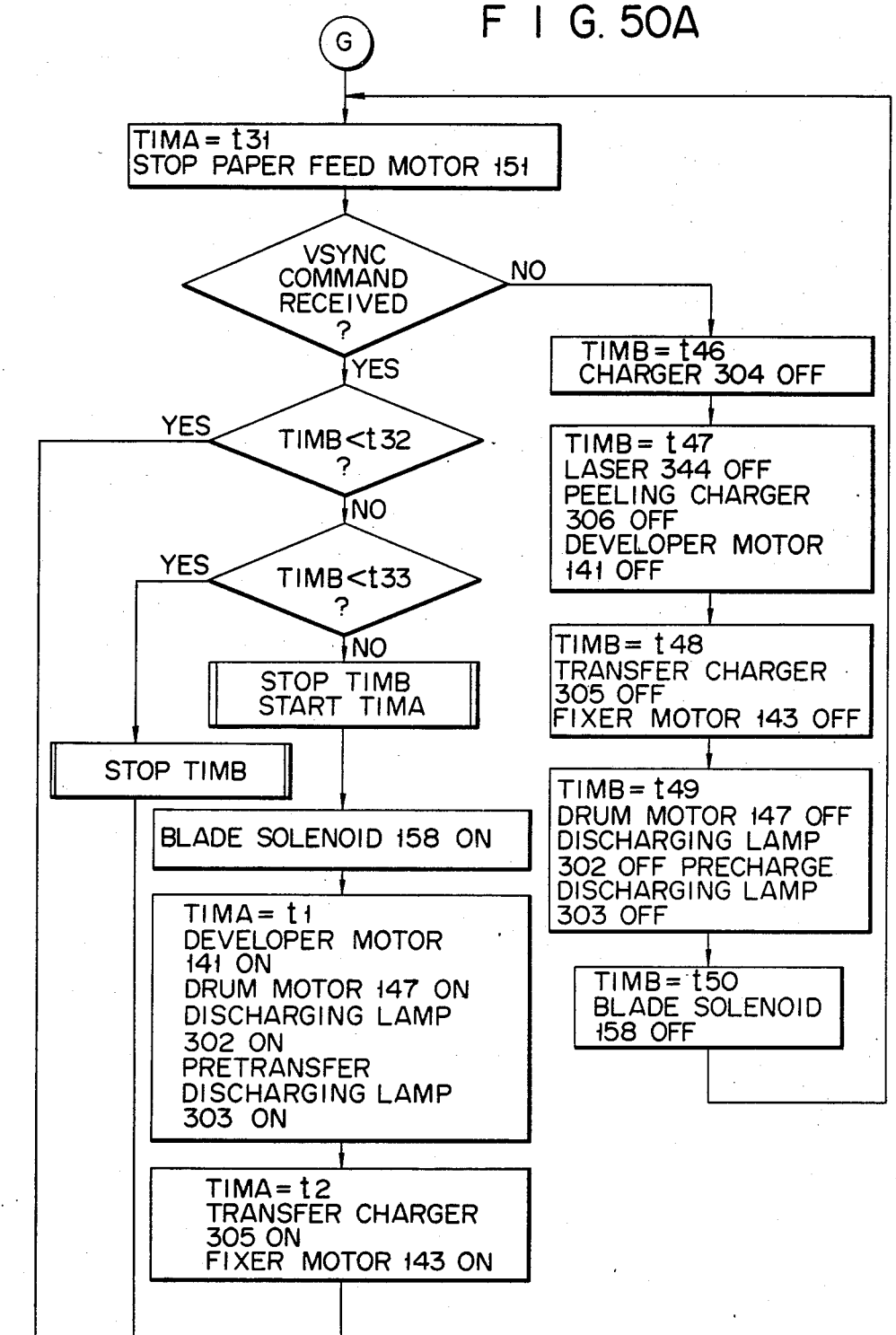
Figure 50B:
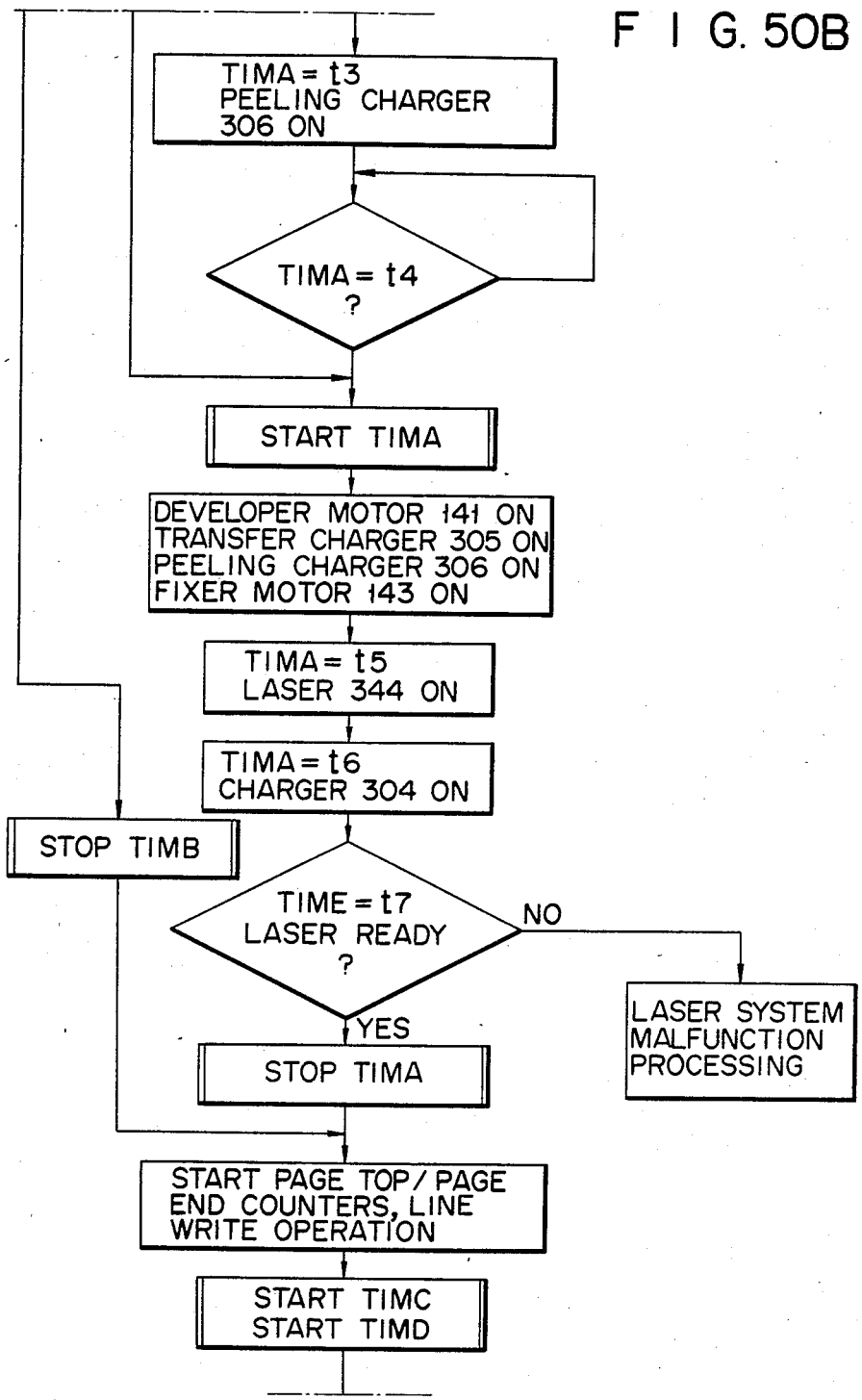
Figure 50C:
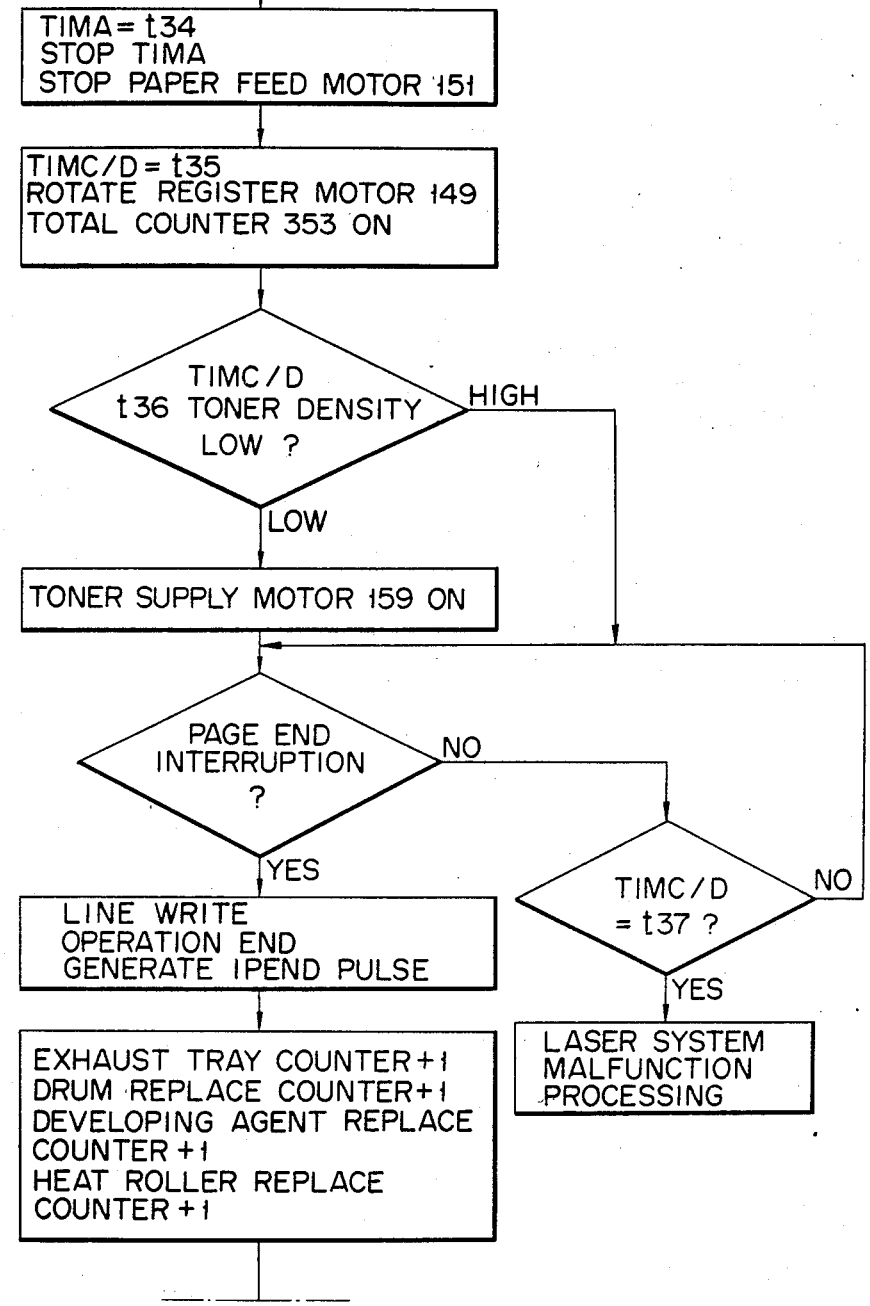
Figure 50D:
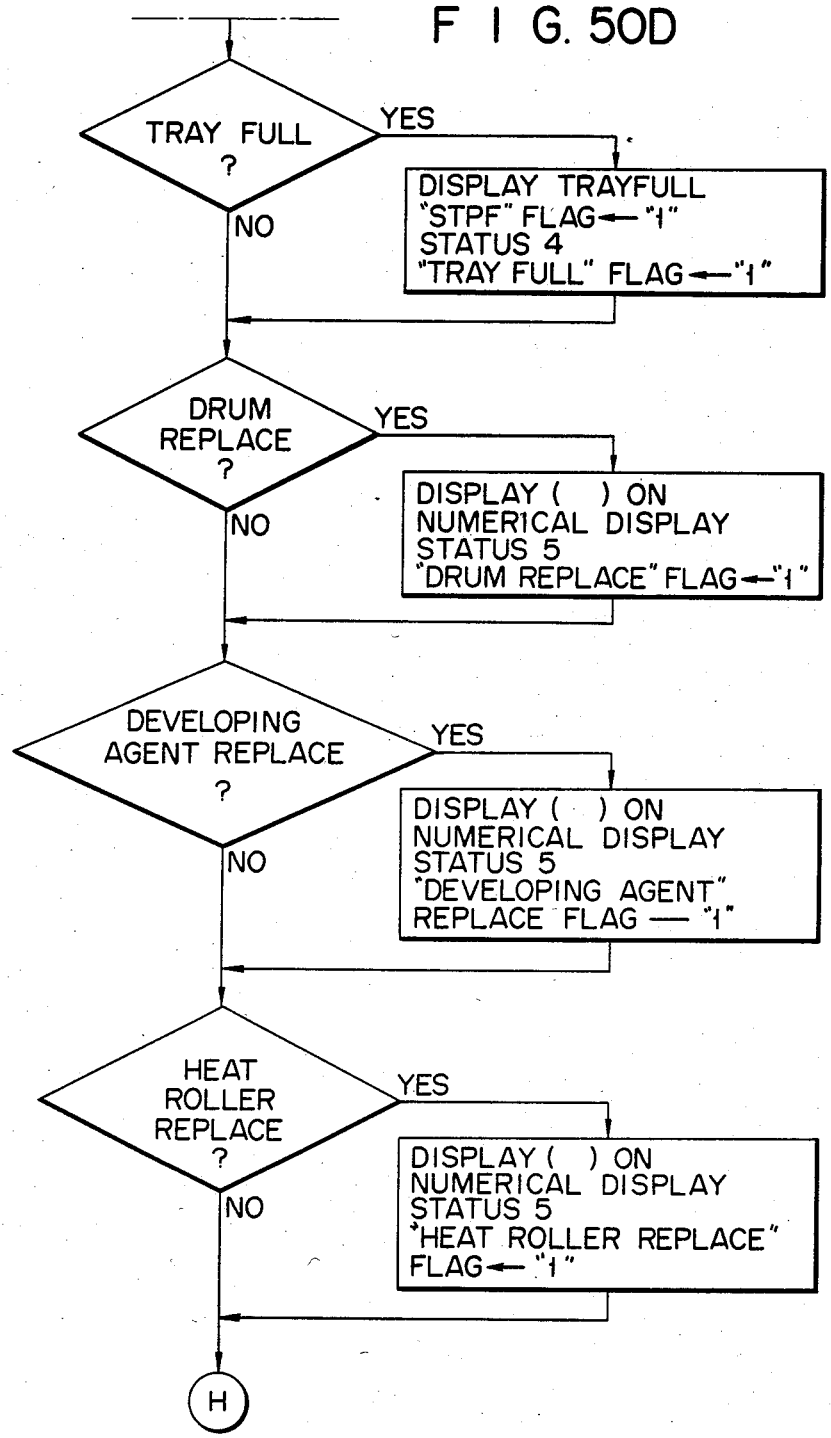
Figure 51A:
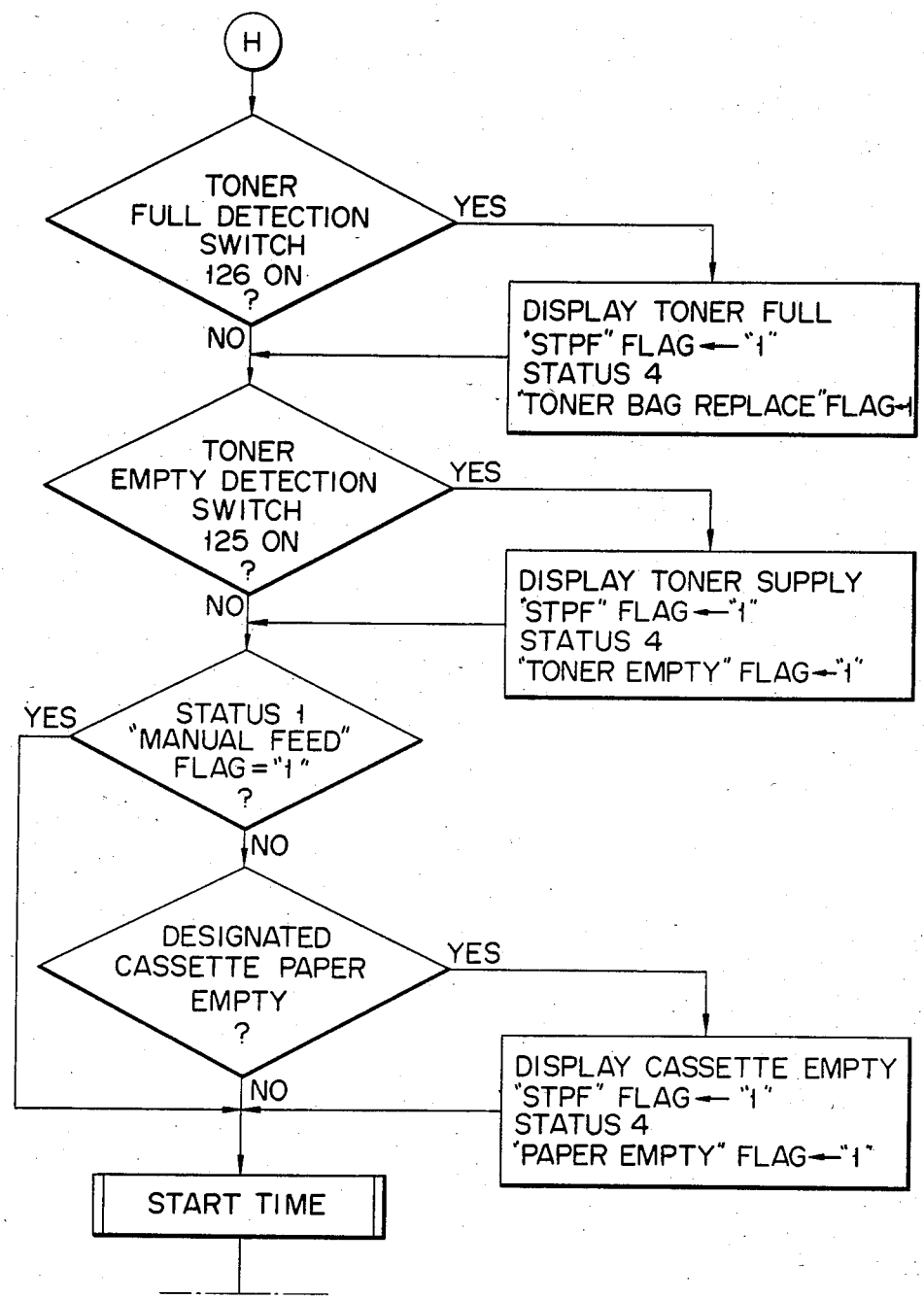
Figure 60B:
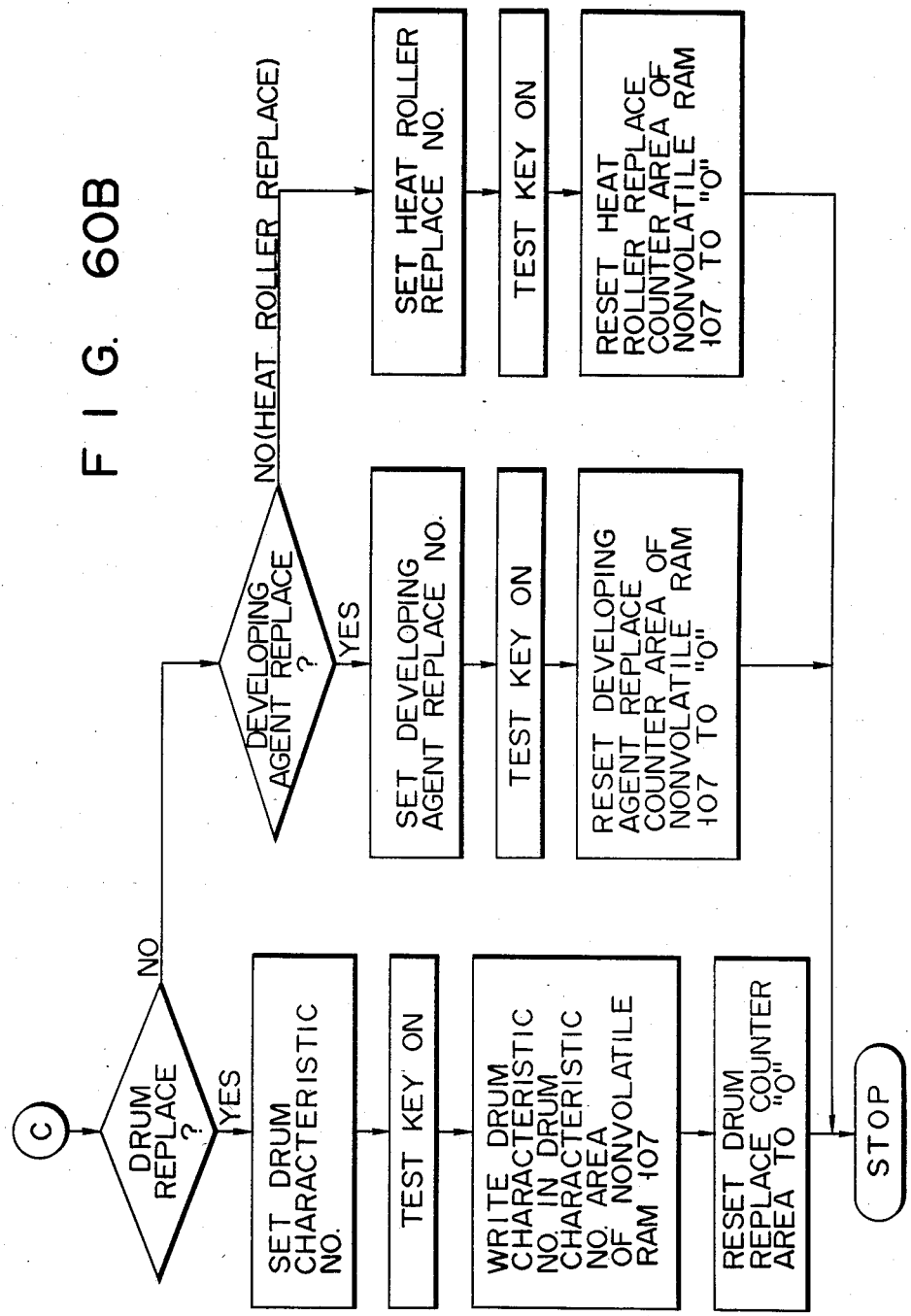

Operation of flows Ⓐ, Ⓑ and Ⓒ branching from the flow shown in FIGS. 47A to 47C will be described with reference to FIGS. 60A and 60B.

When the test print mode is selected, the flow shifts to the flow Ⓐ, and the printing operation designated by the print mode No through the test key is executed. When the maintenance mode is selected, the flow shifts to the flow Ⓑ, and the operation of the maintenance mode No designated through the test key is executed. When the replace mode is selected, the flow shifts to the flow Ⓒ, and the microprocessor discriminates that replacement of the drum, the developing agent or heat roller is required, and the processing of predetermined data with respect to the RAM 107 by the drum characteristic No set, developing agent replace No set, or heat roller replace No set designated through the test key is performed.

FIGS. 61 to 63 are views showing correspondence between the display Nos and their contents.

As has been described above, according to the present invention, input recording data is classified and a shadow circuit is driven to add a shadow image is added to the recorded image, when the classified input data is character data or simple figure data, whereby clear recording may be performed with an improved printing quality. When a "kanji" is being printed, vertical and horizontal lines of "kanji" may be clearly impressed by adding shadow images thereto.

As described above, according to this invention, only the dot-matrix image data are stored in the page memory and the margins are not stored into the page memory. Therefore, the data processing speed is faster, increasing the recording speed and making the circuit construction simple.

What is claimed is:

1. A printing apparatus comprising:
   image forming means, in accordance with an externally supplied image data, for forming an image on a given recording area of an image carrier with a center of the recording area aligning with a center of the image carrier in a width direction and one end of the recording are aligning with one end of the image carrier in a length direction, the recording area being determined by a recording area data;
   transfer means for transferring the image on the image carrier onto a recording medium of a given size;
   feeding means for feeding said recording medium of a given size to said transfer means with a center of the recording medium aligning with the center of the image carrier in the width direction and one end of the image carrier aligning with one end of the recording medium in a length direction, the size of the recording medium being determined by an externally supplied size data;
   storing means for storing said recording area data, said recording area data corresponding to respective sizes of the recording mediums; and
   controller means for reading out and supplying the recording area data stored in said storing means to said image forming means in accordance with the size of the recording medium.

2. The printing apparatus according to claim 1, in which said feeding means comprises automatic feeding means and manual feeding means, said automatic feeding means includes recording medium cassettes of respective sizes and feeding rollers for feeding the recording mediums one by one from said cassettes, said manual feeding means includes a recording medium insert port and a feeding roller for feeding the recording medium inserted into said port.

3. The printing apparatus according to claim 2, in which said size data represents the size of the recording medium and a designation of the recording medium cassette.

4. A printing apparatus comprising:
   image forming means for forming a dotted image on a recording area of a photosensitive image carrier by scanning the photosensitive image carrier with a laser beam which is modulated on and off in accordance with an externally supplied image data, with a center of the recording area aligning with a center of the photosensitive image carrier in a width direction and one end of the recording area aligning with one end of the photosensitive image carrier in a length direction, the recording area being determined by a recording area data;
   transfer means for transferring the image on the photosensitive image carrier onto a recording medium of a given size;
   feeding means for feeding said recording medium of a given size to said transfer means with a center of the recording medium aligning with the center of the photosensitive image carrier in the width direction and one end of the photosensitive image carrier aligning with one end of the recording medium in a length direction, the size of the recording medium being determiend by an externally supplied size data;
   storing means for storing said recording area data, said recording area data corresponding to respective sizes of the recording mediums; and
   controller means for reading out and supplying the recording area data to said image forming means in accordance with the size of the recording medium.

5. The printing apparatus as recited in claim 4, in which said feeding means comprises automatic feeding means and manual feeding means, said automatic feeding means including recording medium cassettes of respective sizes and feeding rollers for feeding the recording mediums one by one from said cassettes, said manual feeding means including a recording medium insert port and a feeding roller for feeding the recording medium inserted into said port.

6. The printing apparatus as recited in claim 5, in which said size data represents the size of the recording medium and a designation of the recording medium cassette.

7. A printing apparatus comprising:
data control means, connected to a host system, for receiving a code data supplied from said host system and for converting the code data into a dotted image data, the data control means also receiving a recording area data and size data supplied from said host system; and
print control means, connected to said data control means, for receiving the dotted image data, the recording area data, and the size data, the print control means comprising:
image forming means for forming a dotted image on a given recording area of a photosensitive image carrier by scanning the photosensitive image carrier with a laser beam which is modulated on and off in accordance with the dotted image data supplied from said data control means, with a center of the recording area aligning with a center of the photosensitive image carrier in a width direction and one end of the recording area aligning with one end of the photosensitive image carrier in a length direction, the recording area being determined by a recording area data supplied from said data control means;
transfer means for transferring the image on the photosensitive image carrier onto a recording medium of a given size;
feeding means for feeding said recording medium of a given size to said transfer means with a center of the recording medium aligning with the center of the image carrier in the width direction and one end of the photosensitive image carrier aligning with one end of the recording area in a length direction, the size of the recording medium being determined by the size data supplied from said data control means;
storing means for storing said recording area data, said recording area data corresponding to respective sizes of the recording mediums; and
controller means for reading out and supplying the recording area data to said image forming means in accordance with the size of the recording medium.

8. A printing apparatus according to claim 7, in which said data control means converts the code data into a dotted image data by a unit of one page.

9. The printing apparatus as recited in claim 7, in which said feeding means comprises automatic feeding means and manual feeding means, said automatic feeding means including recording medium cassettes of respective sizes and feeding rollers for feeding the recording mediums one by one from said cassettes, said manual feeding means including a recording medium insert port and a feeding roller for feeding the recording medium inserted into said port.

10. The printing apparatus as recited on claim 9, in which said size data represents the size of the recording medium and a designation of the recording medium cassette.

11. The printing apparatus as recited in claim 7, wherein said recording area data includes margin data of the respective sizes of the recording medium.

12. The printing apparatus as recited in claim 11, wherein said image forming means comprises:
a rotating photosensitive drum,
means for scanning said laser beam over a predetermined area of the rotating photosensitive drum, and
means for blanking the laser beam in accordance with the margin data.

13. The printing apparatus as recited in claim 12, wherein said feeding means includes means for feeding said recording medium to a predetermined location of the rotating photosensitive drum.

* * * * *